(12) United States Patent
Agarwal et al.

(10) Patent No.: US 12,405,859 B2
(45) Date of Patent: *Sep. 2, 2025

(54) STANDBYS FOR CONTINUOUS DATA PROTECTION-ENABLED OBJECTS

(71) Applicant: Cohesity, Inc., San Jose, CA (US)

(72) Inventors: Shobhit Agarwal, San Jose, CA (US); Chinmaya Manjunath, San Jose, CA (US); Kishan Venkata Sravan Nerella, San Jose, CA (US); Himanshu Mehra, Mountain View, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,314

(22) Filed: Jan. 9, 2024

(65) Prior Publication Data

US 2024/0143450 A1  May 2, 2024

Related U.S. Application Data

(63) Continuation of application No. 17/540,630, filed on Dec. 2, 2021, now Pat. No. 11,914,480.

(60) Provisional application No. 63/122,722, filed on Dec. 8, 2020.

(51) Int. Cl.
| | |
|---|---|
| *G06F 16/00* | (2019.01) |
| *G06F 11/14* | (2006.01) |
| *G06F 16/11* | (2019.01) |
| *G06F 16/17* | (2019.01) |
| *G06F 16/901* | (2019.01) |

(52) U.S. Cl.
CPC ........ *G06F 11/1458* (2013.01); *G06F 16/128* (2019.01); *G06F 16/1734* (2019.01); *G06F 16/9027* (2019.01); *G06F 11/1461* (2013.01); *G06F 2201/84* (2013.01)

(58) Field of Classification Search
CPC .......................... G06F 11/1458; G06F 2201/84
USPC ........................................................ 707/654
See application file for complete search history.

(56) References Cited

U.S. PATENT DOCUMENTS

| | | |
|---|---|---|
| 7,421,648 B1 | 9/2008 | Davis |
| 7,437,764 B1 | 10/2008 | Sobel |
| 8,020,037 B1 | 9/2011 | Schwartz |
| 8,086,585 B1 | 12/2011 | Brashers |

(Continued)

OTHER PUBLICATIONS

Prosecution History from U.S. Appl. No. 17/540,630, now issued U.S. Pat. No. 11,914,480, dated Jun. 23, 2023 through Nov. 6, 2023, 55 pp.

(Continued)

*Primary Examiner* — Monica M Pyo
(74) *Attorney, Agent, or Firm* — Shumaker & Sieffert, P.A.

(57) ABSTRACT

A stream of data changes to content of an object associated with a source system is received. A hot standby version of at least a portion of the object maintained at a recovery system is updated by streaming the received stream of data changes to the recovery system. It is determined that a gap exists in the stream of data changes. In response to determining that the gap exists in the stream of data changes, a reference snapshot is requested from the source system. A current state of the hot standby version of at least the portion of the object maintained at the recovery system is caused to be updated to a state of the portion of the object associated with the reference snapshot.

19 Claims, 23 Drawing Sheets

(56) References Cited

U.S. PATENT DOCUMENTS

| | | | |
|---|---|---|---|
| 8,112,661 B1 | 2/2012 | La France | |
| 8,190,583 B1 | 5/2012 | Shekar | |
| 8,312,471 B2 | 11/2012 | Davis | |
| 8,364,648 B1 | 1/2013 | Sim-Tang | |
| 8,364,652 B2 * | 1/2013 | Vijayan | G06F 16/9014 707/694 |
| 8,364,920 B1 * | 1/2013 | Parkison | G06F 11/1453 711/161 |
| 8,607,342 B1 | 12/2013 | Liao | |
| 9,268,689 B1 | 2/2016 | Chen | |
| 9,304,864 B1 | 4/2016 | Bushman | |
| 9,311,190 B1 | 4/2016 | Bushman | |
| 9,361,185 B1 | 6/2016 | Bushman | |
| 9,396,202 B1 * | 7/2016 | Drobychev | G06F 16/178 |
| 9,471,441 B1 | 10/2016 | Lyadvinsky | |
| 9,489,230 B1 | 11/2016 | Patwardhan | |
| 9,594,514 B1 | 3/2017 | Bono | |
| 9,621,428 B1 | 4/2017 | Lev | |
| 9,983,812 B1 | 5/2018 | Don | |
| 10,037,223 B2 | 7/2018 | Park | |
| 10,089,148 B1 * | 10/2018 | Blitzer | G06F 9/5027 |
| 10,162,528 B2 | 12/2018 | Sancheti | |
| 10,169,077 B1 | 1/2019 | Sigl, Sr. | |
| 10,175,896 B2 | 1/2019 | Battaje | |
| 10,275,321 B1 | 4/2019 | Bajaj | |
| 10,496,497 B1 | 12/2019 | Yadav | |
| 10,503,612 B1 | 12/2019 | Wang | |
| 10,545,776 B1 | 1/2020 | Kowalski | |
| 10,628,270 B1 * | 4/2020 | Bajaj | G06F 11/1471 |
| 10,877,928 B2 | 12/2020 | Nagrale | |
| 10,896,097 B1 | 1/2021 | Purcell | |
| 11,036,594 B1 | 6/2021 | Shats | |
| 11,042,452 B1 * | 6/2021 | McNutt | G06F 11/1466 |
| 11,086,545 B1 | 8/2021 | Dayal | |
| 11,176,154 B1 | 11/2021 | Dasgupta | |
| 11,275,834 B1 | 3/2022 | Offer | |
| 2003/0033344 A1 | 2/2003 | Abbott | |
| 2004/0250033 A1 | 12/2004 | Prahlad | |
| 2005/0055520 A1 | 3/2005 | Kappler | |
| 2005/0243817 A1 * | 11/2005 | Wrenn | H04L 69/329 370/389 |
| 2006/0069861 A1 | 3/2006 | Amano | |
| 2006/0182255 A1 | 8/2006 | Luck, Jr. | |
| 2007/0153675 A1 | 7/2007 | Baglin | |
| 2008/0208926 A1 | 8/2008 | Smoot | |
| 2009/0089657 A1 | 4/2009 | Davis | |
| 2009/0171707 A1 | 7/2009 | Bobak | |
| 2009/0313503 A1 | 12/2009 | Atluri | |
| 2009/0327445 A1 | 12/2009 | Van Rietschote | |
| 2010/0031170 A1 | 2/2010 | Carullo | |
| 2010/0070725 A1 | 3/2010 | Prahlad | |
| 2010/0106933 A1 | 4/2010 | Kamila | |
| 2010/0122248 A1 | 5/2010 | Robinson | |
| 2011/0022879 A1 | 1/2011 | Chavda | |
| 2011/0106776 A1 | 5/2011 | Vik | |
| 2011/0107246 A1 | 5/2011 | Vik | |
| 2012/0203742 A1 | 8/2012 | Goodman | |
| 2013/0006943 A1 | 1/2013 | Chavda | |
| 2013/0179481 A1 | 7/2013 | Halevy | |
| 2013/0191347 A1 | 7/2013 | Bensinger | |
| 2013/0219135 A1 | 8/2013 | Knowles | |
| 2013/0227558 A1 | 8/2013 | Du | |
| 2013/0232480 A1 | 9/2013 | Winterfeldt | |
| 2013/0232497 A1 | 9/2013 | Jalagam | |
| 2013/0254402 A1 | 9/2013 | Anand | |
| 2013/0262387 A1 | 10/2013 | Varadharajan | |
| 2013/0322335 A1 | 12/2013 | Smith | |
| 2014/0040206 A1 | 2/2014 | Ramakrishnan | |
| 2014/0052692 A1 | 2/2014 | Zhang | |
| 2014/0059306 A1 | 2/2014 | Bender | |
| 2014/0165060 A1 | 6/2014 | Muller | |
| 2014/0297588 A1 | 10/2014 | Babashetty | |
| 2014/0359229 A1 | 12/2014 | Cota-Robles | |
| 2014/0372553 A1 | 12/2014 | Blackburn | |
| 2015/0193487 A1 | 7/2015 | Demidov | |
| 2015/0254150 A1 | 9/2015 | Gordon | |
| 2015/0269032 A1 * | 9/2015 | Muthyala | G06F 16/178 707/649 |
| 2015/0278046 A1 | 10/2015 | Zellermayer | |
| 2015/0347242 A1 | 12/2015 | Martos | |
| 2015/0363270 A1 | 12/2015 | Hammer | |
| 2015/0370502 A1 | 12/2015 | Aron | |
| 2015/0378765 A1 | 12/2015 | Singh | |
| 2016/0004450 A1 | 1/2016 | Lakshman | |
| 2016/0034356 A1 | 2/2016 | Aron | |
| 2016/0048408 A1 | 2/2016 | Madhu | |
| 2016/0070714 A1 | 3/2016 | D Sa | |
| 2016/0085575 A1 | 3/2016 | Dornemann | |
| 2016/0085636 A1 | 3/2016 | Dornemann | |
| 2016/0098323 A1 | 4/2016 | Mutha | |
| 2016/0125059 A1 | 5/2016 | Jain | |
| 2016/0162378 A1 | 6/2016 | Garlapati | |
| 2016/0188898 A1 | 6/2016 | Karinta | |
| 2016/0203060 A1 | 7/2016 | Singh | |
| 2016/0232061 A1 | 8/2016 | Gaschler | |
| 2016/0321339 A1 | 11/2016 | Tekade | |
| 2016/0357640 A1 | 12/2016 | Bushman | |
| 2016/0357641 A1 | 12/2016 | Bushman | |
| 2016/0357769 A1 | 12/2016 | Bushman | |
| 2017/0031613 A1 | 2/2017 | Lee | |
| 2017/0031622 A1 | 2/2017 | Nagarajan | |
| 2017/0060710 A1 | 3/2017 | Ramani | |
| 2017/0060884 A1 | 3/2017 | Goodman | |
| 2017/0123935 A1 | 5/2017 | Pandit | |
| 2017/0168903 A1 | 6/2017 | Dornemann | |
| 2017/0185488 A1 * | 6/2017 | Kumarasamy | G06F 11/2038 |
| 2017/0185491 A1 | 6/2017 | Hajare | |
| 2017/0185729 A1 | 6/2017 | Boray | |
| 2017/0193116 A1 | 7/2017 | Wong | |
| 2017/0206212 A1 | 7/2017 | Srivilliputtur Mannarswamy | |
| 2017/0212680 A1 | 7/2017 | Waghulde | |
| 2017/0262347 A1 | 9/2017 | Dornemann | |
| 2017/0337109 A1 | 11/2017 | Ramu | |
| 2018/0004437 A1 | 1/2018 | Battaje | |
| 2018/0004764 A1 | 1/2018 | Sudarsanam | |
| 2018/0060106 A1 | 3/2018 | Madtha | |
| 2018/0060187 A1 | 3/2018 | Chavda | |
| 2018/0081766 A1 | 3/2018 | Ghuge | |
| 2018/0081902 A1 | 3/2018 | McKenzie | |
| 2018/0088973 A1 | 3/2018 | Subhraveti | |
| 2018/0095846 A1 | 4/2018 | Sanakkayala | |
| 2018/0113625 A1 | 4/2018 | Sancheti | |
| 2018/0196820 A1 | 7/2018 | Kremer | |
| 2018/0212896 A1 | 7/2018 | Chang | |
| 2018/0253414 A1 | 9/2018 | Hailpern | |
| 2018/0293374 A1 | 10/2018 | Chen | |
| 2018/0316577 A1 | 11/2018 | Freeman | |
| 2018/0329637 A1 | 11/2018 | Battaje | |
| 2019/0065277 A1 | 2/2019 | Raikov | |
| 2019/0073276 A1 | 3/2019 | Yuen | |
| 2019/0108266 A1 | 4/2019 | Manvar | |
| 2019/0129799 A1 | 5/2019 | Kumarasamy | |
| 2019/0132203 A1 | 5/2019 | Wince | |
| 2019/0197020 A1 | 6/2019 | Yap | |
| 2019/0215358 A1 | 7/2019 | Kobayashi | |
| 2019/0220198 A1 | 7/2019 | Kashi Visvanathan | |
| 2019/0228097 A1 | 7/2019 | Kassa | |
| 2019/0278662 A1 | 9/2019 | Nagrale | |
| 2019/0278663 A1 | 9/2019 | Mehta | |
| 2020/0026538 A1 | 1/2020 | Cui | |
| 2020/0034254 A1 | 1/2020 | Natanzon | |
| 2020/0057567 A1 | 2/2020 | Hutcheson | |
| 2020/0057669 A1 | 2/2020 | Hutcheson | |
| 2020/0110755 A1 | 4/2020 | Waldman | |
| 2020/0142865 A1 | 5/2020 | Manjunath | |
| 2020/0159625 A1 | 5/2020 | Hutcheson | |
| 2020/0167238 A1 | 5/2020 | Killamsetti | |
| 2020/0183794 A1 | 6/2020 | Dwarampudi | |
| 2020/0233571 A1 | 7/2020 | Yuravlivker | |
| 2020/0278274 A1 | 9/2020 | Shetty | |
| 2020/0285449 A1 | 9/2020 | McIntosh | |
| 2020/0394072 A1 | 12/2020 | Sreekantaswamy | |
| 2021/0056203 A1 | 2/2021 | Qiao | |
| 2021/0081087 A1 | 3/2021 | Wayne | |

(56) References Cited

U.S. PATENT DOCUMENTS

| | | | |
|---|---|---|---|
| 2021/0081432 A1* | 3/2021 | Grunwald | G06F 11/1471 |
| 2021/0103556 A1 | 4/2021 | Nagrale | |
| 2021/0117293 A1 | 4/2021 | Luo | |
| 2021/0232579 A1 | 7/2021 | Schechter | |
| 2021/0318851 A1 | 10/2021 | Sahu | |
| 2021/0382771 A1 | 12/2021 | Schniebel | |
| 2021/0385254 A1 | 12/2021 | Pettit | |
| 2022/0035714 A1 | 2/2022 | Schultz | |
| 2022/0138057 A1 | 5/2022 | Juniwal | |
| 2022/0179748 A1 | 6/2022 | Agarwal et al. | |

OTHER PUBLICATIONS

"Backup Solution Guide"—Synology https://download.synology.com/download/www-res/brochure/backup_solution_guide_en-global.pdf (Year: 2019).

"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).

Actifio. "Getting Started with Actifio VDP." Sep. 23, 2020. https://web.archive.org/web/20200923181125/https://docs.actifio.com/10.0/PDFs/Introducing.pdf (Year: 2020).

C. Grace. "Site Recovery Manager Technical Overview." Dec. 1, 2020. https://web.archive.org/web/20201201181602/https://core.vmware.com/resource/site-recovery-manager-technical-overview (Year: 2020).

Cloud Endure. "Cloud Endure Documentation." Dec. 1, 2020. https://web.archive.org/web/20201201022045/https://docs.cloudendure.com/CloudEndure%20Documentation.htm (Year: 2020).

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.redhat.com/documentation/en-us/red_hat_virtualization/4.3/html/product_guide/index (Year: 2019).

VMware. "Site Recovery Manager Administration." May 31, 2019. https://docs.vmware.com/en/Site-Recovery-Manager/8.5/srm-admin-8-5.pdf (Year: 2019).

VMware. "Site Recovery Manager Evaluation Guide." Oct. 19, 2020. https://web.archive.org/web/20201019155135/https://core.vmware.com/resource/site-recovery-manager-evaluation-guide (Year: 2020).

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).

* cited by examiner

STANDBYS FOR CONTINUOUS DATA PROTECTION-ENABLED OBJECTS

CROSS REFERENCE TO OTHER APPLICATIONS

This application is a continuation of U.S. patent application Ser. No. 17/540,630 entitled STANDBYS FOR CONTINUOUS DATA PROTECTION-ENABLED OBJECTS filed Dec. 2, 2021, which claims priority to U.S. Provisional Patent Application No. 63/122,722 entitled STANDBYS FOR CONTINUOUS DATA PROTECTION-ENABLED OBJECTS filed Dec. 8, 2020, each of which is incorporated herein by reference for all purposes.

BACKGROUND OF THE INVENTION

A data management provider may provide disaster recovery services for one or more objects associated with an entity. Examples of objects include files, databases, virtual machine (VM), applications, containers, pods, etc. An entity may correspond to a user, an individual, an enterprise, a government, a company, an organization, etc. A source system may host the one or more objects associated with the entity.

A user associated with the entity may specify a data protection intent that indicates a primary site, a disaster recovery site, a specified recovery point objective (RPO) and a specified recovery time objective (RTO) for one or more of the objects associated with the entity. RPO is a measure of the acceptable amount of data loss for the one or more objects after a disruption of the source system. RTO is a measure of how fast the one or more objects need to be back online after the disruption. The combination of the specified RPO and the specified RTO may require a corresponding hot standby for each of the one or more objects to be generated and maintained. A hot standby is a replica of an object associated with the source system that is up-to date and ready to use within the specified RTO.

Other systems may generate a corresponding hot standby for each of the one or objects at a disaster recovery site by sending real-time updates from a primary site source system to a disaster recovery site system. However, sending updates directly from the primary site source system to the disaster recovery site system may reduce the performance of the primary site source system because sending the real-time updates may use resources (e.g., processing resources, network resources) that the source system needs to execute the one or more objects.

BRIEF DESCRIPTION OF THE DRAWINGS

Various embodiments of the invention are disclosed in the following detailed description and the accompanying drawings.

DETAILED DESCRIPTION

Figure 1A:
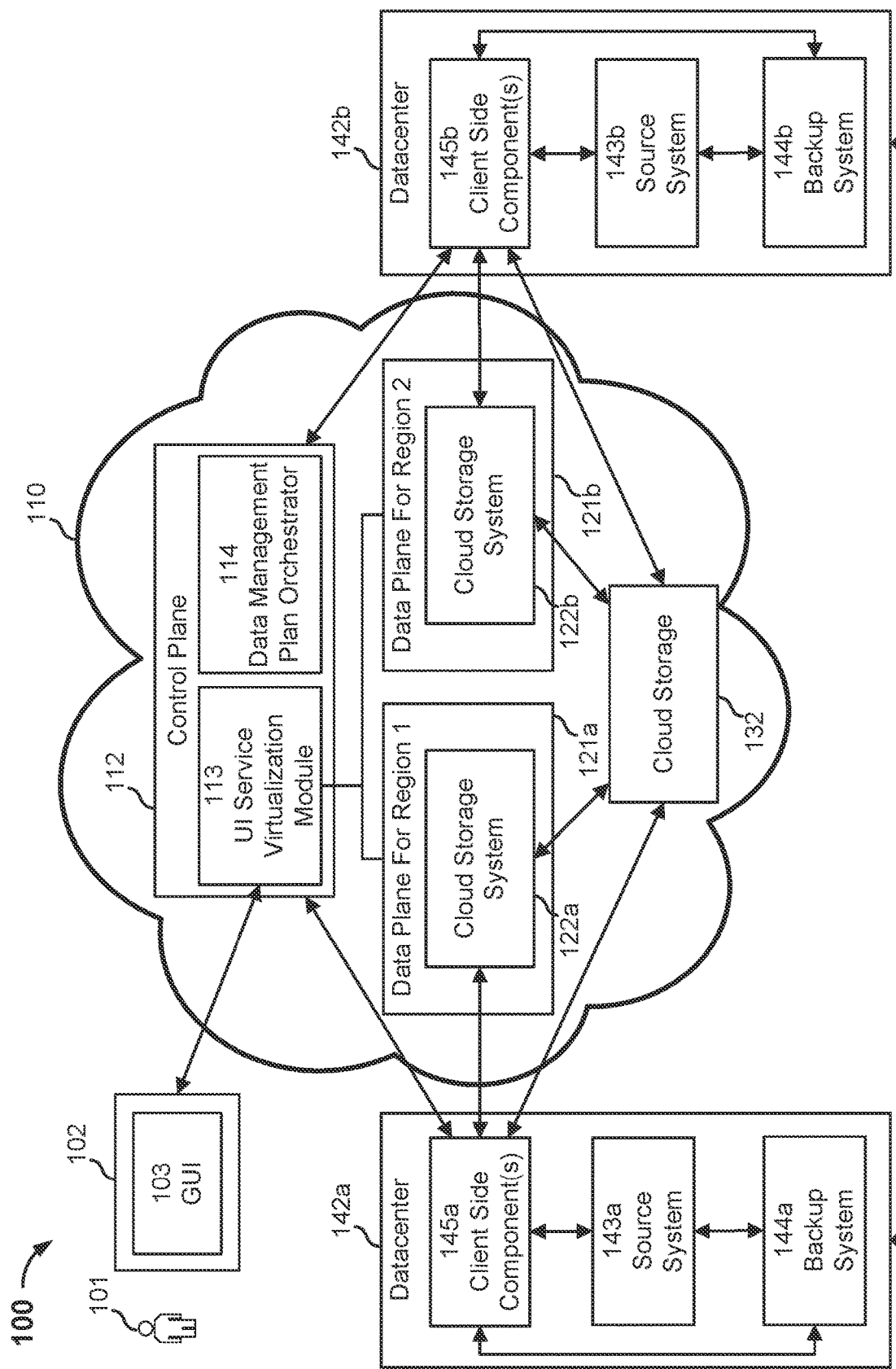
FIG. 1A is a block diagram illustrating a system for generating hot standbys for continuous data protection-enabled objects in accordance with some embodiments.

A technique to generate hot standbys for continuous data protection-enabled objects is disclosed herein. A source system may host one or more objects. In the event of a failure of an object hosted on the source system or a failure of the source system itself, the technique disclosed herein minimizes the amount of downtime associated with the object. Other systems may restore the object from a backup, which may take a long time to perform. Other systems may generate a hot standby for an object at a disaster recovery site by sending real-time updates from a primary site source system to a disaster recovery site system. However, this may reduce the performance of the primary site source system because sending the real-time updates may use resources (e.g., processing resources, network resources) that the source system needs to execute the one or more objects.

A user associated with an entity may specify, via a graphical user interface (GUI) associated with a user device, a data protection intent for one or more objects hosted by the source system. The data protection intent includes an indication of a data pool and one or more data management services (e.g., backup, restore, disaster recovery, replication, migration, analytics, compliance, security, etc.) that are to be applied to the data pool.

A data pool is a description of one or more objects to be included in the data pool. When the one or more data management services are performed, the one or more data management services are performed with respect to the one or objects specified by the data pool. The description may indirectly and/or directly identify the one or more objects. An object may be associated with one or more tags, labels, features, and/or prefixes (e.g., a naming convention). The one or more objects included in the data pool may change over time. For example, the description may be assessed immediately (e.g., as soon as the intent-based data management plan is validated, according a schedule, each time a service is performed, etc.). A user may specify the one or more objects to be included in the data pool when the one or more data management services are performed based on a tag, label, feature, and/or prefix associated with an object.

The one or more objects included in the data pool may change over time. Objects may be added to or removed from a data pool. For example, a first set of objects may be included in the data pool according to the data pool description at a first point in time when a first instance of a first management service is performed. The first management service may be performed for one or more objects having a first tag. After the first management service is performed, the first tag may be removed from one or more objects included in the first set of objects. A second set of objects may be included in the data pool according to the data pool description at a second point in time when a second instance of the first management service is performed. The second set of objects may include the one or more objects that were included in the first set of objects that still have the first tag, but exclude the one or more objects that were included in the first set of objects, but no longer have the first tag.

The data protection intent specification may include a disaster recovery plan, i.e., a data management service, for the one or more objects to be included in the data pool when the disaster recovery plan is performed. The disaster recovery plan may indicate a primary site associated with each of the one or more objects, a disaster recovery site associated with each of the one or more objects, a specified RPO for the one or more objects, and/or a specified RTO for the one or more objects. The data protection intent specification may be provided from the user device to a data management plan orchestrator.

The data management plan orchestrator may analyze the data protection intent specification to determine configurations for one or more data storage services needed to achieve the data protection intent specification. The one or more data storage services may include protection jobs, sync-replication, and/or hot-standby. The data protection intent specification analysis may identify one or more types of objects specified to be included in the data pool when the disaster recovery plan is performed. For example, the data management plan orchestrator may identify, based on tags, labels, and/or features associated with a particular object (e.g., file size, creation date, ownership, last modification date, etc.), whether the particular object is a high input/output(IO) object (e.g., an object having a number of IOs/min greater than or equal to an IO threshold), whether the particular object is a low IO object (e.g., an object having a number of IOs/min less than or equal to the IO threshold), performance requirements associated with the particular object, etc.

The data management plan orchestrator may determine protection jobs for the one or more objects to be included in the data pool when the disaster recovery plan is performed based on a specified RPO included in the data protection intent specification and the data protection intent specification analysis. In some embodiments, the data management plan orchestrator determines that a scheduled backup (e.g., every hour, every six hours, daily, etc.) is sufficient to achieve the specified RPO for an object. In some embodiments, the data management plan orchestrator determines that continuous data protection (CDP) needs to be enabled to achieve the specified RPO for an object. When enabling CDP, the data management plan orchestrator may increase a rate at which data associated with an object is backed up from a source system hosting the object to a backup system without reducing a performance associated with the object. CDP may also reduce the amount of data associated with an object that is lost as a result of the source system going offline.

The data management plan orchestrator may automatically enable CDP for one or more objects to be included in the data pool when the disaster recovery plan is performed that are determined to need CDP to achieve a specified RPO by providing to a backup system associated with the source system one or more commands to enable CDP for the one or more objects determined to need CDP to achieve the specified RPO. In response to receiving the one or more commands, the backup system may provide to the source system a request to perform a corresponding reference snapshot and a corresponding write filter for each of the one or more objects determined to need CDP to achieve the specified RPO and enable on the backup system a CDP service to handle write IOs. In some embodiments, the source system includes a corresponding write filter for each of the one or more objects and the one or more commands enable the corresponding write filters. In response to receiving the request to perform a corresponding reference snapshot, the source system may perform a full backup snapshot and include all of the object data associated with the one or more objects determined to need CDP to achieve the specified RPO. The backup system may ingest the data included in the reference snapshot and generate a tree data structure for the one or more objects determined to need CDP to achieve the specified RPO. In some embodiments, the tree data structure includes a snapshot tree for an object and one or more metadata structures that corresponding to one or more object files associated with the object. In some embodiments, the tree data structure is a snapshot tree for some or all of the objects hosted on the source system and a corresponding metadata structure for each of the one or more objects hosted by the source system that are to be included in the data pool when the disaster recovery plan is performed. The tree data structure corresponding to the reference snapshot may be a reference restoration point for an object and may be referred to as a "view corresponding to a reference restoration point."

In response to receiving a write filter, the source system may attach the corresponding write filter to each of the one or more objects determined to need CDP to achieve the specified RPO. A write filter may be configured to intercept all IOs of an associated object, filter the read IOs, and provide a stream of the intercepted write IOs to the backup system. The write filter may be configured to attach a sequence number to each intercepted write IO. In some embodiments, the backup system is configured to provide an IO filter daemon to the source system. The IO filter daemon of the source system may be configured to receive the intercepted write IOs from each of the write filters of the source system and to provide the intercepted write IOs from each of the write filters of the source system to the backup system.

The backup system may include one or more CDP services that are configured to receive one or more intercepted write IOs from the IO filter daemon of the source system. Each cluster node of the backup system may have a corresponding CDP service. The IO filter daemon may select one of the one or more CDP services and provide the intercepted write IOs associated with a particular object to the selected CDP service. A CDP service may maintain a corresponding log for each of the CDP-enabled objects to store the one or more intercepted write IOs received from the IO filter daemon of the source system. Each entry of a log may store the metadata associated with an intercepted write IO. For example, the metadata associated with an intercepted write IO may include at least one of the following: sequence number, timestamp, IO offset, IO length, IO data bytes, VM universally unique identifier (UUID), VM disk (VMDK) full path on a host at which the VM is running, etc.

The data management plan orchestrator may determine a sync-replication configuration for the one or more objects to be included in the data pool when the disaster recovery plan is performed based on the specified RPO and the specified RTO included in the data protection intent specification, and the data protection intent specification analysis. Sync-replication is the process of synchronously replicating data that is backed up data from the backup system to a destination system, such as a disaster recovery site. If the specified RTO is less than or equal to a RTO threshold duration (e.g., 5 minutes), the sync-replication configuration may require a hot standby to be created for some or all of the one or more objects (e.g., the CDP-enabled objects) to be included in the data pool when the disaster recovery plan is performed. If the specified RTO is greater than the RTO threshold duration, the sync-replication configuration may not require a hot standby to be created for some or all of the one or more objects included in the data pool when the disaster recovery plan is performed.

The determined sync-replication configuration may indicate a frequency at which write IOs stored in the log maintained by the CDP service are streamed to a hot standby based on the specified RPO. If the specified RPO is less than or equal to a RPO threshold duration (e.g., 5 minutes), the sync-replication configuration may require write IOs logged by the CDP service associated with the backup system to be streamed from the backup system to the hot standby as the write IOs are received by the CDP service associated with the backup system from the source system. If the specified RPO is greater than the RPO threshold duration, the sync-replication configuration may require write IOs logged by the CDP service associated with the backup system to be streamed from the backup system to the hot standby at a frequency that allows the specified RPO to be achieved (e.g., every 30 minutes, hourly, etc.). The backup system may batch the write IOs logged by CDP service associated with the backup system and send a batch of write IOs to the disaster recovery site system hosting the hot standby.

The data management plan orchestrator may determine a hot-standby configuration for the one or more objects to be included in the data pool when the disaster recovery plan is performed based on the specified RPO and the specified RTO included in the data protection intent specification, and the data protection intent specification analysis. In some embodiments, the data management plan orchestrator may determine that the specified RPO and the specified RTO may be achieved by generating at a disaster recovery site system specified in the data protection intent specification a corresponding hot standby for some or all of the one or more objects to be included in the data pool. In some embodiments, the data management plan orchestrator may determine that the specified RPO and the specified RTO may be achieved by generating on the backup system a corresponding hot standby for some or all of the one or more objects to be included in the data pool when the disaster recovery plan is performed. The data management plan orchestrator may establish this hot-standby configuration even though it may not be required by the data protection intent specification because the disaster recovery plan specified by the data protection intent specification may be unable to be satisfied or and/or reduces overall system resources needed to setup and achieve the disaster recovery plan specified by the data protection intent specification.

The data management plan orchestrator may implement the sync-replication configuration and the hot-standby configuration by sending to the backup system one or more commands to replicate data associated with one or more objects determined to need a hot standby to achieve the specified RTO to a recovery system. In response to receiving the one or more commands, the backup system may provide to the recovery system one or more instructions to generate a hot standby for each of the one or more objects determined to need a hot standby and data included in a reference snapshot associated with each of the one or more objects determined to need a hot standby. In response to receiving the one or more instructions and the data, the recovery system may generate a corresponding hot standby for each of the one or more objects determined to need a hot standby and populate the corresponding hot standbys with the data. The backup system may send to the recovery system write IOs logged by the CDP service associated backup system based on the determined sync-replication configuration. In response to receiving a write IO or a group of write IOs, the recovery system may update a hot standby to which the write IO applies.

Techniques to update a hot standby are disclosed herein. In some embodiments, the hot standby may be rolled back to a specified recovery time point. Using the disclosed techniques, a hot standby corresponding to a CDP-enabled object may be rolled back or forward to any point in time for which there is an associated entry stored in the log maintained by the CDP service of the backup system. A hot standby corresponding to CDP-enabled object hosted on a source system may need to be rolled back to a specified recovery time point for one or more reasons. For example, the CDP-enabled object may have become infected with malware, subject to ransomware, critical data may have been permanently deleted, etc. Other systems may restore an object from a backup. However, restoring the object from a backup may not satisfy an RTO associated with the object. Other systems may identify a restoration point that occurred before the specified moment in time, generate a standby that corresponds to the identified restoration point, and apply the write IOs included in the log from the restoration point to the specified moment in time. However, this process may take a long time to perform and may be stale (e.g., the standby is missing more recent write IOs) by the time the standby is ready to be used. In contrast, the disclosed techniques herein identify a minimal set of data chunks that need to be applied to the hot standby to roll back the hot standby to the specified moment in time in a manner that allows the RTO associated with the object to be achieved.

Rolling back the hot standby that corresponds to the CDP-enabled object to a specified recovery time point may include cloning the hot standby (e.g., fast clone). The backup system may send to a recovery system hosting the hot standby one or more instructions to clone the hot standby. In response to receiving the one or more instructions, the recovery system may clone the hot standby. For the example, the hot standby clone may be a VM clone. The backup system may still be streaming write IOs associated with the CDP-enabled object to the hot standby that corresponds to the CDP-enabled object. Cloning the hot standby may pause a state of the hot standby and prevent the streamed IOs from being applied to the hot standby. The backup system may identify a log entry that corresponds to the specified recovery time point. The backup system may generate a view that corresponds to the specified recovery time point by identifying a closest reference restoration point that occurs before the specified recovery time point, cloning the view that corresponds to the closest reference restoration point, and applying to the cloned view the logged write IOs that occurred from the closest reference restoration point to the specified recovery time point.

The backup system may generate a view that corresponds to a current state of the cloned hot standby by identifying a closest reference restoration point that occurs before a point in time that corresponds to the current state of cloned hot standby, cloning the view that corresponds to the closest reference restoration point, and applying to the cloned view the logged write IOs that occurred from the closest reference restoration point to point in time that corresponds to the current state of the cloned hot standby.

The backup system may determine the one or more differences between the view that corresponds to the specified recovery point in time and the view that corresponds to the current state of the cloned hot standby by traversing the views to determine one or more non-shared data chunks. The backup system may determine which of the one or more non-shared data chunks are associated with the view that corresponds to the specified recovery point in time. The backup system may send the one or more determined data chunks to a recovery system hosting the hot standby (e.g., the disaster recovery site system, the backup system). In response to receiving the one or more determined data chunks, the recovery system hosting the hot standby may apply the one or more received data chunks to the cloned hot standby to roll back the cloned hot standby to the specified moment in time. Subsequently, a user associated with the entity or an application associated with the entity may be given access to the cloned hot standby.

In some embodiments, the hot standby may be rolled forward to a specified recovery time point. The hot standby may be rolled forward to a specified recovery time point for one or more reasons. For example, there may be a gap in write IOs associated with a CDP-enabled object that are logged by a backup system CDP service. As a result, the hot standby corresponding to a CDP-enabled object may be in an inconsistent state with respect to the CDP-enabled object hosted on the source system because one or more missing write IOs may not be applied to the hot standby corresponding to the CDP-enabled object.

A backup system may receive from a source system a stream of write IOs. Each of the write IOs is associated with a sequence number. The backup system may determine that the stream of write IOs is missing one or more write IOs based on the sequence numbers of the stream of write IOs. For example, the sequence number may be represented as [incarnation ID, change ID] and the stream of logged IOs may have a sequence of [0, 0], [0, 1], [0, 2], [0, 3], [0, 5]. In this example, an IO with a sequence number of [0, 4] is missing.

A CDP service associated with the backup system may inspect a log for the stream of write IOs associated with a CDP-enabled object and determine that one or more write IOs are missing from the log (e.g., a gap) based on the corresponding sequence numbers of the write IOs. In response to determining that a gap exists, the backup system may request the source system to perform a reference snapshot (e.g., a full snapshot) for the CDP-enabled object. In response to the request, the source system may insert a snapshot marker in the stream of IOs associated with the CDP-enabled object and perform the reference snapshot. The snapshot marker may indicate that a full reference restoration point was generated for the CDP-enabled object. The reference snapshot may include all of the data associated with a CDP-enabled object (e.g., metadata and content data). In response to receiving the reference snapshot, the backup system may perform a backup of the received data and generate a view that corresponds to the reference restoration point.

The backup system may send to the recovery system hosting the hot standby one or more instructions to clone the hot standby and in response to the one or more instructions, the recovery system hosting the hot standby may clone the hot standby. For example, the hot standby clone may be a VM clone. The backup system may still be streaming write IOs to the hot standby. Cloning the hot standby may pause a state of the hot standby and prevent the streamed IOs from being applied to the hot standby. A log entry that corresponds to a current state of the cloned hot standby may be identified. The backup system may generate a view that corresponds to a current state of the cloned hot standby by identifying a closest reference restoration point that occurs before the current state of cloned hot standby, cloning the view that corresponds to the closest reference restoration point, and applying to the cloned view the logged write IOs that occurred from the closest reference restoration point to the current state of the cloned hot standby.

The backup system may determine the one or more differences between the view that corresponds to the reference restoration point and the view that corresponds to the current state of the hot standby by traversing the views to determine one or more non-shared data chunks. The backup system may determine which of the one or more non-shared data chunks are associated with the view that corresponds to the reference restoration point. The backup system may send the one or more determined data chunks to the recovery system hosting the hot standby. In response to receiving the one or more determined data chunks, the recovery system hosting the hot standby may apply the one or more received data chunks to the cloned hot standby to fill in the gaps. Subsequently, the cloned hot standby is in a state to which the CDP-enabled object hosted on the source system may be replicated. The backup system may continue to stream one or more write IOs included in a log from the backup system to the cloned hot standby.

In some embodiments, one or more write IOs included in the stream may not be applied to the hot standby. The recovery system hosting the hot standby may include a CDP service. The CDP service may apply one or more write IOs included in the stream to the hot standby. The CDP service may determine that one or more write IOs were not applied to the hot standby based on a sequence number associated with the one or more write IOs. For example, the CDP service may determine a gap exists in the one or more write IOs based on the sequence numbers associated with the one or more write IOs. The recovery system hosting the hot standby may determine the last write IO that was applied to the hot standby before the one or more missing write IOs based on a sequence number associated with the last write IO. The recovery system hosting the hot standby may send to the backup system a command to replay the stream of write IOs from the sequence number associated with the last write IO that was applied to the hot standby. In response to receiving the command, the backup system may replay the stream of write IOs from the sequence number associated with the last write IO that was applied to the hot standby by sending to the recovery system hosting the hot standby the one or more write IOs that occurred after the last write IO that was applied to the hot standby. In response to receiving the one or more write IOs, the CDP service of the system hosting the hot standby may apply the one or more write IOs to the hot standby.

FIG. 1A is a block diagram illustrating a system for generating hot standbys for continuous data protection-enabled objects in accordance with some embodiments. In the example shown, system 100 enables user 101 to establish, via a graphical user interface 103 of user device 102, a data protection intent for one or more objects. An object may have one or more sub-objects.

User device 102 may be a computer, a desktop, a laptop, a smartphone, a tablet, or any other computing device with a graphical user interface. User device 102 is associated with user 101. User 101 may be associated with an entity, such as an individual, an enterprise, a government, a company, an organization, etc. The entity may store a plurality of objects in datacenters 142a, 142b. An object may correspond to a file, a database, a VM, an application, a container, a pod, etc. Although FIG. 1 depicts the entity being associated with two datacenters, an entity may be associated with one or more datacenters.

User 101 may specify, via GUI 103, a data protection intent for the one or more objects. The data protection intent includes an indication of a data pool and one or more data management services (e.g., backup, restore, disaster recovery, replication, migration, analytics, compliance, security, etc.) that are to be applied to the data pool.

A data pool is a description of one or more objects to be included in the data pool. When one or more data management services are performed, the one or more data management services are performed with respect to the one or objects specified by the data pool. The description may indirectly and/or directly identify the one or more objects. An object may be associated with one or more tags, labels, features, and/or prefixes. User 101 may specify the one or more objects to be included in the data pool when the one or more data management services are performed based on a tag, label, feature, and/or prefix associated with an object.

A data management provider may establish a data management as a service (DmaaS) infrastructure in cloud environment 110 (e.g., public cloud, private cloud, hybrid cloud, etc.) provided by a cloud provider (e.g., Amazon Web Services™, Microsoft™ Azure, Google Cloud™, etc.). The DmaaS infrastructure may enable entities to remotely specify a data protection plan for one or more objects associated with an entity. The DmaaS infrastructure may include control plane 112 and one or more data planes, such as data planes 121a, 121b.

Control plane 112 may establish one or more data planes for an entity based on a location of the entity's datacenters. For example, datacenter 142a may be located at a first location (e.g., California) and datacenter 142b may be located at a second location (e.g., New York). The data management provider may establish data plane 121a for a first region (e.g., "West Coast") that includes the first location and data plane 121b for a second region (e.g., "East Coast") that includes the second location. A data plane may include one or more cloud storage systems that are each comprised of one or more cloud servers (e.g., EC2 instances). A data plane may be configured to control how data associated with an entity is stored in cloud storage system 122a, cloud storage system 122b, and/or cloud storage 132.

Datacenters 142a, 142b include corresponding client side component(s) 145a, 145b. The one or more client side components 145a, 145b are configured to receive from control plane 112 one or more commands to perform one or more data management services. For example, the one or more client side components 145a, 145b may receive one or more commands to back up content from corresponding source systems 143a, 143b and/or corresponding backup systems 144a, 144b to cloud storage 132 (e.g., Amazon Simple Storage Service (S3)). Client side components 145a, 145b may receive one or more commands to replicate objects having a particular tag to datacenter 142b, 142a, respectively. Client side components 145a, 145b may receive one or more commands to cause an object having a particular tag that is hosted on source systems 143a, 143b, respectively, to have a particular RPO and RTO.

A client side component, such as client side components 145a, 145b, may backup to cloud storage 132 data associated with a source system, such as source systems 143a, 143b, or data associated with a backup system, such as backup systems 144a, 144b. A cloud storage system, such as cloud storage systems 122a, 122b, may generate metadata for the data that is stored at cloud storage 132. In some embodiments, a cloud storage system, such as cloud storage system 122a, 122b, may store the generated metadata at cloud storage 132. In some embodiments, the generated metadata is stored in cloud storage system 122a, 122b. In some embodiments, a hot standby is generated at either cloud storage system 122a, 122b, or cloud storage 132.

Control plane 112 is configured to manage the DmaaS infrastructure that enables users, such as user 101, to remotely access and manage one or more objects associated with an entity. Control plane 112 includes a user interface (UI) service virtualization module 113 that enables user device 102 to communicate with the DmaaS infrastructure. UI service virtualization module 113 may receive from device 102 via GUI 103 a data protection intent specification. The data protection intent specification may include a disaster recovery plan for the one or more objects to be included in the data pool when the disaster recovery plan is performed. The disaster recovery plan may indicate a primary site associated with each of the one or more objects, a disaster recovery site associated with each of the one or more objects, a specified RPO for the one or more objects, and/or a specified RTO for the one or more objects. UI service virtualization module 113 may provide the data protection intent specification to data management plan orchestrator 114.

Data management plan orchestrator 114 may analyze the data protection intent specification to determine configurations for one or more data storage services needed to achieve the data protection intent specification. The one or more data storage services may include protection jobs, sync-replication, and/or hot-standby. The data protection intent specification analysis may identify one or more types of objects specified to be included in the data pool when the disaster recovery plan is performed. For example, data management plan orchestrator 114 may identify, based on tags, labels, and/or features associated with a particular object (e.g., file size, creation date, ownership, last modification date, etc.), whether the particular object is a high IO object (e.g., an object having a number of IOs/min greater than or equal to an IO threshold), whether the particular object is a low IO object (e.g., an object having a number of IOs/min less than or equal to the IO threshold), performance requirements associated with the particular object, etc. In some embodiments, data management plan orchestrator 114 implements a machine learning model (e.g., supervised, unsupervised, semi-supervised, regression, etc.) to identify based on tags, labels, and/or features associated with a particular object (e.g., file size, creation date, ownership, last modification date, etc.), whether the particular object is a high input/output(IO) object (e.g., an object having a number of IOs/min greater than or equal to an IO threshold), whether the particular object is a low IO object (e.g., an object having a number of IOs/min less than or equal to the IO threshold), performance requirements associated with the particular object, etc.

Data management plan orchestrator 114 may determine protection jobs for the one or more objects to be included in the data pool when the disaster recovery plan is performed based on a specified RPO included in the data protection intent specification and the data protection intent specification analysis. In some embodiments, data management plan orchestrator 114 determines that a scheduled backup (e.g., every hour, every six hours, daily, etc.) is sufficient to achieve the specified RPO for an object. In some embodiments, data management plan orchestrator 114 determines that CDP needs to be enabled to achieve the specified RPO for an object.

Data management plan orchestrator 114 may automatically enable CDP for one or more objects to be included in the data pool when the disaster recovery plan is performed that are determined to need CDP to achieve a specified RPO by providing to a backup system associated with the source system (e.g., backup systems 144a, 144b are associated with source systems 143a, 143b, respectively) one or more commands to enable CDP for the one or more objects determined to need CDP to achieve the specified RPO. In response to receiving the one or more commands, a backup system, such as backup systems 144a, 144b, may provide to a source system, such as source systems 143a, 143b, a request to perform a corresponding reference snapshot and a corresponding write filter for each of the one or more objects determined to need CDP to achieve the specified RPO and enable on the backup system a CDP service to handle write IOs. In some embodiments, source systems 143a, 143b include a corresponding write filter for each of the one or more objects and the one or more commands enable the corresponding write filters.

In response to receiving the request to perform a corresponding reference snapshot, the source system may perform a full backup snapshot and include all of the object data associated with the one or more objects determined to need CDP to achieve the specified RPO. The backup system may ingest the data included in the reference snapshot and generate a tree data structure for the one or more objects determined to need CDP to achieve the specified RPO. In some embodiments, the tree data structure includes a snapshot tree for an object and one or more metadata structures that corresponding to one or more object files associated with the object. In some embodiments, the tree data structure is a snapshot tree for all of the objects hosted on the source system and a corresponding metadata structure for each of the one or more objects hosted by the source system that are to be included in the data pool when the disaster recovery plan is performed.

In response to receiving a write filter, the source system may attach the corresponding write filter to each of the one or more objects determined to need CDP to achieve the specified RPO. A write filter may be configured to intercept all IOs of an associated object, filter the read IOs, and provide a stream of the intercepted write IOs to the backup system. The write filter may be configured to attach a sequence number to each intercepted write IO. In some embodiments, the source system hosting the one or more objects is capable of providing CDP for the one or more objects because the source system is capable of providing its own write filters. The backup system may provide to the source system a command to enable CDP for some or all of the one or more objects. In response to receiving the command, the source system may attach a corresponding write filter to each of the one or more objects determined to need CDP to achieve the specified RPO and corresponding write filters may stream the write IOs to a backup system.

In some embodiments, a backup system, such as backup system 144a, 144b, is configured to provide an IO filter daemon to a source system, such as source system 143a, 143b. The IO filter daemon of the source system may be configured to receive the intercepted write IOs from each of the write filters of the source system and to provide the intercepted write IOs from each of the write filters of the source system to the backup system.

A backup system, such as backup systems 144a, 144b, may include one or more CDP services that are configured to receive one or more intercepted write IOs from the IO filter daemon of a source system, such as source systems 143a, 143b. Each cluster node of the backup system may have a corresponding CDP service. The IO filter daemon may select one of the one or more CDP services and provide the intercepted write IOs associated with a particular object to the selected CDP service. A CDP service may maintain a log for the one or more intercepted write IOs received from the IO filter daemon of the source system. Each entry of the log may store the metadata associated with an intercepted write IO. For example, the metadata associated with an intercepted write IO may include at least one of the following: sequence number, timestamp, IO offset, IO length, IO data bytes, VM UUID, VMDK full path on a host at which the VM is running, etc.

Data management plan orchestrator 114 may determine a sync-replication configuration for the one or more objects to be included in the data pool when the disaster recovery plan is performed based on the specified RPO and the specified RTO included in the data protection intent specification, and the data protection intent specification analysis. If the specified RTO is less than or equal to an RTO threshold duration (e.g., 5 minutes), the sync-replication configuration may require a hot standby to be created for some or all of the one or more objects to be included in the data pool when the disaster recovery plan is performed. If the specified RTO is greater than the RTO threshold duration, the sync-replication configuration may not require a hot standby to be created for some or all of the one or more objects included in the data pool when the disaster recovery plan is performed.

The determined sync-replication configuration may indicate a frequency at which write IOs stored in the log maintained by the CDP service of a backup system, such as backup systems 144a, 144b, are streamed to a hot standby based on the specified RPO. If the specified RPO is less than or equal to a RPO threshold duration (e.g., 5 minutes), the sync-replication configuration may require write IOs logged by the CDP service associated with the backup system to be streamed from the backup system to the hot standby as the write IOs are received by the CDP service associated with the backup system from the source system. If the specified RPO is greater than the RPO threshold duration, the sync-replication configuration may require write IOs logged by the CDP service associated with the backup system to be streamed from the backup system to the hot standby at a frequency that allows the specified RPO to be achieved (e.g., every 30 minutes, hourly, etc.). The backup system may batch the write IOs logged by CDP service associated with the backup system and send a batch of write IOs to the disaster recovery site system hosting the hot standby.

Data management plan orchestrator 114 may determine a hot-standby configuration for the one or more objects to be included in the data pool when the disaster recovery plan is performed based on the specified RPO and the specified RTO included in the data protection intent specification, and the data protection intent specification analysis. In some embodiments, data management plan orchestrator 114 may determine that the specified RPO and the specified RTO may be achieved by generating at a disaster recovery site system specified in the data protection intent specification a corresponding hot standby for each of the one or more objects to be included in the data pool. For example, source system 143b or backup system 144b may be a disaster recovery site system for datacenter 142a and source system 143a or backup system 144a may be disaster recovery site system for datacenter 142b. In some embodiments, data management plan orchestrator 114 may determine that the specified RPO and the specified RTO may be achieved by generating on at a different disaster recovery site a corresponding hot standby for each of the one or more objects to be included in the data pool when the disaster recovery plan is performed. For example, data management plan orchestrator 114 may determine to generate for an object hosted on source system 143a a hot standby at a different disaster recovery site instead of determining to generate for the object hosted on source system 143a a hot standby on either source system 143b or backup system 144b. Data management plan orchestrator 114 may establish this hot-standby configuration even though it does not follow the data protection intent specification because the disaster recovery plan specified by the data protection intent specification may be unable to be satisfied or and/or reduces overall system resources needed to setup and achieve the disaster recovery plan specified by the data protection intent specification.

Data management plan orchestrator 114 may validate the data protection intent specification that includes the disaster recovery plan. Data management plan orchestrator 114 may determine whether the specified data protection intent is able to be achieved. In the event the specified data protection intent is unable to be achieved, data management plan orchestrator 114 may notify, via GUI 103 of device 102, user 101 that the data protection intent is unable to be achieved. In the event the intent of user 101 is able to be achieved, data management plan orchestrator 114 may orchestrate the datacenter components of system 100 that are needed to achieve the intent (e.g., client side components 145a, 145b, source systems 143a, 143b, backup systems 144a, 144b, cloud storage systems 122a, 122b, and/or cloud storage 132). For example, after validation, data management plan orchestrator may send one or more commands to one or more data storage devices needed to implement the determined configurations of the one or more data storage services to achieve the data protection intent.

Data management plan orchestrator 114 may implement the sync-replication configuration and the hot-standby configuration by sending to a backup system, such as backup systems 144a, 144b, one or more commands to replicate data associated with one or more objects determined need a hot standby to achieve the specified RTO to a recovery system. In response to receiving the one or more commands, the backup system may provide to the recovery system one or more instructions to generate a hot standby for each of the one or more objects determined to need a hot standby and data included in a reference snapshot associated with each of the one or more objects determined to need a hot standby. In response to receiving the one or more instructions and the data, the recovery system may generate a corresponding hot standby for each of the one or more objects determined to need a hot standby and populate the corresponding hot standbys with the data. In some embodiments, a VM hot standby is generated for each of the one or more objects determined to need a hot standby. The backup system may send to the recovery system write IOs logged by the CDP service associated backup system based on the determined sync-replication configuration. In response to receiving a write IO, the recovery system may update a hot standby to which the write IO applies.

In some embodiments, the data that is being backed up to a backup system is also being replicated, in parallel, to a recovery system. For example, data that is being backed up from source system 143a to backup system 144a is replicated, in parallel, to source system 143b. Source system 143b may include a hot standby that is configured to apply the data so that the hot standby mirrors a CDP-enabled object hosted on the source system.

Figure 1B:
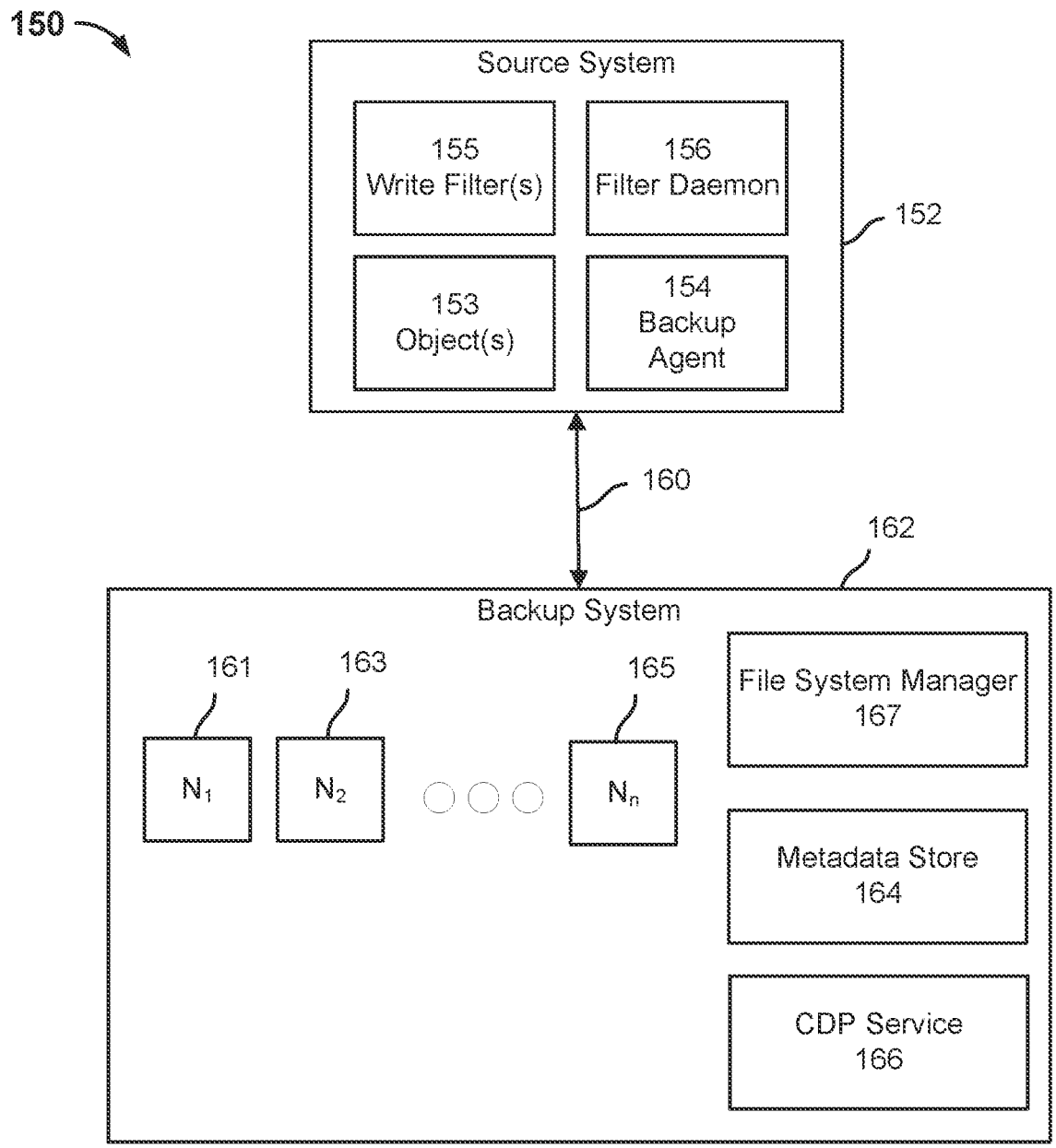
FIG. 1B is a block diagram of a system for providing continuous data protection in accordance with some embodiments.

FIG. 1B is a block diagram of a system for providing continuous data protection in accordance with some embodiments. In the example shown, system 150 is comprised of source system 152 that is coupled to backup system 162 via connection 160. Connection 160 may be a wired or wireless connection. Connection 160 may be a LAN, WAN, intranet, the Internet, and/or a combination thereof.

Source system 152 may be comprised of one or more objects 153, a backup agent 154, one or more write filters 105, and a filter daemon 106. Source system 152 may be configured to host one or more objects 153. Source system 152 may include one or more storage volumes (not shown) that are configured to store file system data associated with source system 152. The file system data associated with source system 152 includes the data associated with the one or more objects 153.

Backup agent 154 may be configured to cause source system 152 to perform a reference snapshot (e.g., a full snapshot). A full snapshot may include all of the file system data of source system 152 at a particular moment in time. In some embodiments, a full snapshot includes all of the object data associated with some or all of the one or more objects 153 at a particular moment in time. In some embodiments, backup agent 154 is running on source system 152. In some embodiments, backup agent 154 is running in one of the one or more objects 153. In some embodiments, a backup agent 154 is running on source system 152 and a separate backup agent 154 is running in one of the one or more objects 153.

In some embodiments, an object includes a backup function and is configured to perform a reference snapshot on its own without backup agent 154. In some embodiments, source system 152 includes a backup function and is configured to perform a reference snapshot on its own without backup agent 154. In some embodiments, backup system 162 may provide instructions to source system 152, causing source system 152 to execute backup functions without backup agent 154.

Backup system 162 may receive the file system data included in a reference snapshot and generate a view of the file system data. In some embodiments, a view of the file system data corresponding to the reference snapshot is generated for source system 152. In some embodiments, a view of the object data corresponding to the reference snapshot is generated for some or all of the one or more objects 153.

File system manager 167 may be configured to organize in a tree data structure the file system data and/or object data included in the reference snapshot. An example of the tree data structure is a snapshot tree, which may be based on a B+ tree structure (or other type of tree structure in other embodiments). In the event the reference snapshot corresponds to all of the file system data of source system 152, the view corresponding to the reference snapshot may be comprised of a snapshot tree and one or more object metadata structures. The snapshot tree may be configured to organize the file system data associated with source system 152. An object metadata structure may be configured to store the metadata associated with one of the one or more objects 153. The metadata associated with one of the one or more objects 153 may enable data chunks associated with the one or more objects 153 that were backed up to backup system 162 to be located. Each of the one or more objects 153 may have a corresponding metadata structure.

In the event the reference snapshot corresponds to all of the object data of one of the one or more objects 153, the view corresponding to the reference snapshot may be comprised of a snapshot tree and one or more object file metadata structures. The snapshot tree may be configured to store the metadata associated with one of the one or more objects 153. An object file metadata structure may be configured to store the metadata associated with an object file included in the object that enables the data chunks associated with the object to be located.

The tree data structure may be used to capture different reference restoration points. The tree data structure allows a chain of reference restoration points to be linked together by allowing a node of a later version of a snapshot tree associated with an intermediate reference restoration point to reference a node of a previous version of a snapshot tree. The previous version of the snapshot tree may correspond to an earlier intermediate reference restoration point or an earlier full reference restoration point. For example, a root node or an intermediate node of a snapshot tree corresponding to the later reference restoration point may reference an intermediate node or leaf node of a snapshot tree corresponding to the earlier reference restoration point.

A snapshot tree is a representation of a fully hydrated restoration point because it provides a complete view of a source system or an object at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, backup system 162 maintains fully hydrated restoration points. Any file associated with source system 152 or an object at a particular time and the file's contents, for which there is an associated reference restoration point, may be determined from the snapshot tree, regardless if the associated reference restoration was a full reference restoration point or an intermediate reference restoration point.

Backup system 162 may generate a fully hydrated restoration point that corresponds to any point in time for which there is an associated log entry. Backup system 162 may identify a closest reference restoration point that occurred before the point in time and apply write IOs included in the log from the closest reference restoration point to the point in time.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure or object metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object or an object file to be linked together by allowing a node of a later version of a metadata structure to reference a node of a previous version of a metadata structure.

A metadata structure may be associated with a plurality of chunk files. A chunk file may be comprised of a plurality of data chunks. Metadata store 164 may store one or more metadata structures. In some embodiments, a metadata structure corresponds to an object. In other embodiments, a metadata structure corresponds to an object file. In other embodiments, a metadata structure corresponds to a portion of an object. In other embodiments, a metadata structure corresponds to a portion of an object file.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 164. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

One or more write filters 155 may be attached to the one or more objects 153 prior to a reference snapshot (e.g., full snapshot) of source system 152 being initiated to provide CDP for the object to which a write filter is attached. The write filter may be attached at a disk layer of the object (e.g., disk write filter), a file system layer of the object (e.g., file system write filter), or a virtualized layer of the object (e.g., virtualized write filter). An object may be associated with one or more disks. A corresponding write filter may be attached to each of the one or more disks. A disk may be associated with one or more write filters.

Each object of the one or more objects 153 may be associated with a corresponding write filter. A write filter may be configured to intercept all IOs of an associated object, filter out the read IOs, and provide a stream of the intercepted write IOs. A write filter may be configured to attach a sequence number to each intercepted write IO. The sequence number may include an incarnation ID and a change ID. The incarnation ID may indicate an incarnation of the write filter and may be incremented each time the write filter is restarted after a crash (e.g., object crash, filter crash). In some embodiments, the incarnation ID is not incremented after a clean restart of an object. The change ID may be incremented for each intercepted write IO. For example, the sequence number may be represented as [incarnation ID, change ID]. The sequence number may be [0, 0], [0, 1] . . . [0, n]. In the event the write filter goes offline after a crash and comes back online, the incarnation ID may be incremented such that the sequence numbers attached to the intercepted write IOs may be [1, 0], [1, 1] . . . [1,n].

The one or more write filters 155 may be configured to provide their corresponding intercepted write IOs to filter daemon 156. Filter daemon 156 may be configured to collect the intercepted write IOs from the plurality of write filters 155 and stream the intercepted write IOs to backup system 162. In some embodiments, filter daemon 156 streams the intercepted write IOs as they are received. In some embodiments, filter daemon 156 is configured to stream batches of intercepted write IOs. Filter daemon 156 may be configured to cache the received intercepted write IOs until they are provided to backup system 162.

Filter daemon 156 may be configured to provide the intercepted write IOs associated with a particular object of the one or more objects 153 to a particular cluster node of cluster nodes 161, 163, 165. The number of available cluster nodes may increase (e.g., a node is added to backup system 162) or decrease (e.g., a node is offline). A particular cluster node may be assigned to a particular object. Filter daemon 106 may determine an object_ID associated with an object and stream the intercepted write IOs associated with the object_ID to a cluster node assigned to an object having the object_ID. The particular cluster node may be selected from the set of available cluster nodes based on one or more factors, such as availability of a CDP service associated with a cluster node.

Filter daemon 156 may be configured to stream the intercepted write IOs associated with a plurality of objects to corresponding cluster nodes of cluster nodes 161, 163, 165. For example, filter daemon 156 may be configured to stream the intercepted write IOs associated with a first object to cluster node 161, the intercepted write IOs associated with a second object to cluster node 163, . . . , and the intercepted write IOs associated with an nth object to cluster node 165. The intercepted write IOs associated with a plurality of objects may be streamed in parallel. In some embodiments, the intercepted write IOs associated with a plurality of objects are streamed sequentially. In some embodiments, the intercepted write IOs associated with an object are streamed to a plurality of cluster nodes.

In some embodiments, the intercepted write IOs associated with a particular object are grouped into a plurality of sets, e.g., a first set of intercepted write IOs, a second set of intercepted write IOs, . . . , and an nth set of intercepted write IOs. The different sets of IOs may be provided to different nodes of cluster nodes 161, 163, 165. For example, the first set of intercepted write IOs associated with the particular object may be provided to cluster node 161, the second set of intercepted write IOs associated with the particular object may be provided to cluster node 163, . . . , and the nth set of intercepted write IOs associated with the particular object may be provided to cluster node 165. The intercepted write IOs associated with the plurality of sets may be streamed in parallel. In some embodiments, the intercepted write IOs associated with the plurality of sets are streamed sequentially.

Backup agent 154 may cause source system 152 to perform an incremental snapshot. An incremental snapshot usually includes the data that was not previously backed up. However, the one or more write filters 105 and filter daemon 106 are configured to provide CDP for the one or more objects 153. Thus, a stream of data associated with the one or more objects 153 is continuously being provided from source system 152 to backup system 162. Instead of providing a command to perform an incremental snapshot, backup agent 154 may provide to an object a command to generate an intermediate reference restoration point. Instead of performing the incremental backup snapshot, a write filter may intercept the command as it is being provided to the object and attach a snapshot marker to the IO. The snapshot marker indicates a time at which an intermediate reference restoration point associated with the object was requested. The snapshot marker provides an intermediate reference restoration point, which may be used to identify a version of an object to be used to restore the object to a particular point in time.

In some embodiments, an application associated with an object may perform a snapshot of the object. The snapshot has an associated snapshot ID that is not identified by backup system 162. A snapshot marker has a particular snapshot ID. A snapshot marker corresponding to a snapshot initiated by backup system 162 may have an associated ID that is known to backup system 162. A snapshot marker corresponding to a snapshot initiated by an application associated with the object may have an associated ID that is unknown to backup system 162. In the event an application associated with an object performs a snapshot of the object, the snapshot may not be used as a reference restoration point because the backup system is unaware of a snapshot having the ID that is associated with the application.

Backup system 162 is comprised of a storage cluster that includes a plurality of cluster nodes 161, 163, 165. Although three cluster nodes are shown, backup system 162 may be comprised of n nodes. In some embodiments, a cluster node includes a processor and memory, and is coupled to a separate storage device. The separate storage device may include one or more storage devices (e.g., flash storage devices). A storage device may be segmented into a plurality of partitions. In some embodiments, one of the partitions is configured to store all of the backup system 162 generated metadata (e.g., snapshot trees, object metadata structures) included in metadata store 164. In some embodiments, a partition is configured to store some of the metadata store 164 and the backup system 162 generated metadata included in metadata store 164 is stored in a plurality of partitions. A node may be allocated one of the partitions that stores some of metadata store 164. Each of the cluster nodes 161, 163, 165 may be allocated one or more of the partitions. The one or more partitions allocated to a node may be configured to store data associated with some or all of the plurality of objects that were backed up to backup system 162. For example, the separate storage device may be segmented into 10 partitions and backup system 162 may include 10 cluster nodes. A cluster node of the 10 cluster nodes may be allocated one of the 10 partitions.

In some embodiments, a cluster node includes a processor, memory, and a storage device. The storage device may be configured to store metadata associated with a plurality of objects that were backed up to backup system 162, such as part or all of metadata store 164. For example, the metadata associated with the plurality of objects may include backup system 162 generated metadata (e.g., metadata that enables the data associated with the object to be located). The cluster node may be coupled to a separate storage device. The separate storage device may include one or more storage devices. A storage device may be segmented into a plurality of partitions. Each of the cluster nodes 161, 163, 165 may be allocated one or more of the partitions. The one or more partitions allocated to a node may be configured to store data associated with some or all of the plurality of objects that were backed up to backup system 162. For example, the separate storage device may be segmented into 10 partitions and backup system 162 may include 10 cluster nodes. A cluster node of the 10 cluster nodes may be allocated one of the 10 partitions.

In some embodiments, a cluster node includes a processor, memory, and one or more storage devices. A first storage device may be configured to store metadata associated with a plurality of objects that were backed up to backup system 162, such as part or all of metadata store 164. For example, the metadata associated with the plurality of objects may include backup system 162 generated metadata. A second storage device may be configured to store data associated with the plurality of objects that were backed up to backup system 162. The plurality of storage devices may include one or more solid state drives, one or more hard disk drives, or a combination thereof.

Backup system 162 may be a cloud instantiation of a backup system. A configuration of cloud instantiation of backup system 162 may be a virtual replica of backup system 162. For example, backup system 162 may be comprised of three cluster nodes, each cluster node with a storage capacity of 10 TB. A cloud instantiation of backup system 162 may be comprised of three virtual nodes, each virtual node with a storage capacity of 10 TB. In other embodiments, a cloud instantiation of backup system 162 may have more storage capacity than an on-premises instantiation of backup system 162. In other embodiments, a cloud instantiation of backup system 162 may have less storage capacity than an on-premises instantiation of backup system 162.

Backup system 162 may include CDP Service 166. In some embodiments, cluster nodes 161, 163, 165 each have a corresponding CDP Service. In other embodiments, backup system 162 has a single CDP service that is running on one of the cluster nodes 161, 163, 165. CDP Service 166 may be configured to receive one or more intercepted write IOs from filter daemon 156. Filter daemon 156 may assign a particular CDP Service 166 for a particular object. CDP Service 166 may have an associated cache. In response to receiving the one or more intercepted write IOs, CDP Service 166 may be configured to store in the associated cache, the one or more received intercepted write IOs in a log (e.g., write-ahead-log). CDP Service 166 may be configured to store a corresponding log per object. In some embodiments, CDP Service 166 is configured to store a log for a plurality of objects.

A log may be comprised of one or more entries. An entry may associate an intercepted write IO stored by CDP Service 166 with a sequence number. In some embodiments, an entry associates the intercepted write IO stored by CDP Service 166 with a sequence number and a snapshot marker. File system manager 167 may determine that the log includes an entry with a snapshot marker. In response to determining that the log includes an entry with a snapshot marker, file system manager 167 may generate a reference restoration point (e.g., a view corresponding to the reference restoration point) by updating a tree data structure corresponding to the object to be restored. In some embodiments, a snapshot tree corresponding to an object is cloned and the one or more entries included in the log are applied to the cloned snapshot tree. In some embodiments, an object metadata structure is cloned and the one or more entries included in the log are applied to the cloned object metadata structure. Each entry that includes a snapshot marker corresponds to a fully hydrated reference restoration point.

In some embodiments, file system manager 167 may detect a gap in a sequence of IOs associated with an object. For example, file system manager 167 may detect that an incarnation ID associated with a write filter attached to an object has incremented. File system manager 167 may detect that a change ID has been skipped. In response to detecting a gap in the sequence of IOs associated with an object, file system manager 167 may provide to backup agent 154 a notification of the gap. In response to receiving the notification, backup agent 154 may cause a reference snapshot of the affected object to be performed. In some embodiments, in response to receiving the notification, backup agent 154 may cause a reference snapshot of source system 152. This ensures that the data associated with an object that is backed up to backup system 162 is not corrupt because the object data is missing data.

Figure 1C:
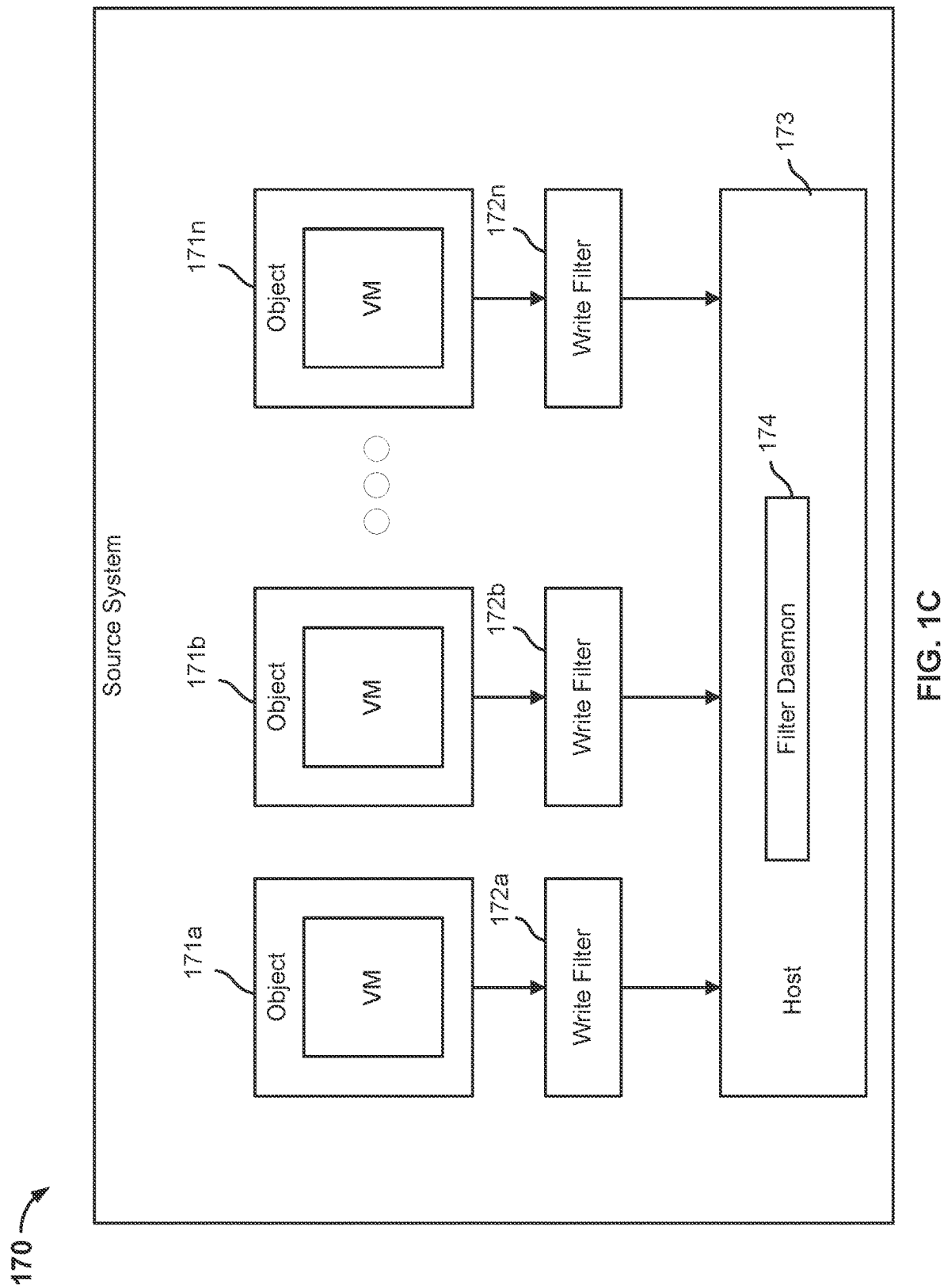
FIG. 1C is a block diagram illustrating an example of a source system in accordance with some embodiments.

FIG. 1C is a block diagram illustrating an example of a source system in accordance with some embodiments. In the example shown, source system 170 is comprised of a first object 171a, a second object 171b, . . . , and an nth object 171n. Each object may be a different VM. Although FIG. 1C depicts an object as a VM, source system 170 may host different objects, such as a database, an application, a container, a pod, etc. Each object is associated with a corresponding write filter. For example, object 171a is associated with write filter 172a, object 171b is associated with write filter 172b, and object 171n is associated with write filter 172n. A write filter may be coupled (e.g., attached) to a corresponding object prior to an initial reference snapshot (e.g., full snapshot) of the object being initiated. A write filter may be configured to intercept IOs associated with the object to which the write filter is coupled. A write filter may include a sequence number along with the intercepted write IO. In some embodiments, a write filter includes a snapshot marker in between the intercepted IOs in a stream of intercepted IOs. A write filter may be configured to provide an intercepted write IO to filter daemon 174.

Source system 170 may include a host 173 (e.g., hypervisor) that includes filter daemon 174. Filter daemon 174 may be configured to collect the intercepted write IOs and/or snapshot marker(s) provided by write filters 172a, 172b, 172n. Filter daemon 174 may be configured to stream to a backup system the intercepted write IOs and/or snapshot marker(s) as they are received. In other embodiments, filter daemon 174 is configured to stream to the backup system batches of intercepted write IOs and/or snapshot marker(s).

In some embodiments, filter daemon 174 streams the intercepted write IOs associated with a particular object to a specific cluster node of the backup system. In some embodiments, filter daemon 174 streams the intercepted write IOs associated with a particular object to a plurality of cluster nodes of the backup system.

Figure 1D:
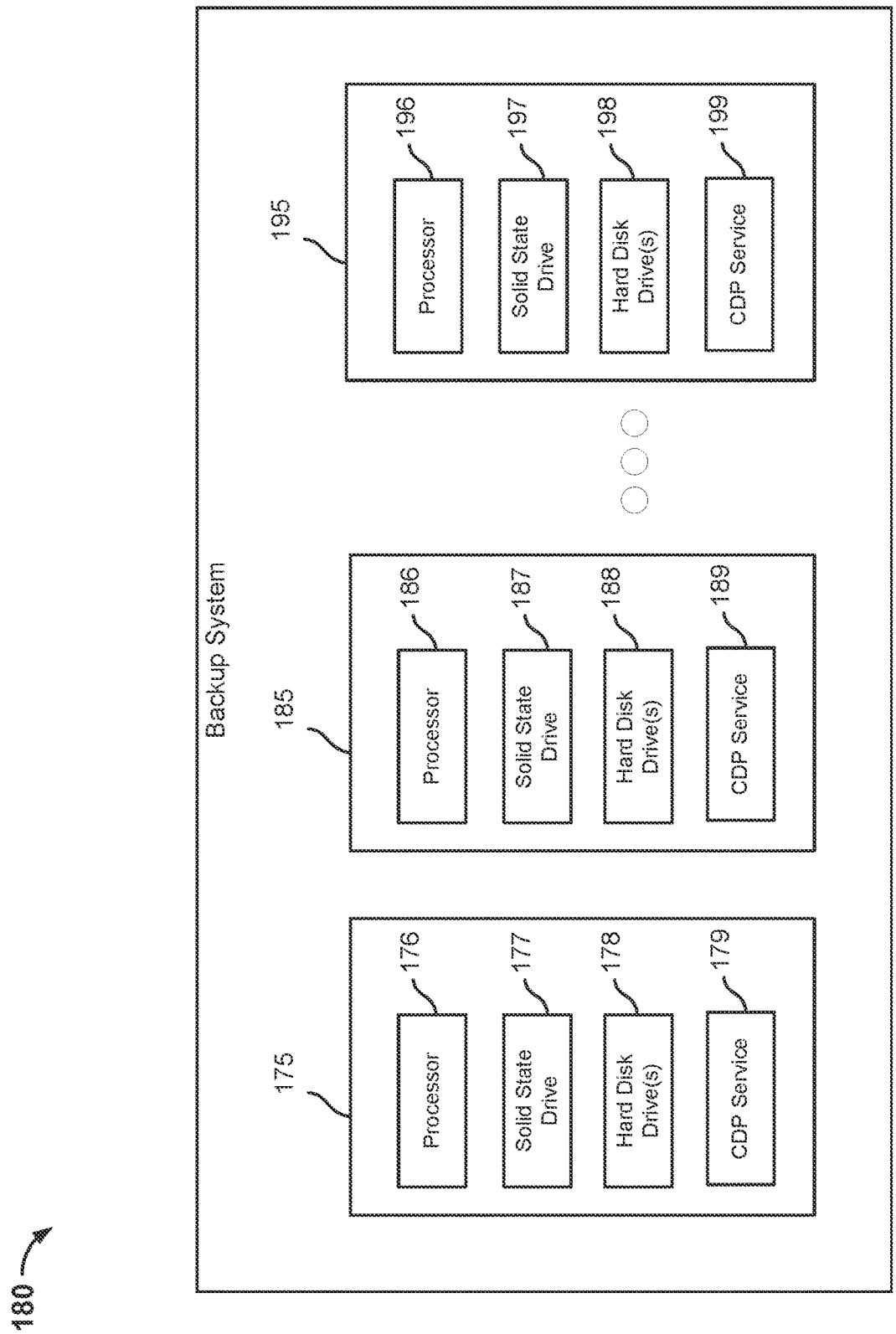
FIG. 1D is a block diagram illustrating an example of a backup system in accordance with some embodiments.

FIG. 1D is a block diagram illustrating an example of a backup system in accordance with some embodiments. Backup system 180 includes a first cluster node 175, a second cluster node 185, . . . , and an nth cluster node 195. Each cluster node has a corresponding processor, a corresponding CDP service, and a plurality of storage tiers. A first storage tier may correspond to a storage with faster access times than a second storage tier. In the example shown, a first storage tier corresponds to a solid state drive and a second storage tier corresponds to a hard disk drive.

Cluster node 175 includes processor 176, solid state drive 177, hard disk drive(s) 178, and CDP service 179. Cluster node 185 includes processor 186, solid state drive 187, hard disk drive(s) 188, and CDP service 189. Cluster node 195 includes processor 196, solid state drive 197, hard disk drive(s) 198, and CDP service 199. In some embodiments, a cluster node includes a plurality of different CDP services. A CDP service may be an application, a module, a plug-in, a VM, a container, etc.

Backup system 180 may receive a reference snapshot (e.g., full snapshot) from a source system. The data included in the reference snapshot may be stored in one of the cluster nodes 175, 185, 195. In some embodiments, the data included in the reference snapshot is stored across the cluster nodes 175, 185, 195. The data included in the reference snapshot may be stored in a first storage tier, a second storage tier, or a combination of a first storage tier and a second storage tier.

Backup system 180 may include a file system manager that is configured to organize the data included in the reference snapshot. In some embodiments, a file system manager is running on one of the cluster nodes 175, 185, 195. In some embodiments, each cluster node has its own corresponding file system manager. The file system manager may organize the data included in the reference snapshot using a tree data structure. The tree data structure may be configured to store the metadata associated with a source system. In some embodiments, the tree data structure is configured to store the metadata associated with an object. The tree data structure and the metadata may be stored in a metadata store. The metadata store may be distributed across the cluster nodes 175, 185, 195. Solid state drives 177, 187, 197 may each store a portion of the metadata store.

Each CDP Service may have a corresponding log. CDP Services 179, 189, 199 may receive a corresponding stream of IOs from a filter daemon, such as filter daemon 174, and store a record of the IO in its corresponding log. The data associated with an IO may be stored in a storage associated with the CDP Service (e.g., a solid state drive, a hard disk drive, a cache, etc.). A log may include one or more entries. In some embodiments, the log stores one or more entries for a particular object. In some embodiments, the log stores entries for a plurality of objects. In some embodiments, a CDP service has a plurality of logs, each log corresponding to a particular object.

An entry of the log may associate a particular IO with a timestamp and a sequence number. In some embodiments, the entry of the log associates a particular IO with a timestamp, a sequence number, and a snapshot marker. The snapshot marker indicates that a reference restoration point is to be generated. Each entry of the log may store the metadata associated with an intercepted write IO. For example, the metadata associated with an intercepted write IO may include at least one of the following: sequence number, timestamp, IO offset, IO length, IO data bytes, VM universally unique identifier (UUID), VM disk (VMDK) full path on a host at which the VM is running, etc.

Figure 2:
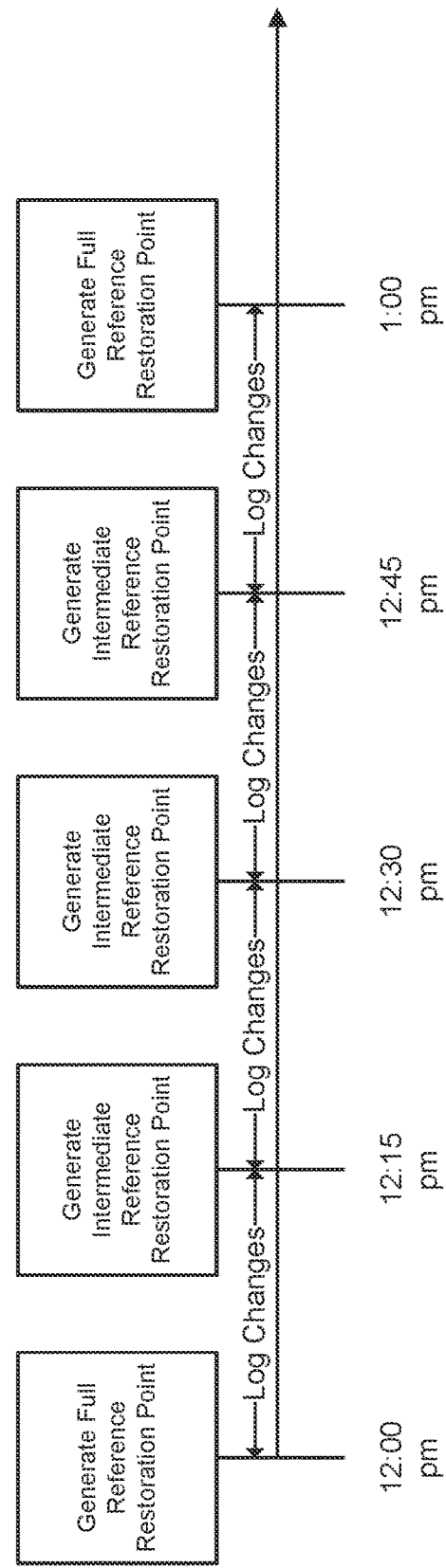
FIG. 2 is an example of a continuous data protection timeline in accordance with some embodiments.

FIG. 2 is an example of a continuous data protection timeline in accordance with some embodiments. In the example shown, continuous data protection timeline 200 illustrates reference restoration points that are generated at 12:00 μm, 12:15 μm, 12:30 μm, 12:45 μm, and 1:00 μm. Reference restoration points may be generated based on a backup policy. In some embodiments, the backup policy indicates that reference restoration points are to be generated periodically (e.g., every 15 minutes, every 30 minutes, every 60 minutes, etc.). In some embodiments, the backup policy indicates that reference restoration points are to be generated in response to a user command. In some embodiments, the backup policy indicates that reference restoration points are to be generated after a threshold number of data changes have been logged. In some embodiments, the backup policy indicates that a reference restoration point is to be generated in the event a gap is detected in the sequenced of logged IOs.

In the example shown, at 12:00 μm, a full reference restoration point is generated. A full reference restoration point may correspond to a full backup snapshot. A full backup snapshot may include all of the file system data associated with a source system comprised of one or more objects. File system data may be ingested and stored by a backup system. The backup system may include a file system manager that is configured to organize the file system data in a tree data structure. The tree data structure may be comprised of a snapshot tree and one or more metadata structures. A metadata structure may be an object metadata structure that corresponds to one of the one or more objects hosted on the source system.

In some embodiments, the full backup snapshot includes all of the object data associated with an object. Object data may be ingested and stored by a backup system. The backup system may include a file system manager that is configured to organize the object data in a tree data structure. The tree data structure may be comprised of a snapshot tree and one or more metadata structures. A metadata structure may be an object file metadata structure that corresponds to one of the files associated with the object.

Between 12:00 μm and 12:15 μm, a write filter attached to an object hosted on a source system may be configured to stream intercepted write IOs to a CDP service of the backup system. The intercepted write IOs are associated with one or more objects. In response to receiving the intercepted write IOs, the CDP service may log the intercepted write IOs.

At 12:15 pm, an intermediate reference restoration point is generated. The intermediate reference restoration point may be generated by cloning a tree data structure associated with a previous reference restoration point and applying the logged IOs to the cloned tree data structure. In this example, the previous application consistent recovery point corresponds to a full reference restoration point. The intermediate reference restoration point may be generated by cloning a root node of a tree data structure associated with the previous reference restoration point. In some embodiments, the root node of a snapshot tree associated with the previous reference restoration point is cloned. In some embodiments, the root node of a metadata structure associated with the previous reference restoration point (object metadata structure or object file metadata structure) is cloned. The cloned tree data structure may be updated, as described herein, based on the logged IOs. The logged IOs that are applied to the tree data structure associated with the previous reference restoration point are the IOs that are logged between 12:00 μm and 12:15 pm.

Between 12:15 μm and 12:30 pm, a write filter attached to the object hosted on the source system may be configured to stream intercepted write IOs to a CDP service of the backup system. The intercepted write IOs are associated with an object. In response to receiving the intercepted write IOs, the CDP service may log the intercepted write IOs.

At 12:30 pm, an intermediate reference restoration point is generated. The intermediate reference restoration point may be generated by cloning a tree data structure associated with a previous reference restoration point (e.g., 12:15 pm) and applying the logged IOs to the cloned tree data structure. In this example, the previous reference restoration point corresponds to an intermediate reference restoration point. The intermediate reference restoration point may be generated by cloning a root node of a tree data structure associated with the previous reference restoration point. In some embodiments, the root node of a snapshot tree associated with the previous reference restoration point is cloned. In some embodiments, the root node of a metadata structure associated with the previous reference restoration point (object metadata structure or object file metadata structure) is cloned. The cloned tree data structure may be updated, as described herein, based on the logged IOs. The logged IOs that are applied to the tree data structure associated with the previous application consistent recovery point are the IOs that are logged between 12:15 μm and 12:30 pm.

Between 12:30 pm and 12:45 pm, intercepted write IOs are logged by a CDP service and at 12:45 pm, an intermediate reference restoration point is generated. The intermediate reference restoration point may be generated in the same manner as described with respect to 12:30 pm.

Between 12:45 pm and 1:00 pm, intercepted write IOs are logged by a CDP service. A CDP service may inspect the log and determine that a gap exists in the sequence numbers associated with the entries that were logged between 12:45 pm and 1:00 pm. In response to detecting a gap, the CDP service may send to a backup agent of the source system a command to generate a full reference restoration point. In response to receiving the command, the backup agent may cause the source system to perform a reference snapshot.

Figure 3A:
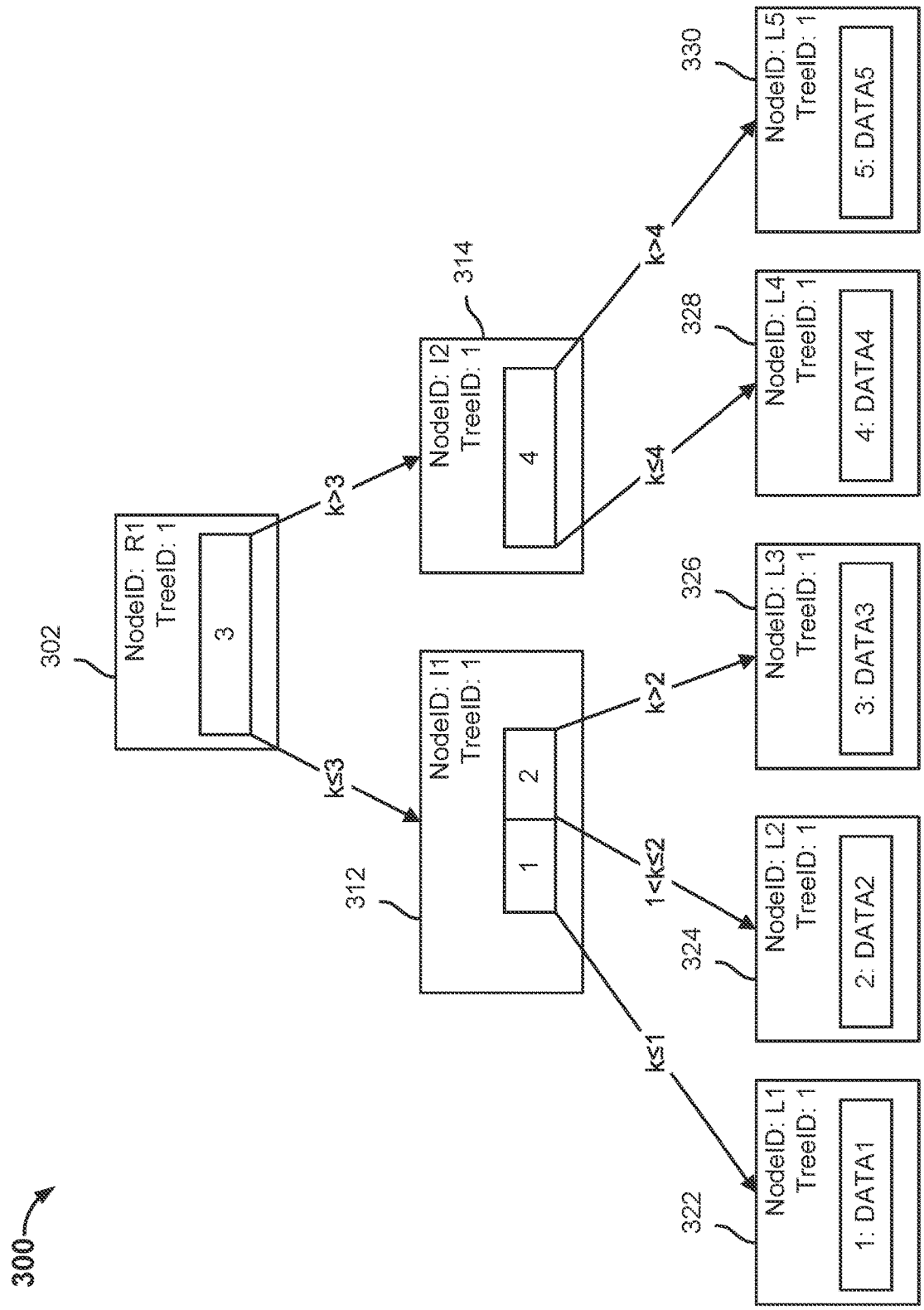
FIG. 3A is a block diagram illustrating an embodiment of a tree data structure.

FIG. 3A is a block diagram illustrating an embodiment of a tree data structure. A tree data structure may be used to represent the file system data that is stored on a backup system, such as backup system 162. In some embodiments, a tree data structure is used to represent the object data associated with an object that is stored on the backup system. A backup system may receive from a source system data associated with a plurality of IOs and store the data. A file system manager, such as file system manager 167, may organize the received data in a tree data structure, such as tree data structure 300. In the example shown, tree data structure 300 corresponds to a snapshot tree. In some embodiments, tree data structure 300 is configured to store the file system metadata associated with a source system. In some embodiments, tree data structure 300 is configured to store the object metadata associated with an object. Tree data structure 300 may correspond to a reference snapshot, e.g., a full backup snapshot. Tree data structure 300 may be a view that corresponds to a reference restoration point.

Tree data structure 300 is comprised of a snapshot tree that includes a root node 302, intermediate nodes 312, 314, and leaf nodes 322, 324, 326, 328, and 330. Although tree data structure 300 includes one intermediate level between root node 302 and leaf nodes 322, 324, 326, 328, 330, any number of intermediate levels may be implemented. Tree data structure 300 may correspond to a snapshot of file system data or object data at a particular point in time t. The snapshot tree depicted in FIG. 3A may correspond to a reference restoration point (e.g., full reference restoration point) at time $t_1$. The snapshot may be received from a source system, such as source system 152. The snapshot tree in conjunction with a plurality of object metadata structures may provide a complete view of the source system associated with the snapshot for the particular point in time. In some embodiments, the snapshot tree in conjunction with a plurality of object file metadata structures may provide a complete view of the object associated with the snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs. A data key k is a lookup value by which a particular leaf node may be accessed. For example, "1" is a data key that may be used to look up "DATA1" of leaf node 322. The data key k may correspond to a brick number of a data brick. A data brick may be comprised of one or more data blocks. In some embodiments, the leaf node is configured to store a brick identifier, file system metadata, object metadata, file size, directory structure, file permissions, physical storage locations of the files, etc. A leaf node may store a data key k and a pointer to a location that stores the value associated with the data key. A leaf node may store a pointer to a root node of a metadata structure (e.g., object metadata structure or an object file metadata structure).

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 302 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 302 may be traversed to intermediate node 312 because the data keys of "1," "2," and "3" are less than or equal to the node key "3." To find a leaf node storing a value associated with a data key of "4" or "5," the second branch of root node 302 may be traversed to intermediate node 314 because data keys "4" and "5" are greater than the node key of "3."

A data key k of a key-value pair is not limited to a numerical value. In some embodiments, non-numerical data keys may be used for a data key-value pair (e.g., "name," "age," etc.) and a numerical number may be associated with the non-numerical data key. In some embodiments, a hash function may be associated with the non-numerical data key. The hash function may determine which branch of a node with which the non-numerical data key is associated. The hash function is applied to a data key to provide a hash. The hash may determine which branch of a node with which the non-numerical data key is associated.

In the example shown, root node 302 includes a pointer to intermediate node 312 and a pointer to intermediate node 314. Root node 302 includes a NodeID of "R1" and a TreeID of "1." The NodeID identifies the name of the node. The TreeID identifies the view with which the node is associated. When a change is made to data stored in a leaf node as described with respect to FIGS. 3B, 3C, and 3D, the TreeID is used to determine whether a copy of a node is to be made.

Root node 302 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 300 from root node 302 to intermediate node 312 because the data keys have a value that is less than or equal to the node key. Leaf nodes with a data key of "4" or "5" may be found by traversing tree data structure 300 from root node 302 to intermediate node 314 because the data keys have a value that is greater than the node key.

Root node 302 includes a first set of pointers. The first set of pointers associated with a data key less than the node key (e.g., "1," "2," or "3") indicates that traversing tree data structure 300 from root node 302 to intermediate node 312 may lead to a leaf node with a data key of "1," "2," or "3." Intermediate node 314 includes a second set of pointers. The second set of pointers associated with a data key greater than the node key indicates that traversing tree data structure 300 from root node 302 to intermediate node 314 may lead to a leaf node with a data key of "4" or "5."

Intermediate node 312 includes corresponding pointers to leaf nodes 322, 324, 326. Intermediate node 314 includes a NodeID of "I1" and a TreeID of "1." Intermediate node 312 includes a first node key of "1" and a second node key of "2." The data key k for leaf node 322 is a value that is less than or equal to the first node key. The data key k for leaf node 324 is a value that is greater than the first node key and less than or equal to the second node key. The data key k for leaf node 326 is a value that is greater than the second node key. The pointer to leaf node 322 indicates that traversing tree data structure 300 from intermediate node 312 to leaf node 322 may lead to the node with a data key of "1." The pointer to leaf node 324 indicates that traversing tree data structure 300 from intermediate node 312 to leaf node 324 may lead to the node with a data key of "2." The pointer to leaf node 326 indicates that traversing tree data structure 300 from intermediate node 312 to leaf node 326 may lead to the node with a data key of "3."

Intermediate node 314 includes a pointer to leaf node 328 and a pointer to leaf node 330. Intermediate node 312 includes a NodeID of "I2" and a TreeID of "1." Intermediate node 314 includes a node key of "4." The data key k for leaf node 328 is a value that is less than or equal to the node key. The data key k for leaf node 330 is a value that is greater than the node key. The pointer to leaf node 328 indicates that traversing tree data structure 300 from intermediate node 314 to leaf node 328 may lead to the node with a data key of "4." The pointer to leaf node 330 indicates that traversing tree data structure 300 from intermediate node 314 to leaf node 330 may lead to the node with a data key of "5."

Leaf nodes 322, 324, 326, 328, 330 include respective data key-value pairs of "1: DATA1," "2: DATA2," "3: DATA3," "4: DATA4," "5: DATA5." Leaf nodes 322, 324, 326, 328, 330 include respective Node IDs of "L1," "L2," "L3," "L4," "L5." Leaf nodes 322, 324, 326, 328, 330 all include a TreeID of "1." In some embodiments, leaf nodes 322, 324, 326, 328, or 330 are configured to store metadata. In other embodiments, leaf nodes 322, 324, 326, 328, or 330 are configured to store content file data when the size of the content file is less than or equal to a limit size. In other embodiments, leaf nodes 322, 324, 326, 328, or 330 are modes and are configured to store a pointer to or an identifier of a respective object metadata structure (e.g., object metadata tree).

Figure 3B:
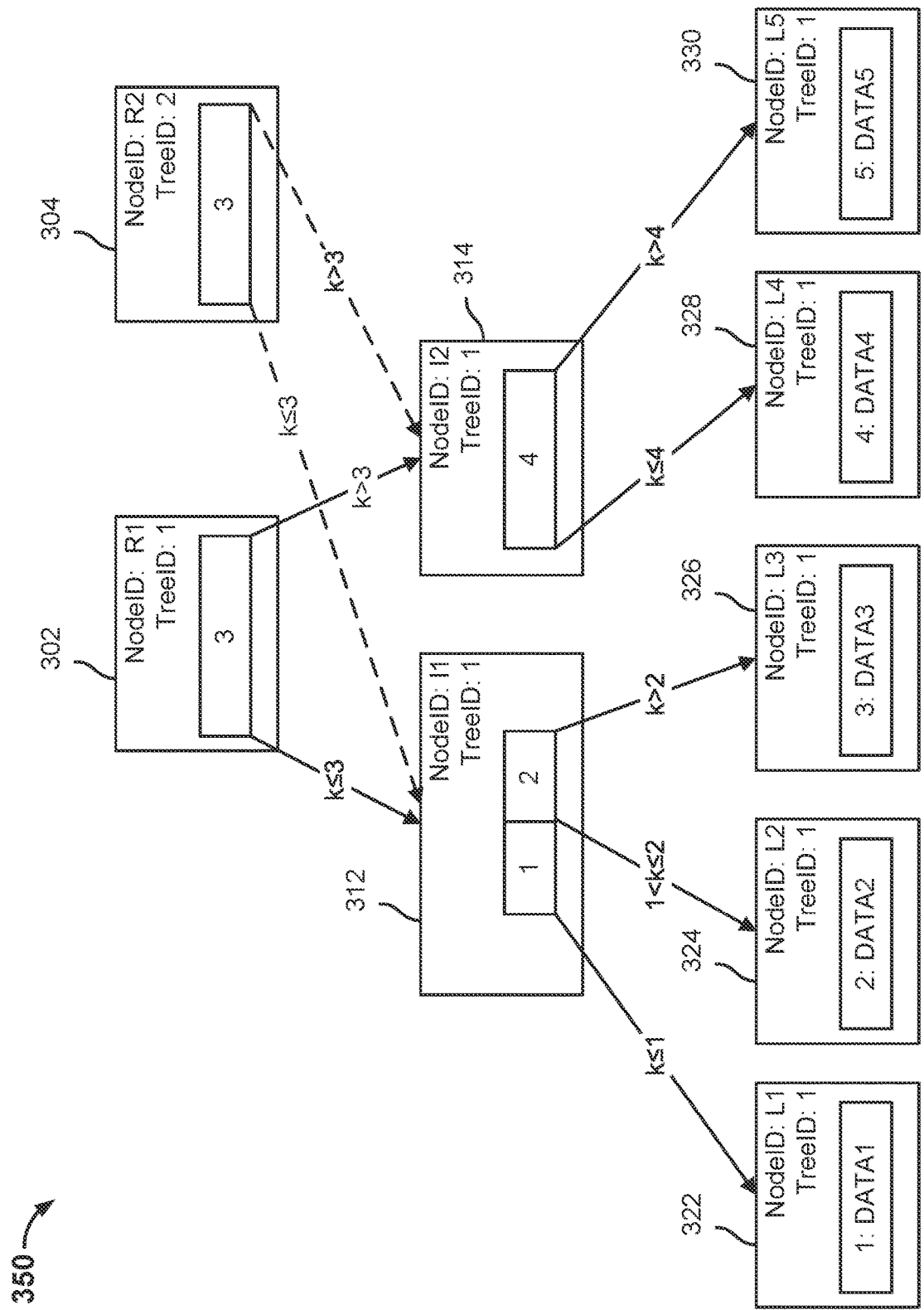
FIG. 3B is a block diagram illustrating an embodiment of a cloned snapshot tree.

FIG. 3B is a block diagram illustrating an embodiment of a cloned snapshot tree. A CDP service may store a log that includes one or more entries. An entry may include a snapshot marker that indicates a reference restoration point is to be generated. A file system manager may detect that an entry includes a snapshot marker. In response to detecting the snapshot marker, the file system manager may be configured to generate a reference restoration point.

A snapshot tree associated with a previous reference restoration point may be cloned to generate the reference restoration point. A snapshot tree may be cloned when a snapshot tree is added to a tree data structure. In some embodiments, tree data structure 350 may be created by a backup system, such as backup system 162. A CDP service of the backup system may store a log for a plurality of intercepted write IOs. The log may be comprised of a plurality of entries. One of the entries may include a snapshot marker, which indicates that a reference restoration point is to be generated. A file system manager of the backup system may detect the snapshot marker. Generating a reference restoration point includes cloning a snapshot tree associated with a previous reference restoration point. In some embodiments, the previous reference restoration point is a full reference restoration point. In some embodiments, the previous reference restoration point is an intermediate reference restoration point.

In the example shown, tree data structure 350 includes root nodes 302, 304, intermediate nodes 312, 314, and leaf nodes 322, 324, 326, 328, and 330. Tree data structure 350 may correspond to a version of file system data at a particular moment in time. In some embodiments, tree data structure 350 corresponds to a version of an object at a particular moment in time. The tree data structure can be used to capture different versions of file system data/objects at different moments in time. The tree data structure allows a chain of snapshot trees to be linked together by allowing a node of a later version of a snapshot tree to reference a node of a previous version of a snapshot tree. For example, a snapshot tree with root node 304 is linked to a snapshot tree with root node 302. Each time a reference restoration point is generated, a new root node may be created and the new root node includes the same set of pointers included in the previous root node, that is, the new root node of the snapshot tree may be linked to one or more intermediate nodes associated with a previous snapshot tree. The new root node also includes a different NodeID and a different TreeID. The TreeID may indicate a snapshot to which a node is associated.

In some embodiments, a root node is associated with a current view. A current view may still accept one or more changes to the data. The TreeID of a root node indicates a snapshot with which the root node is associated. For example, root node 302 with a TreeID of "1" is associated with a first reference restoration point and root node 304 with a TreeID of "2" is associated with a second reference restoration point. In the example shown, root node 304 is associated with a current view.

In other embodiments, a root node is associated with a snapshot view. A snapshot view may represent a state of the file system data/object data at a particular moment in time in the past and is not updated. In the example shown, root node 302 is associated with a snapshot view of the file system data.

In the example shown, root node 304 is a copy of root node 302. Similar to root node 302, root node 304 includes the same pointers as root node 302. However, root node 304 includes a NodeID of "R2" and a TreeID of "2."

Figure 3C:
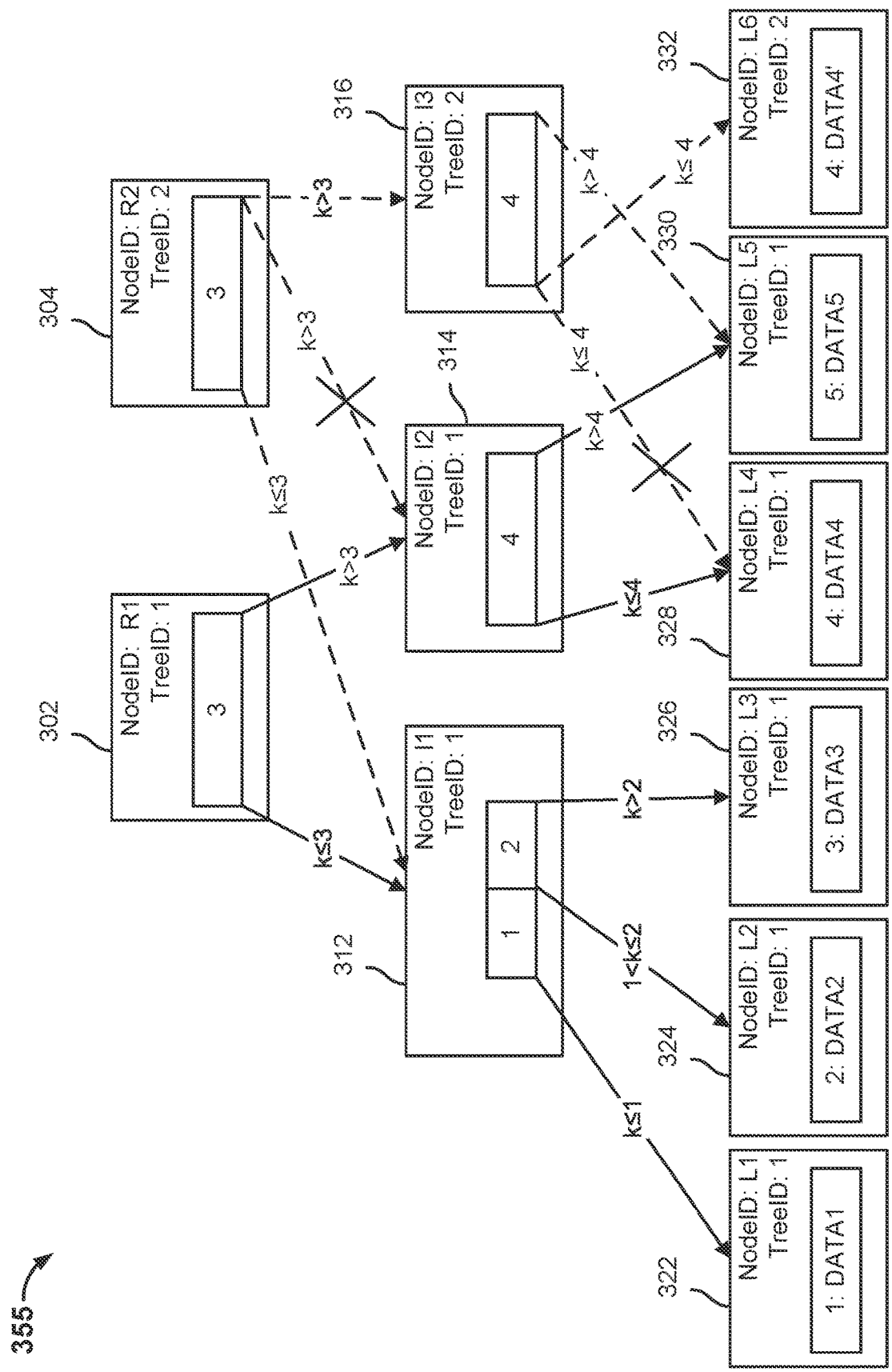
FIG. 3C is a block diagram illustrating an embodiment of modifying a cloned snapshot tree.

FIG. 3C is a block diagram illustrating an embodiment of modifying a cloned snapshot tree. A cloned snapshot tree may be modified as part of the process to generate a reference restoration point. A CDP service may store a log that includes one or more entries. An entry may be associated with an IO that is intercepted from an object. The IOs associated with the one or more entries may be applied to the cloned snapshot tree to generate a view corresponding to a reference restoration point. In some embodiments, the IOs associated with the one or more entries are applied to the cloned snapshot tree to generate a view corresponding to a specified recovery time point. In some embodiments, the IOs associated with the one or more entries are applied to the cloned snapshot tree to generate a view corresponding to a current state of a cloned hot standby.

In the example shown, tree data structure 355 may be modified by a file system manager, such as file system manager 167. A snapshot tree with a root node 304 may be a current view of the file system data or object data. A current view represents a state of the file system data or object that is in the process of being brought up-to-date and capable of receiving one or more modifications to the snapshot tree that correspond to modifications to the file system data or object. Because a snapshot represents a perspective of the file system data or object that is "frozen" in time, one or more copies of one or more nodes affected by a change to file system data are made.

The snapshot tree with root node 304 may correspond to a reference restoration point at time $t_{10}$. A file system manager may access a log stored by a CDP service and apply to the cloned snapshot tree, the IOs that occurred after the last reference restoration point and before the snapshot marker associated with a current reference restoration point.

In the example shown, a log entry indicates that the value "DATA4" has been modified to be "DATA4'." In some embodiments, the value of a key value pair has been modified. In other embodiments, the value of the key value pair is the data associated with a content file that is smaller than or equal to a limit size. In other embodiments, the value of the key value pair points to a different metadata structure. In some embodiments, the different metadata structure corresponds to a modified version of an object. In some embodiments, the different metadata structure corresponds to a modified version of an object file. The different metadata structure may be a modified version of the metadata structure to which the leaf node previously pointed.

The file system manager starts at root node 304 because that is the root node associated with the cloned snapshot tree. The value "DATA4" is associated with the data key "4." The file system manager traverses snapshot tree 355 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a node copy that includes the same pointers as the copied node, but includes a different NodeID and a different TreeID. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node 316 includes the same set of pointers as intermediate node 314, but includes a TreeID of "2" to match the TreeID of root node 204. Intermediate node 316 is a shadow copy of intermediate node 314.

The file system manager updates a pointer of root node 304 to point to intermediate node 316 instead of pointing to intermediate node 314. The file system manager traverses tree data structure 355 from intermediate node 316 to leaf node 328, determines that the TreeID of leaf node 328 does not match the TreeID of root node 304, and creates a copy of leaf node 328. Leaf node copy 332 stores the modified value "DATA4'" and includes the same TreeID as root node 304. The file system manager updates a pointer of intermediate node 316 to point to leaf node 332 instead of pointing to leaf node 328.

In some embodiments, leaf node 332 stores the value of a key value pair that has been modified. In other embodiments, leaf node 332 stores the modified data associated with a content file that is smaller than or equal to a limit size. In other embodiments, leaf node 332 stores a pointer to a metadata structure corresponding to the modified object. In other embodiments, leaf node 332 stores a pointer to a metadata tree corresponding to the modified object file.

Figure 3D:
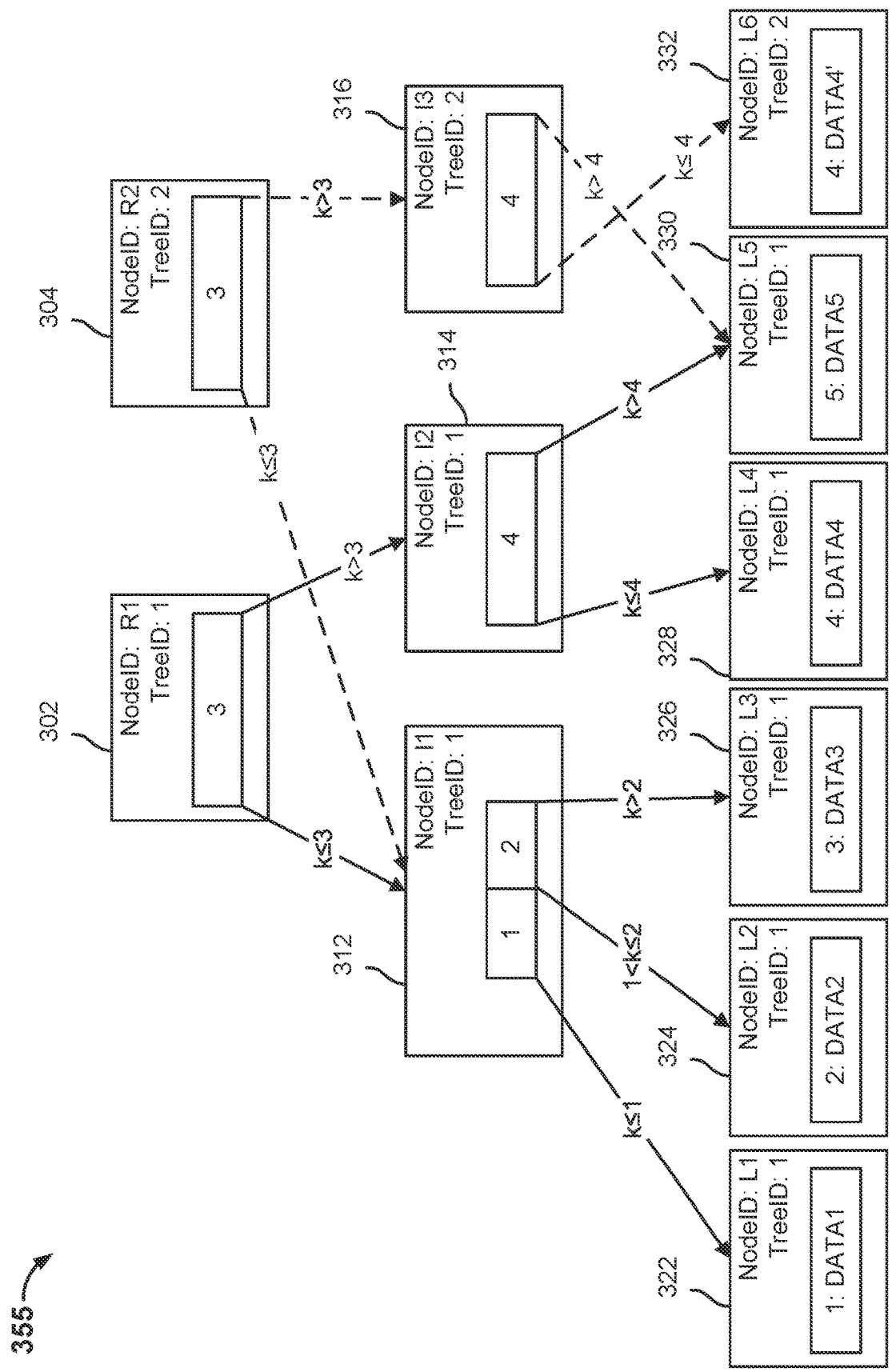
FIG. 3D is a block diagram illustrating an embodiment of a modified cloned snapshot tree.

FIG. 3D is a block diagram illustrating an embodiment of a modified cloned snapshot tree. Tree data structure 355 shown in FIG. 3D illustrates a result of the modifications made to a snapshot tree as described with respect to FIG. 3C. The snapshot tree with root node 302 may correspond to a first reference restoration point and the snapshot tree with root node 304 may correspond to a second reference restoration point. In this example, both snapshot trees are fully hydrated restoration points. A fully hydrated restoration point corresponds to a state which may be restored without having to apply one or more logged IOs. For example, a source system or an object may be restored to a state associated with time $t_1$ by traversing the snapshot tree having root node 302. A source system or an object may be restored to a state associated with time $t_{10}$ by traversing the snapshot tree having root node 304. A source system or an object may be restored to a state between time $t_1$ and $t_{10}$ by applying one or more data changes that are stored in a log file to the snapshot tree having root node 302 and then traversing the modified snapshot tree.

Figure 4A:
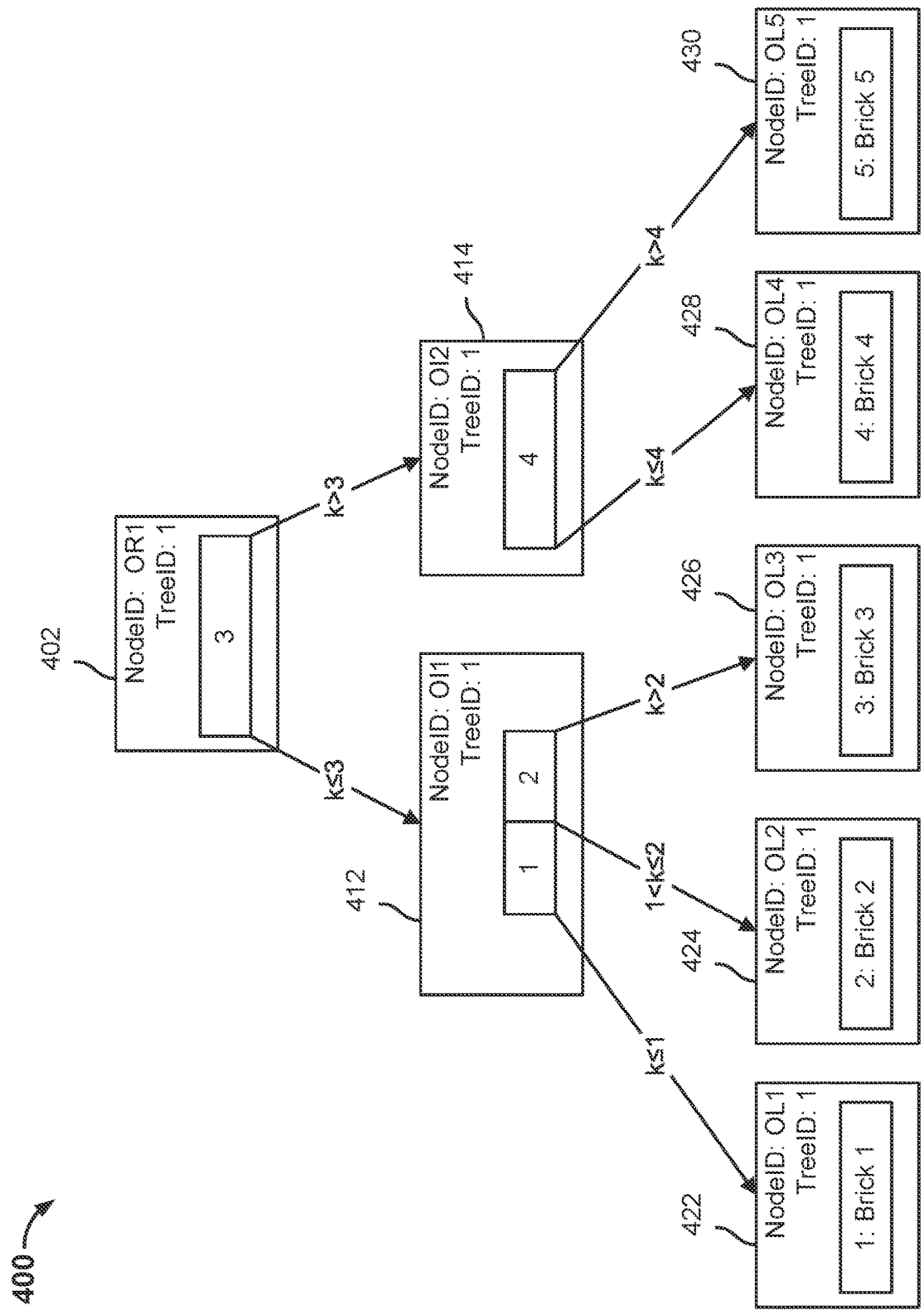
FIG. 4A is a block diagram illustrating an embodiment of a tree data structure.

FIG. 4A is a block diagram illustrating an embodiment of a tree data structure. In some embodiments, tree data structure 400 may be created by a backup system, such as backup system 162. In the example shown, tree data structure 400 corresponds to an object and stores the metadata associated with the object. A leaf node of a snapshot tree associated with file system data, such as a leaf node of tree data structures 300, 350, 355, may include a pointer to a tree data structure corresponding to an object, such as tree data structure 300. Tree data structure 400 may correspond to a reference backup of an object, e.g., a full backup of an object.

In other embodiments, tree data structure 400 corresponds to an object file and stores the metadata associated with the object file. A leaf node of a snapshot tree associated with an object, such as a leaf node of tree data structures 300, 350, 355, may include a pointer to a tree data structure corresponding to an object file, such as tree data structure 300.

A tree data structure corresponding to an object or object file is a metadata structure, but is used to organize the data blocks associated with an object or object file that are stored on the backup system. Tree data structure 400 may be referred to as a "metadata structure" or a "metadata tree."

A tree data structure corresponding to an object or object file at a particular point in time (e.g., a particular version) may be comprised of a root node, one or more levels of one or more intermediate nodes, and one or more leaf nodes. In some embodiments, a tree data structure corresponding to an object or object file is comprised of a root node and one or more leaf nodes without any intermediate nodes. Tree data structure 400 may be a reference restoration point of an object or object file at a particular point in time t, for example at time $t_1$. A tree data structure associated with file system data may include one or more pointers to one or more tree data structures corresponding to one or more objects. For example, a tree data structure may be associated with the file system data of source system 152 and include one or more pointers to tree data structures corresponding to the one or more objects 153.

In the example shown, tree data structure 400 includes an object root node 402, object intermediate nodes 412, 414, and object leaf nodes 422, 424, 426, 428, 430. Although tree data structure 400 includes one intermediate level between root node 402 and leaf nodes 422, 424, 426, 428, 430, any number of intermediate levels may be implemented Similar to the snapshot trees described above, each node includes a "NodeID" that identifies the node and a "TreeID" that identifies a view with which the node is associated.

In the example shown, root node 402 includes a pointer to intermediate node 412 and a pointer to intermediate node 414. Root node 402 includes a NodeID of "OR1" and a TreeID of "1."

In the example shown, intermediate node 412 includes corresponding pointers to leaf nodes 422, 424, 426. Intermediate node 412 includes a NodeID of "OI1" and a TreeID of "1." Intermediate node 412 includes a first node key and a second node key. The data key k for leaf node 422 is a value that is less than or equal to the first node key. The data key for leaf node 424 is a value that is greater than the first node key and less than or equal to the second node key. The data key for leaf node 426 is a value that is greater than the second node key. The pointer to leaf node 422 indicates that traversing tree data structure 400 from intermediate node 412 to leaf node 422 may lead to the node with a data key of "1." The pointer to leaf node 424 indicates that traversing tree data structure 400 from intermediate node 412 to leaf node 424 may lead to the node with a data key of "2." The pointer to leaf node 426 indicates that traversing tree data structure 400 from intermediate node 412 to leaf node 426 may lead to the node with a data key of "3."

In the example shown, intermediate node 414 includes a pointer to leaf node 428 and a pointer to leaf node 430. Intermediate node 414 includes a NodeID of "OI2" and a TreeID of "1." Intermediate node 414 includes a node key. The data key k for leaf node 428 is a value that is less than or equal to the node key. The data key for leaf node 430 is a value that is greater than the node key. The pointer to leaf node 428 indicates that traversing tree data structure 400 from intermediate node 414 to leaf node 428 may lead to the node with a data key of "4." The pointer to leaf node 430 indicates that traversing tree data structure 400 from intermediate node 414 to leaf node 430 may lead to the node with a data key of "5."

Leaf node 422 includes a data key-value pair of "1: Brick 1." "Brick 1" is a brick identifier that identifies the data brick that is associated with one or more data chunks of an object or object file. Leaf node 422 includes NodeID of "OL1" and a TreeID of "1." To view the value associated with a data key of "1," tree data structure 400 is traversed from root node 402 to intermediate node 412 to leaf node 422.

Leaf node 424 includes a data key-value pair of "2: Brick 2." "Brick 2" is a brick identifier that identifies the data brick that is associated with one or more data chunks of an object or object file. Leaf node 424 includes NodeID of "OL2" and a TreeID of "1." To view the value associated with a data key of "2," tree data structure 400 is traversed from root node 402 to intermediate node 412 to leaf node 424.

Leaf node 426 includes a data key-value pair of "3: Brick 3." "Brick 3" is a brick identifier that identifies the data brick that is associated with one or more data chunks of an object or object file. Leaf node 426 includes NodeID of "OL3" and a TreeID of "1." To view the value associated with a data key of "3," tree data structure 400 is traversed from root node 402 to intermediate node 412 to leaf node 426.

Leaf node 428 includes a data key-value pair of "4: Brick 4." "Brick 4" is a brick identifier that identifies the data brick that is associated with one or more data chunks of an object or object file. Leaf node 428 includes NodeID of "OL4" and a TreeID of "1." To view the value associated with a data key of "4," tree data structure 400 is traversed from root node 402 to intermediate node 414 to leaf node 428.

Leaf node 430 includes a data key-value pair of "5: Brick 5." "Brick 5" is a brick identifier that identifies the data brick that is associated with one or more data chunks of an object or object file. Leaf node 430 includes NodeID of "OL5" and a TreeID of "1." To view the value associated with a data key of "5," tree data structure 400 is traversed from root node 402 to intermediate node 414 to leaf node 430.

An object or object file may be comprised of a plurality of data chunks. A brick may be associated with one or more data chunks. In the example shown, leaf nodes 422, 424, 426, 428, 430 each store a corresponding brick identifier. The location of the one or more data chunks associated with a data brick may be identified using one or more data structures (e.g., list, table, etc.) stored in metadata store 164. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value).

The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 4B:
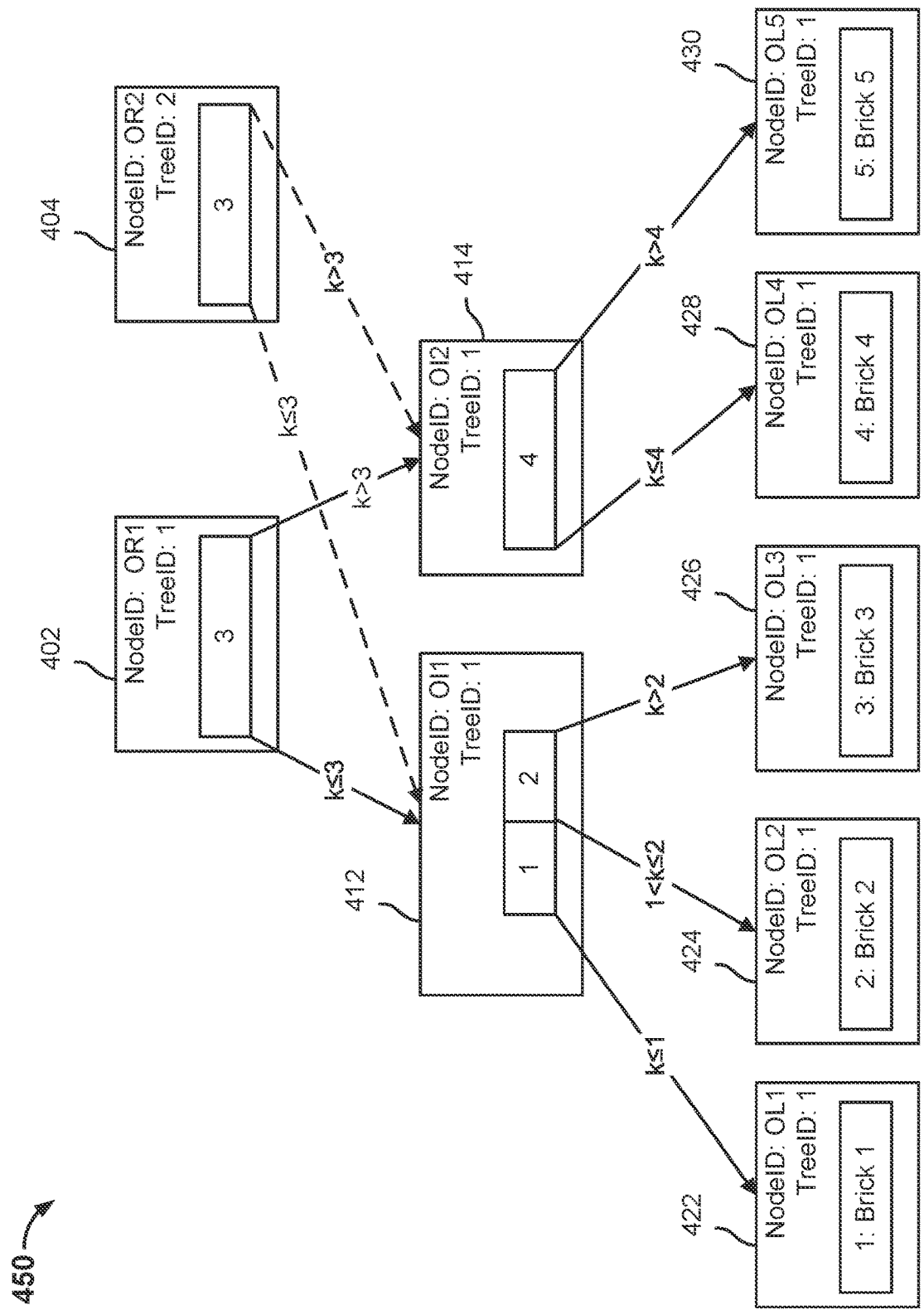
FIG. 4B is a block diagram illustrating an embodiment of a cloned metadata structure.

FIG. 4B is a block diagram illustrating an embodiment of a cloned metadata structure. A CDP service may store a log that includes one or more entries. An entry may include a snapshot marker that indicates a reference restoration point is to be generated. A file system manager may detect that an entry includes a snapshot marker. In response to detecting the snapshot marker, the file system manager may be configured to generate a reference restoration point.

A snapshot tree corresponding to an object or object file may be cloned to as part of a process to generate a reference restoration point. In some embodiments, tree data structure 450 may be created by a backup system, such as backup system 162. A CDP service of the backup system may store a log for a plurality of intercepted write IOs. The log may be comprised of a plurality of entries associated with an object or object file. One of the entries may include a snapshot marker, which indicates that a reference restoration point is to be generated. A file system manager of the backup system may detect the snapshot marker. Generating a reference restoration point includes cloning a snapshot tree associated with a previous reference restoration point. In some embodiments, the previous reference restoration point corresponds to a full reference restoration point of an object or object file. In some embodiments, the previous reference restoration point corresponds to an intermediate reference restoration point.

A tree data structure corresponding to an object or object file is a snapshot tree, but stores metadata associated with the object or object file. The tree data structure corresponding to an object or object file can be used to capture different versions of the object or object file at different moments in time. In some embodiments, the tree data structure allows a chain of metadata structures corresponding to different versions of an object or object file to be linked together by allowing a node of a later version of a metadata structure to reference a node of a previous version of a metadata structure. A metadata structure is comprised of a root node, one or more levels of one or more intermediate nodes, and one or more leaf nodes.

A root node or an intermediate node of a version of a metadata structure may reference an intermediate node or a leaf node of a previous version of a metadata structure. Similar to the snapshot tree, the metadata structure allows different versions of object data to share nodes and allows data changes to an object or object file to be tracked.

In the example shown, tree data structure 450 includes a first metadata structure comprising root node 402, intermediate nodes 412, 414, and leaf nodes 422, 424, 426, 428, and 430. Tree data structure 450 also includes a second metadata structure that may be a snapshot of an object or object file at a particular point in time t+n, for example at time $t_{10}$. The second metadata structure is comprised of root node 404, intermediate nodes 412, 414, and leaf nodes 422, 424, 426, 428, and 430. To create a reference restoration point of an object or object file, a new root node is created. The new root node is a copy of the root node associated with the previous reference restoration point of the object or object file and includes the same set of pointers as the copied root node.

In the example shown, root node 404 includes a set of pointers to intermediate nodes 412, 414, which are intermediate nodes associated with a previous reference restoration point. In some embodiments, root node 404 is associated with a current view. The current view may represent a state of the object or object file that is in the process of being brought up-to-date and is capable of receiving one or more modifications to the metadata structure that correspond to modifications to the file data. The TreeID of a root node indicates a reference restoration point with which the root node is associated. For example, root node 402 with a TreeID of "1" is associated with a first reference restoration point and root node 404 with a TreeID of "2" is associated with a second reference restoration point. In other embodiments, root node 404 is associated with a snapshot view. A snapshot view may represent a state of the object or object file at a particular moment in time in the past and is not updated.

In the example shown, root node 404 is a copy of root node 402. Root node 404 includes a first set of pointers to intermediate node 412. The first set of pointers associated with a data key (e.g., "1," "2," or "3") less than or equal to the node key indicates that traversing a file metadata tree included in tree data structure 450 from root node 404 to intermediate node 412 may lead to a leaf node with a data key of "1," "2," or "3." Root node 404 includes a second set of pointers to intermediate node 414. The second set of pointers associated with a data key greater than the node key indicates that traversing a metadata structure included in tree data structure 450 from root node 404 to intermediate node 414 may lead to a leaf node with a data key of "4" or "5."

Figure 4C:
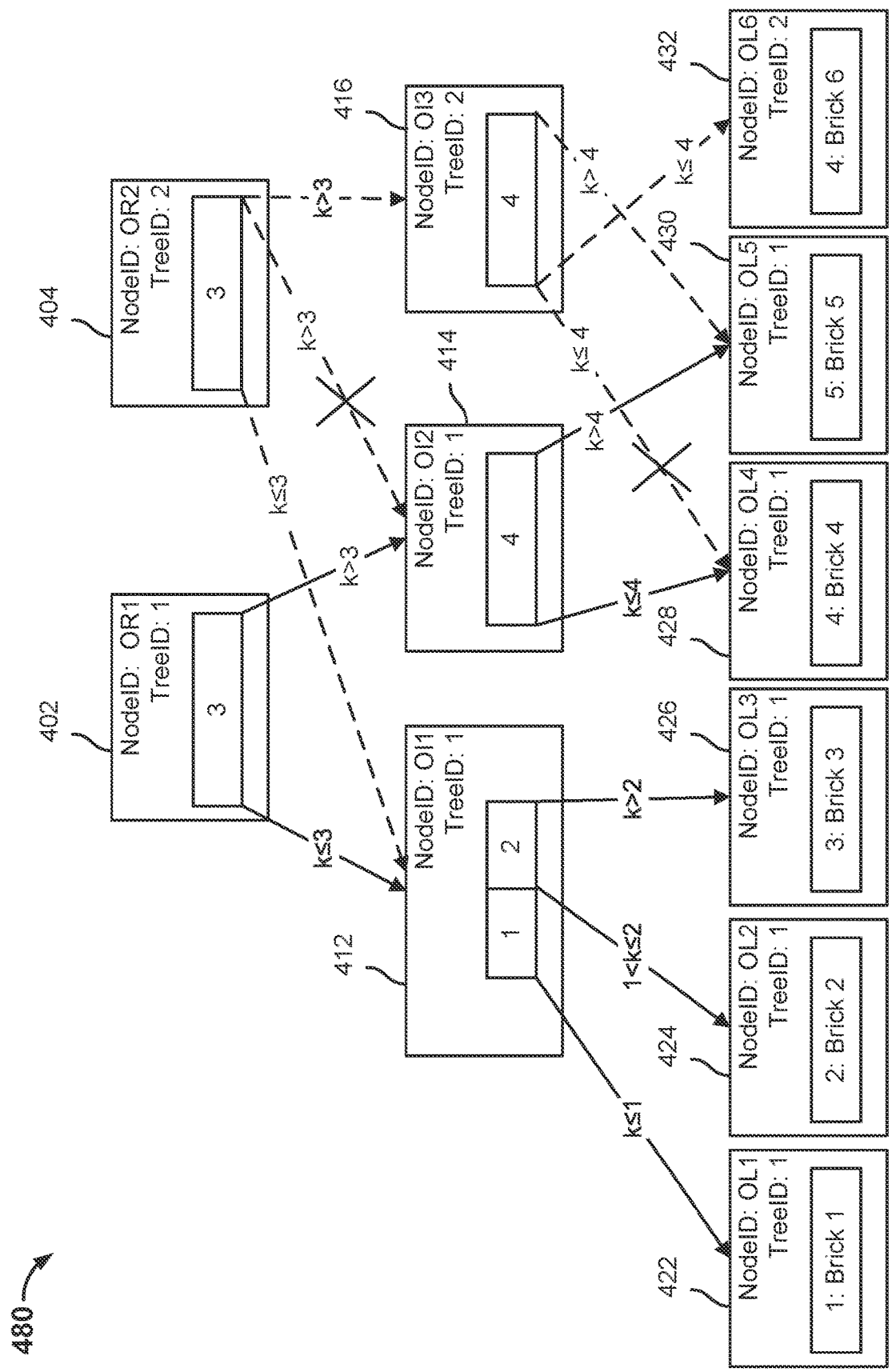
FIG. 4C is a block diagram illustrating an embodiment of modifying a cloned metadata structure.

FIG. 4C is a block diagram illustrating an embodiment of modifying a cloned metadata structure. A cloned metadata structure may be generated to generate an application consistent recovery point. A CDP service may store a log that includes one or more entries. An entry may be associated with an IO that is intercepted from an object. The IOs associated with the one or more entries may be applied to the cloned metadata structure to generate the reference restoration point of an object or object file. In some embodiments, the IOs associated with the one or more entries are applied to the cloned metadata structure to generate a view corresponding to a specified recovery time point of an object or object file. In some embodiments, the IOs associated with the one or more entries are applied to the cloned metadata structure to generate a view corresponding to a current state of a cloned hot standby that corresponds to an object or object file.

In the example shown, tree data structure 480 may be modified by a file system manager, such as file system manager 167. A metadata structure with root node 404 may be a current view. A current view may represent a state of an object or object file that is in the process of being brought up-to-date and capable of receiving one or more modifications to the metadata structure tree that correspond to modifications to the object data.

In some embodiments, the object data may be modified such that one of the data chunks is replaced by another data chunk. When a data chunk of object data associated with a previous reference restoration point is replaced with a new data chunk, the data brick associated with the new data chunk may be different. A leaf node of a metadata structure stores a brick identifier associated with a particular brick associated with the data chunk. To represent this modification to the file data, a corresponding modification is made to a current view of a metadata structure. The current view of the metadata structure is modified because the previous metadata structure is a snapshot view and can no longer be modified. The data chunk of the object data that was replaced has a corresponding leaf node in the previous metadata structure. A new leaf node in the current view of the metadata structure is created, as described herein, that corresponds to the new data chunk. The new leaf node includes an identifier associated with the new reference restoration point. The new leaf node may also store the chunk identifier associated with the modified data chunk.

In the example shown, a data chunk included in "Brick 4" has been modified. The data chunk associated with "Brick 4" has been replaced with a data chunk associated with "Brick 6." The file system manager starts at root node 404 because that is the root node corresponding to the reference restoration point at time $t_{10}$. The value "Brick 4" is associated with the data key "4." The file system manager traverses tree data structure 480 from root node 404 until it reaches a target node, in this example, leaf node 428. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 404 and proceeds to intermediate node 414. The file system manager compares the TreeID of intermediate node 414 with the TreeID of root node 404, determines that the TreeID of intermediate node 414 does not match the TreeID of root node 404, and creates a copy of intermediate node 414. Intermediate node copy 416 is a shadow copy and includes the same set of pointers as intermediate node 414, but includes a TreeID of "2" to match the TreeID of root node 404. The file system manager updates a pointer of root node 404 to point to intermediate node 416 instead of pointing to intermediate node 414. The file system manager traverses tree data structure 480 from intermediate node 416 to leaf node 428, determines that the TreeID of leaf node 428 does not match the TreeID of root node 404, and creates a copy of leaf node 428. Leaf node 432 is a copy of leaf node 428, but stores the brick identifier "Brick 6" and includes the same TreeID as root node 404. The file system manager updates a pointer of intermediate node 416 to point to leaf node 432 instead of pointing to leaf node 428.

Figure 4D:
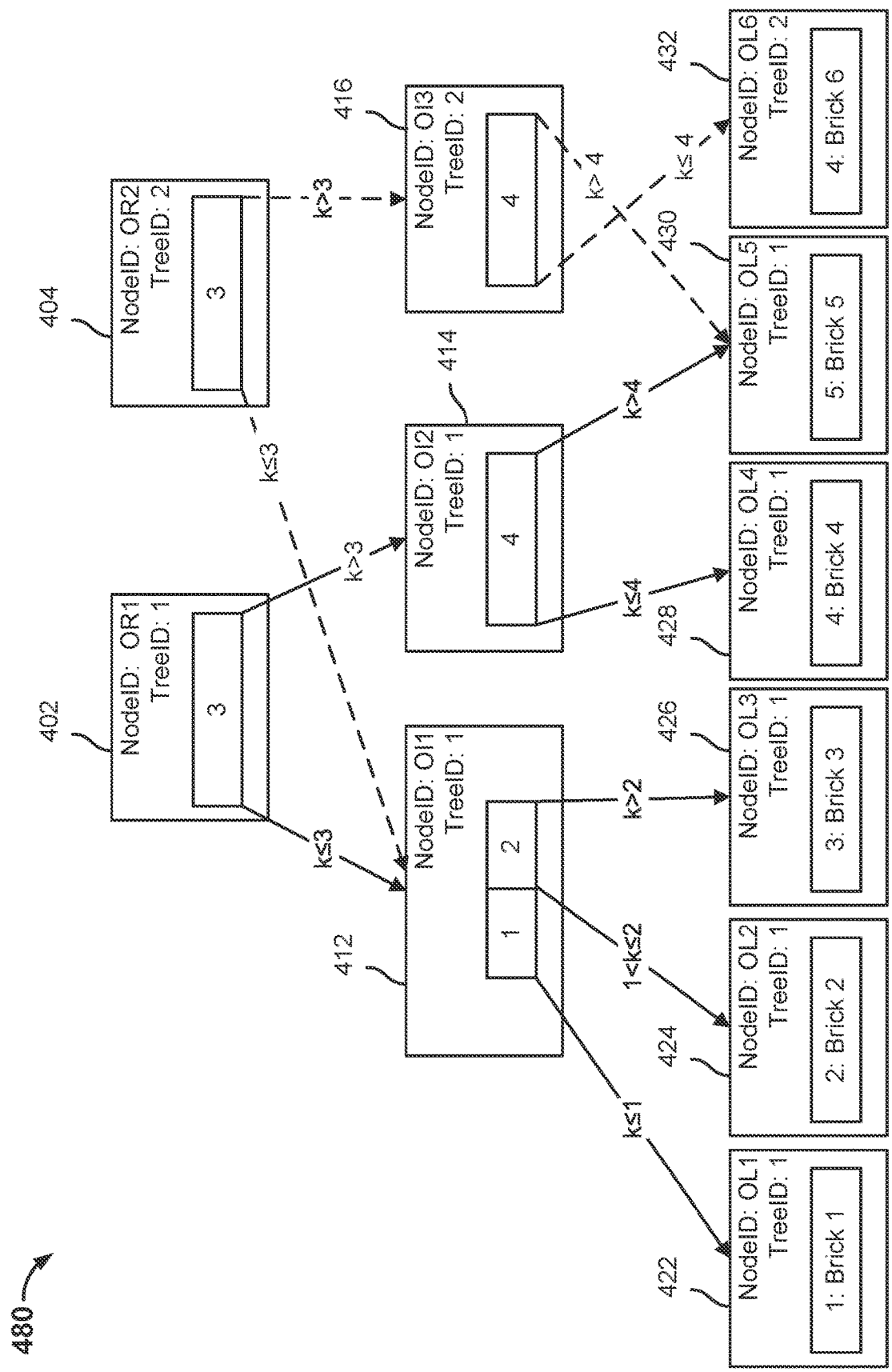
FIG. 4D is a block diagram illustrating an embodiment of a modified cloned metadata structure.

FIG. 4D is a block diagram illustrating an embodiment of a modified cloned metadata structure. The metadata tree 480 shown in FIG. 4D illustrates a result of the modifications made to file metadata tree 480 as described with respect to FIG. 4C.

The metadata structure with root node 402 may correspond to a first reference restoration point of an object or object file and the snapshot tree with root node 404 may correspond to a second reference restoration point of an object or object file. In this example, both metadata structures are fully hydrated restoration points. A fully hydrated restoration point corresponds to a state which may be restored without having to apply one or more logged IOs. For example, an object or object file may be restored to a state associated with time $t_1$ by traversing the metadata structure having root node 402. An object or object file may be restored to a state associated with time $t_{10}$ by traversing the metadata structure having root node 404. An object or an object file may be restored to a state between time $t_1$ and $t_{10}$ by applying one or more data changes that are stored in a log file to the metadata structure having root node 402 and then traversing the modified snapshot tree.

Figure 5:
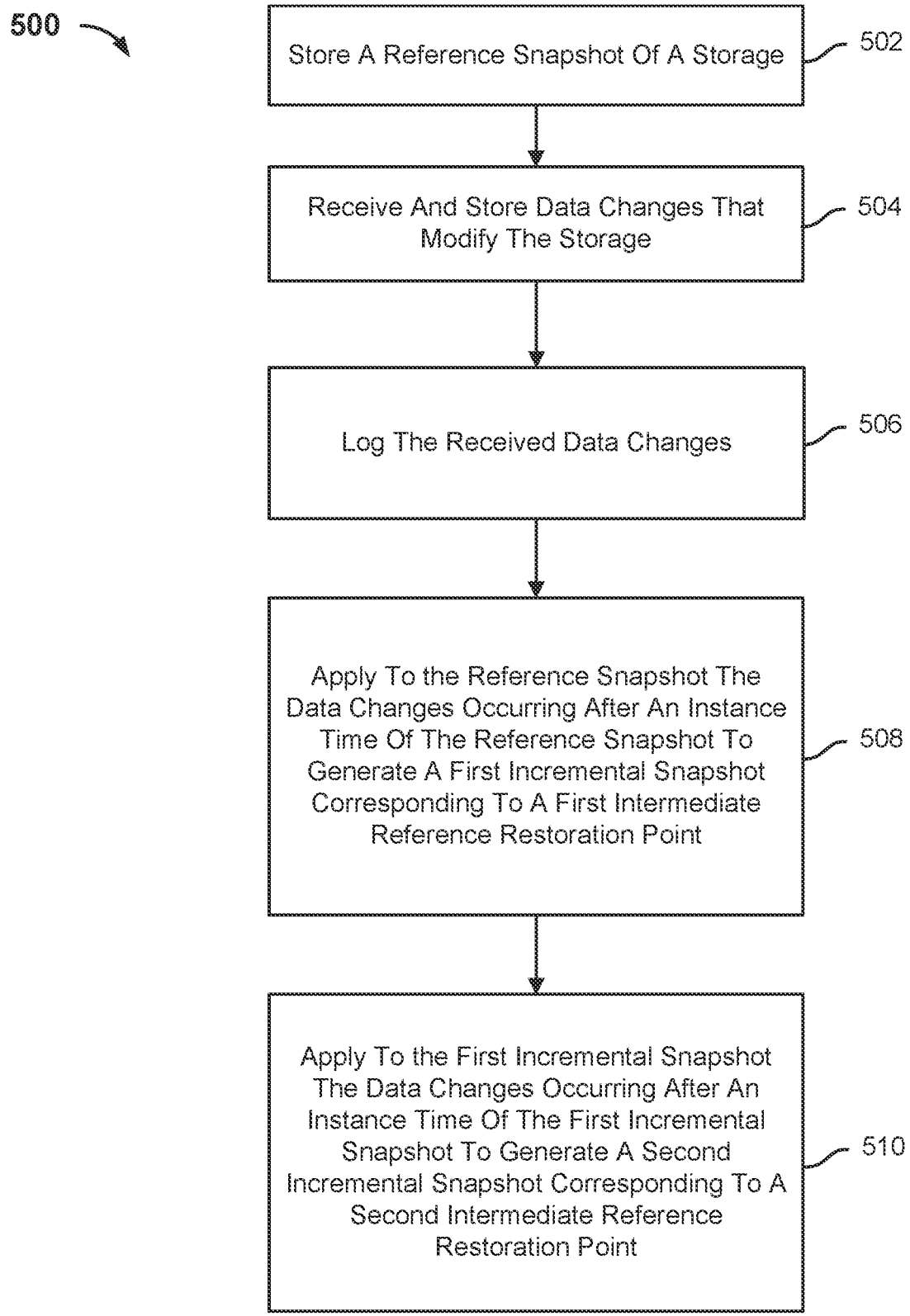
FIG. 5 is a flow chart of a process for providing continuous data protection in accordance with some embodiments.

FIG. 5 is a flow chart of a process for providing continuous data protection in accordance with some embodiments. In the example shown, process 500 may be implemented by a backup system, such as backup system 162.

At 502, a reference snapshot of a storage is stored. A reference snapshot may correspond to a full backup snapshot. In some embodiments, a full backup snapshot of a source system is performed. The full backup snapshot may include all of the file system data associated with the source system (e.g., content data, metadata). In some embodiments, a full backup snapshot of an object is performed. Examples of objects include, but are not limited to, a drive, a volume, a VM, a database, an application, a container, a pod, etc. The full backup snapshot may include all of the object data associated with an object (e.g., content data, metadata).

In some embodiments, the reference snapshot of the storage corresponds to an initial full backup snapshot of the source system. In some embodiments, the reference snapshot of the storage corresponds to an initial full backup snapshot of an object. In other embodiments, the reference snapshot of the storage corresponds to a subsequent full backup snapshot of the source system. In other embodiments, the reference snapshot of the storage corresponds to a subsequent full backup snapshot of the object. A subsequent full backup snapshot may be performed in the event a gap in a sequence of IOs is detected.

A backup system may ingest the data included in the reference snapshot, perform a backup of the data included in the reference snapshot, and generate a tree data structure based on the data included in the reference snapshot. The tree data structure may include a snapshot tree and one or more metadata structures. In some embodiments, the one or more metadata structures correspond to one or more objects hosted on a source system. In some embodiments, the one or more metadata structures correspond to one or more object files associated with the object. The tree data structure corresponding to the reference snapshot may be a full reference restoration point.

At 504, one or more data changes that modify the storage are received and stored. Each of the CDP-enabled objects hosted on a source system may have an associated write filter. A write filter may be configured to intercept IOs associated with a CDP-enabled object and filter out the read IOs. In some embodiments, the write filter is configured to forward the intercepted write IOs to a filter daemon hosted on the source system.

The filter daemon may be configured to collect the intercepted write IOs from one or more write filters and stream the intercepted write IOs to a CDP service of the backup system. The filter daemon may be configured to stream the intercepted write IOs as they are received. In some embodiments, the filter daemon is configured to stream batches of intercepted write IOs. The filter daemon may be configured to stream intercepted write IOs to CDP services that correspond to a CDP-enabled object from which the intercepted write IO is received. For example, the filter daemon may receive an intercepted write IO from a first CDP-enabled object and an intercepted write IO from a second CDP-enabled object. The filter daemon may forward the intercepted write IO from the first CDP-enabled object to a first CDP service running on a first cluster node of the backup system and forward the intercepted write IO from the second CDP-enabled object to a second CDP service running on the second cluster node. A CDP service hosted on a cluster node may receive a stream of IOs associated with a CDP-enabled object.

At 506, the received data changes are logged. A CDP service may have a corresponding storage and store a record of the received stream of IOs in a log (e.g., write-ahead log). The CDP service may maintain a corresponding log for each of the CDP-enabled objects. The CDP service may receive the IOs associated with a CDP-enabled object as long as the CDP-enabled object is active. The log is comprised of a plurality of entries associated with a CDP-enabled object. Each entry may correspond to an IO received from the filter daemon. An entry may have an associated timestamp, IO, and an associated sequence number. In some embodiments, an entry includes a snapshot marker. In the event an entry includes a snapshot marker, a reference restoration point may be generated.

At 508, the one or more data changes occurring after an instance time of the reference snapshot are applied to the reference snapshot to generate a first incremental snapshot corresponding to a first intermediate reference restoration point. A file system manager of the backup system may detect that a log entry includes a snapshot marker. In response to detecting the snapshot marker, the file system manager may be configured to generate an intermediate reference restoration point.

The tree data structure corresponding to the previous snapshot, e.g., a reference snapshot, is identified and a root node of the tree data structure corresponding to the previous snapshot is cloned. For example, the root node of the tree data structure corresponding to the previous snapshot may be cloned in a manner that is described above with respect to FIG. 3B.

The entries of intercepted write IOs stored in a log file may correspond to one or more data changes to a CDP-enabled object. The entries that occurred after a timestamp associated with the reference snapshot and before a timestamp associated with the snapshot marker may be applied to the cloned tree data structure. The entries of the log file that correspond to the CDP-enabled object change may be applied to the cloned tree data structure. For example, the data changes may be applied to the cloned tree data structure in a manner that is described above with respect to FIGS. 3C-3D.

The cloned tree data structure with the one or more data changes applied corresponds to the first intermediate restoration point.

At 510, the one or more data changes occurring after an instance time of the first incremental snapshot are applied to the first incremental snapshot to generate a second incremental snapshot corresponding to a second intermediate reference restoration point.

A second entry included in the log may include a snapshot marker. In response to detecting the snapshot marker in the second entry, the file system manager may be configured to generate a second intermediate reference restoration point.

The tree data structure corresponding to the previous snapshot, e.g., a reference snapshot, is identified and a root node of the tree data structure corresponding to the previous snapshot is cloned. For example, the root node of the tree data structure corresponding to the previous snapshot may be cloned in a manner that is described above with respect to FIG. 3B.

The entries of intercepted write IOs stored in a log file may correspond to one or more data changes to a CDP-enabled object. The entries that occurred after a timestamp associated with the previous snapshot marker and before a timestamp associated with the current snapshot marker may be applied to the cloned tree data structure. The entries of the log file that correspond to a CDP-enabled object change may be applied to the cloned tree data structure. For example, the data changes may be applied to the cloned tree data structure in a manner that is described above with respect to FIGS. 3C-3D.

The cloned tree data structure with the one or more data changes applied corresponds to a second intermediate reference restoration point.

Figure 6:
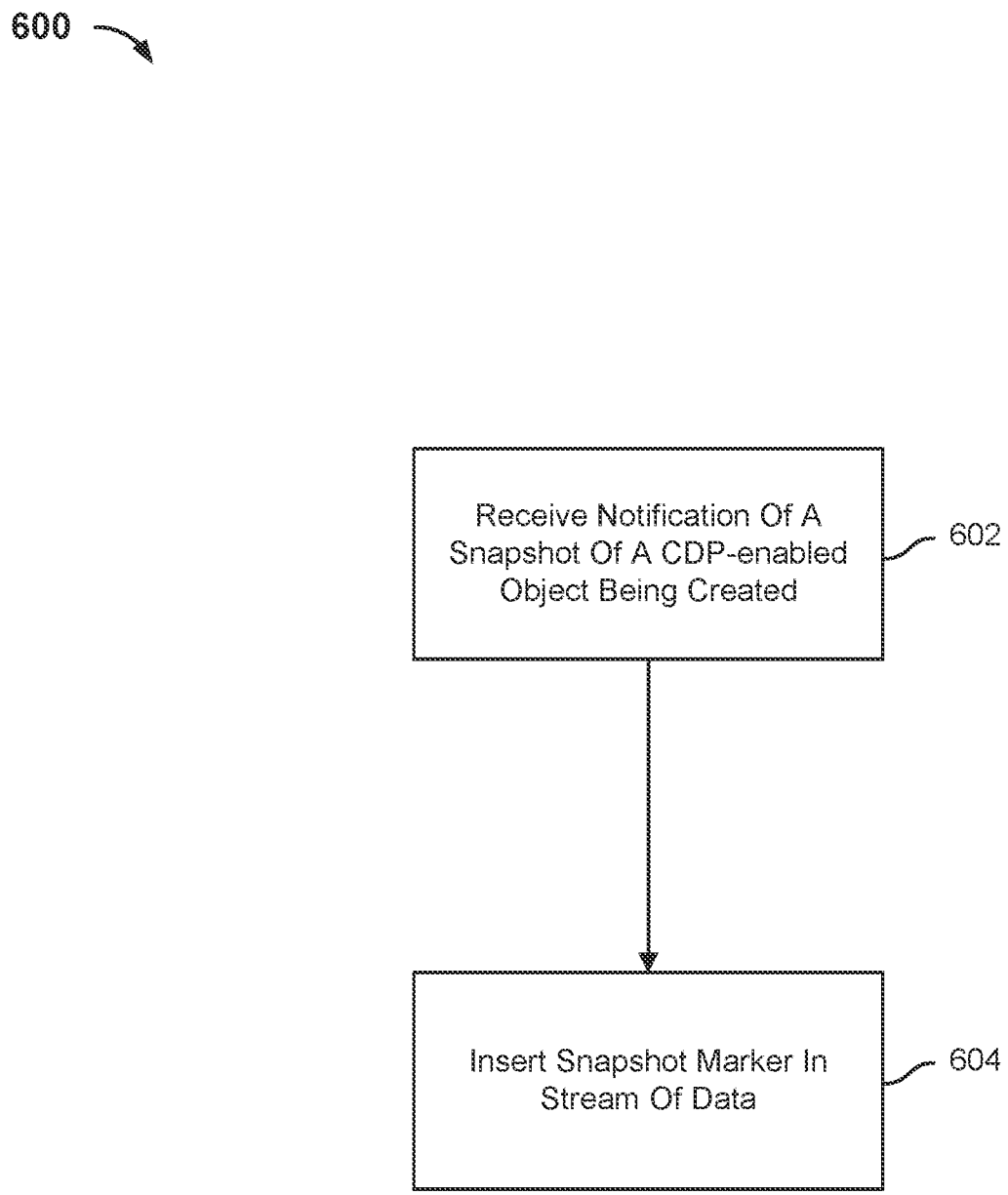
FIG. 6 is a flow chart illustrating a process of providing a reference restoration point in accordance with some embodiments.

FIG. 6 is a flow chart illustrating a process of providing a reference restoration point in accordance with some embodiments. In some embodiments, process 600 is implemented by a write filter, such as write filter 105.

At 602, a notification of a snapshot of an object being created is received. The notification may be received from a CDP-enabled object. The CDP-enabled object may include a backup agent that notifies a write filter.

Reference restoration points may be generated based on a backup policy. In some embodiments, the backup policy indicates that reference restoration points are to be generated periodically (e.g., every 15 minutes, every 30 minutes, every 60 minutes, etc.). In some embodiments, the backup policy indicates that reference restoration points are to be generated in response to a user command. In some embodiments, the backup policy indicates that reference restoration points are to be generated after a threshold number of data changes have been logged. In some embodiments, the backup policy indicates that a reference restoration point is to be generated in the event a gap is detected in the sequenced of logged IOs.

In some embodiments, a backup agent hosted on a source system provides to a write filter that is attached to a CDP-enabled object a command to provide a reference restoration point. The source system may include one or more CDP-enabled objects. Each CDP-enabled object may have a corresponding write filter. The backup agent may be configured to provide the command to each of the write filters.

At 604, a snapshot marker is inserted in the stream of data. The snapshot marker may be inserted in the stream of data in between intercepted write IOs. In some embodiments, the backup agent may provide to a CDP-enabled object a command to quiesce the CDP-enabled object for a short period of time (e.g., 1 second). The snapshot marker may correspond to a point in time at which the CDP-enabled object is quiesced. The snapshot marker may include a timestamp that indicates a reference restoration point is associated with CDP-enabled object to which the write filter is attached.

Figure 7:
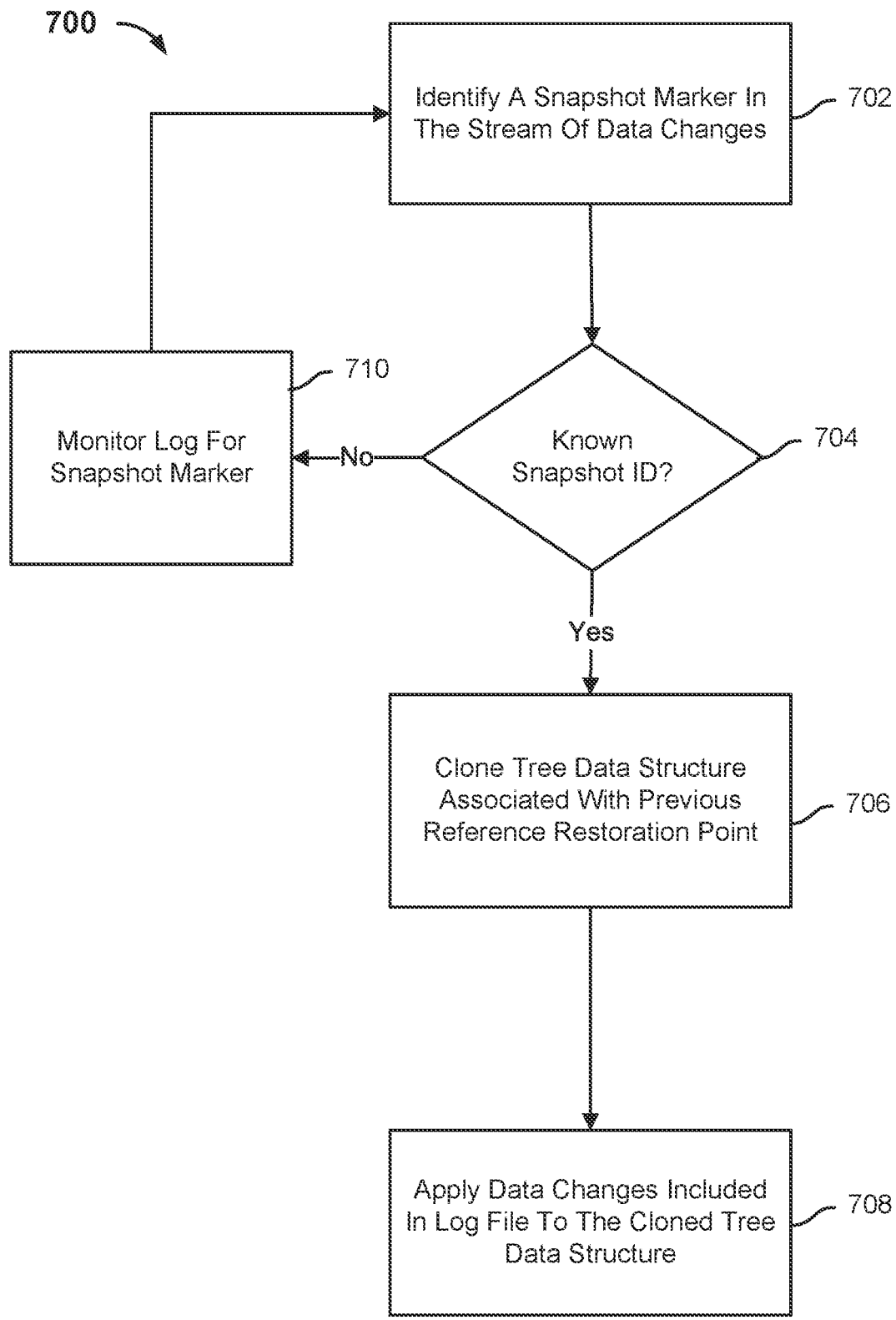
FIG. 7 is a flow chart illustrating a process for providing a reference restoration point in accordance with some embodiments.

FIG. 7 is a flow chart illustrating a process for providing a reference restoration point in accordance with some embodiments. In some embodiments, process 700 may be implemented by a backup system, such as backup system 162. In some embodiments, process 700 may be implemented to perform some or all of step 508 of process 500. In some embodiments, process 700 may be implemented to perform some or all of step 510 of process 500.

At 702, a snapshot marker is identified in the stream of data changes. A CDP service of a backup system may receive a stream of write IOs. Each write IO included in the stream may be associated with a timestamp and a sequence number. A snapshot marker may be included in the stream of data changes. A snapshot marker may indicate a point in time that is associated with an application consistent recovery point. An application consistent recovery point may capture on-disk data, data in memory, and all transactions in process.

The CDP service may store a log that includes an entry for each of the stream of data changes. The log may store a timestamp, a sequence number, and/or a snapshot marker. A file system manager of the backup system may analyze the log to determine if any of the entries include a snapshot marker.

At 704, it is determined whether the snapshot_ID associated with a snapshot marker is known to the file system manager. A backup system may initiate a snapshot of a CDP-enabled object. The object snapshot may have an associated ID known to the backup system (and the file system manager). A snapshot of the CDP-enabled object may also be initiated by an application associated with the CDP-enabled object. The object snapshot may have an associated ID, but the associated ID is unknown to the backup system.

In the event the file system manager identifies a snapshot marker, the file system manager determines if the snapshot marker is associated with a snapshot ID known to the file system manager. In the event the snapshot ID is known to the file system manager, process 700 proceeds to 706. In the event the snapshot ID is unknown to the file system manager, process 700 proceeds to 710.

At 706, a tree data structure associated with a previous reference restoration point is cloned. In the event the file system manager determines that an entry includes a snapshot marker, the file system manager may identify a tree data structure associated with the previous reference restoration point and clone the tree data structure associated with the previous reference restoration point. In some embodiments, the tree data structure associated with the previous reference restoration point corresponds to a full reference restoration point. In some embodiments, the tree data structure associated with the previous recovery point correspond to an intermediate reference restoration point.

The tree data structure associated with the previous reference restoration point may be cloned by copying a root node of the tree data structure associated with the previous reference restoration point. The root node copy may be initially configured to point to the same nodes to which the root node of the tree data structure associated with the previous reference restoration point pointed.

At 708, one or more data changes included in a log file are applied to the cloned tree data structure. A data change included in a log file may correspond to new data associated with a CDP-enabled object, modified data associated with the CDP-enabled object, or deleted data associated with the CDP-enabled object.

In the event a data change included in the log file corresponds to new data associated with the CDP-enabled object, the cloned tree data structure may be updated to include one or more intermediate nodes and one or more leaf nodes corresponding to the new data associated with the CDP-enabled object.

In the event a data change included in the log file corresponds to modified data associated with the CDP-enabled object, the cloned tree data structure may be updated to include one or more intermediate nodes and one or more leaf nodes corresponding to the modified data associated with the CDP-enabled object, and pointers associated with one or more nodes that correspond to the old data may be updated to point to the new data.

In the event a data change included in the log file corresponds to deleted data associated with the CDP-enabled object, the cloned tree data structure may be updated such that pointers associated with one or more nodes that correspond to the deleted data are deleted.

After the one or more data changes included in the log file are applied to the cloned tree data structure, the modified cloned tree data structure corresponds to a reference restoration point.

At 710, the log is monitored for a snapshot marker.

Figure 8:
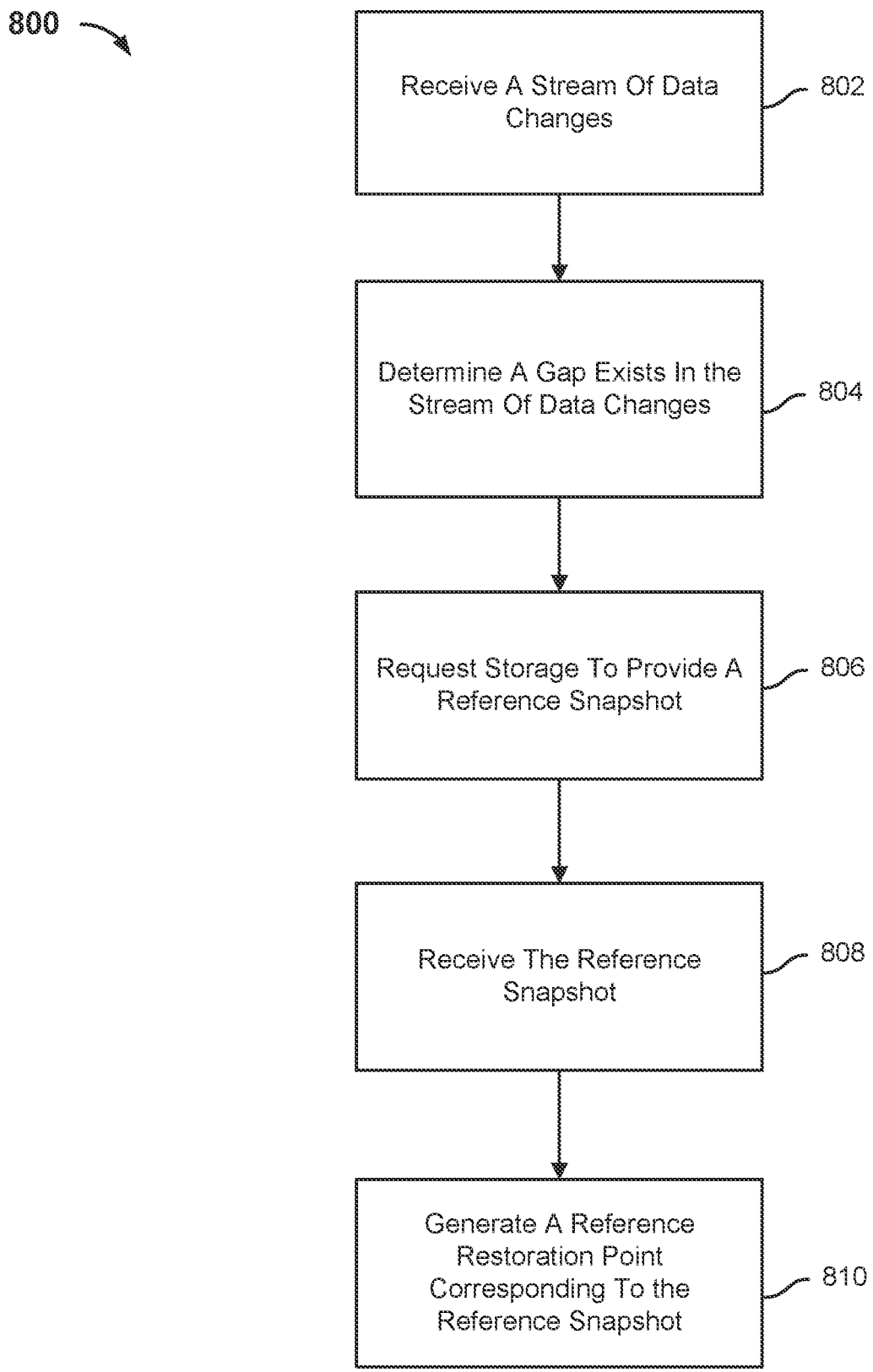
FIG. 8 is a flow chart illustrating a process for providing continuous data protection in accordance with some embodiments.

FIG. 8 is a flow chart illustrating a process for providing continuous data protection in accordance with some embodiments. Process 800 may be implemented by a backup system, such as backup system 162.

At 802, a stream of data changes is received. A write filter may be attached to a CDP-enabled object and configured to intercept IOs associated with the CDP-enabled object.

The write filter may be configured to attach a sequence number to the intercepted write TO. The sequence number indicates a relative order of the particular TO in the stream of IOs. The sequence number may include an incarnation ID and a change ID. The incarnation ID may indicate an incarnation of the write filter and may be incremented each time the write filter is restarted after a crash (e.g., object crash, filter crash). In some embodiments, the incarnation ID is not incremented after a clean restart of a CDP-enabled object. The change ID may be incremented for each intercepted write TO.

At 804, it is determined that a gap exists in the stream of data changes. The sequence number may be represented as [incarnation ID, change ID]. The sequence number may be [0, 0], [0, 1] . . . [0, n]. In the event the write filter goes offline (e.g., a crash) and comes back online, the incarnation ID may be incremented such that the sequence numbers attached to the intercepted write IOs may be [1, 0], [1, 1] . . . [1,n]. A gap may exist in the event the incarnation ID has been incremented. For example, some changes may have occurred during the time the write filter was online.

In other embodiments, the stream of data changes may be missing an TO. For example, the stream of logged IOs may have a sequence of [0, 0], [0, 1], [0, 2], [0, 3], [0, 5]. In this example, an TO with a sequence number of [0, 4] is missing. A gap may exist in the event a change ID has been skipped in the sequence of IOs.

At 806, a reference snapshot is requested from a storage. A backup system may provide to a backup agent a command to perform a full snapshot. In some embodiments, in response to receiving the command, the backup agent causes a source system to perform a full snapshot of its entire system. In some embodiments, in response to receiving the command, the backup agent causes a CDP-enabled object associated with the gap to perform a full snapshot. A snapshot marker may be inserted in the stream of IOs associated with the CDP-enabled object. The snapshot marker may indicate that a full reference restoration point was generated. The snapshot marker may include a snapshot ID that is known to the backup system requesting the reference snapshot.

At 808, the reference snapshot is received. In some embodiments, the reference snapshot includes all of the file system data associated with a source system. In some embodiments, the reference snapshot includes all of the object data associated with a CDP-enabled object.

At 810, a reference restoration point corresponding to the reference snapshot is generated. A backup system may ingest the data included in the reference snapshot and generate a tree data structure. Tree data structures, such as the examples depicted in FIGS. 3A and 4A may be generated. The tree data structure may include a snapshot tree and one or more metadata structures. In some embodiments, the one or more metadata structures correspond to one or more objects hosted on a source system. In some embodiments, the one or more metadata structures correspond to one or more object files associated with the object.

In some embodiments, the reference restoration point includes all of the file system data associated with the source system. In some embodiments, the reference restoration point includes all of the object data of an object. Examples of objects include, but are not limited to, a VM, a database, an application, a container, a pod, etc.

Figure 9:
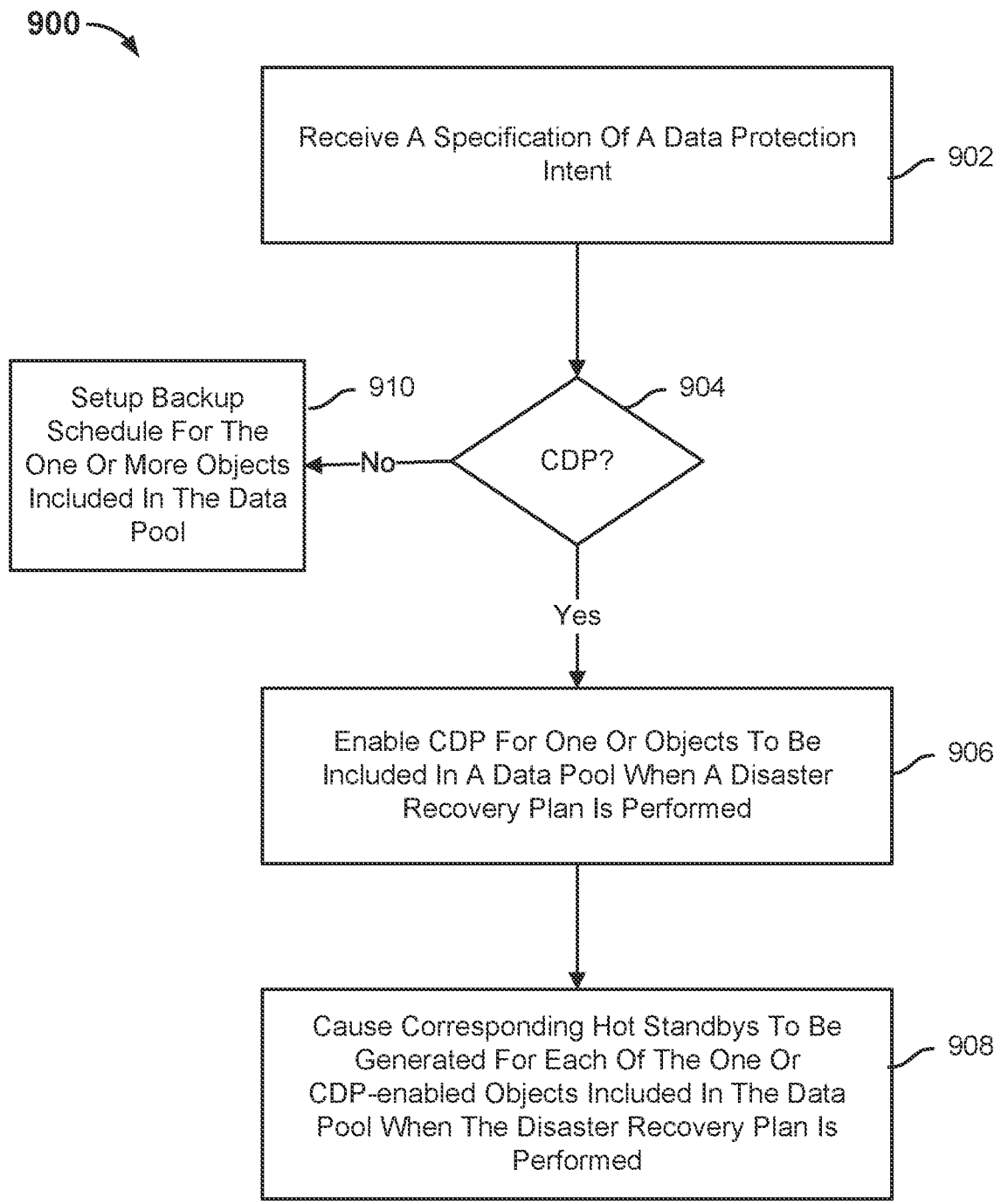
FIG. 9 is a flow chart illustrating a process for implementing a disaster recovery plan in accordance with some embodiments.

FIG. 9 is a flow chart illustrating a process for implementing a disaster recovery plan in accordance with some embodiments. In the example shown, process 900 may be implemented by a data management plan orchestrator, such as data management plan orchestrator 114.

At 902, a specification of a data protection intent is received. The data protection intent may include an indication of a data pool and one or more data management services (e.g., backup, restore, disaster recovery, replication, migration, analytics, compliance, security, etc.) that are to be applied to the data pool.

A data pool is a description of one or more objects to be included in the data pool. When the one or more data management services are performed, the one or more data management services are performed with respect to the one or objects specified by the data pool. The description may indirectly and/or directly identify the one or more objects. An object may be associated with one or more tags, labels, features, and/or prefixes. A user may specify the one or more objects to be included in the data pool when the one or more data management services are performed based on a tag, label, feature, and/or prefix associated with an object.

The data protection intent specification may include a disaster recovery plan for the one or more objects to be included in the data pool when the disaster recovery plan is performed. The disaster recovery plan may indicate a primary site associated with each of the one or more objects, a disaster recovery site associated with each of the one or more objects, a specified RPO for the one or more objects, and/or a specified RTO for the one or more objects.

At 904, it is determined whether CDP is needed to achieve the data protection intent. The data management plan orchestrator may analyze the data protection intent specification to determine protection jobs needed for one or more types of objects to be included in the data pool when the disaster recovery plan is performed. The data protection intent specification analysis may identify one or more types of objects specified to be included in the data pool when the disaster recovery plan is performed. For example, the data management plan orchestrator may identify, based on tags, labels, and/or features associated with a particular object, whether the particular object is a high input/output(IO) object (e.g., an object having a number of IOs/min greater than or equal to an IO threshold), whether the particular object is a low IO object (e.g., an object having a number of IOs/min less than or equal to the IO threshold), performance requirements associated with the particular object, etc.

The data management plan orchestrator may determine protection jobs for the one or more objects to be included in the data pool when the disaster recovery plan is performed based on a specified RPO included in the data protection intent specification and the data protection intent specification analysis. In the event CDP is needed to achieve the data protection intent, process 900 proceeds to 906. In some embodiments, the data management plan orchestrator determines that CDP needs to be enabled to achieve the specified RPO for an object. For example, an object may be a high IO object and CDP needs to be enabled to achieve the specified RPO for the high IO object.

In the event CDP is not needed to achieve the data protection intent, process 900 proceeds to 910. In some embodiments, the data management plan orchestrator determines that a scheduled backup (e.g., every hour, every six hours, daily, etc.) is sufficient to achieve the specified RPO for an object. For example, an object may be a low IO object and CDP does not need to be enabled to achieve the specified RPO for the low IO object.

At 906, CDP is enabled for one or more objects to be included in a data pool when a disaster recovery plan is performed. The data management plan orchestrator may provide to a backup system associated with the source system hosting the one or more objects one or more commands to enable CDP for the one or more objects determined to need CDP to achieve the specified RPO. In response to receiving the one or more commands, the backup system may provide to the source system a corresponding write filter for each of the one or more objects determined to need CDP to achieve the specified RPO and enable on the backup system a CDP service to handle write IOs. In response to receiving a write filter, the source system may attach the corresponding write filter to each of the one or more objects determined to need CDP to achieve the specified RPO. In some embodiments, the source system hosting the one or more objects is capable of providing CDP for the one or more objects because the source system is capable of providing its own write filters. The backup system may provide to the source system a command to enable CDP for some or all of the one or more objects. In response to receiving the command, the source system may attach a corresponding write filter to each of the one or more objects determined to need CDP to achieve the specified RPO.

A write filter may be configured to intercept all IOs of an associated object, filter the read IOs, and provide a stream of the intercepted write IOs to the backup system. The write filter may be configured to attach a sequence number to each intercepted write IO. In some embodiments, the backup system is configured to provide an IO filter daemon to the source system. The IO filter daemon of the source system may be configured to receive the intercepted write IOs from each of the write filters of the source system and to provide the intercepted write IOs from each of the write filters of the source system to the backup system. The backup system may include one or more CDP services that are configured to receive one or more intercepted write IOs from the IO filter daemon of the source system. A CDP service may maintain a log for the one or more intercepted write IOs received from the IO filter daemon of the source system.

At 908, one or more corresponding hot standbys are caused to be generated for each of the one or more CDP-enabled objects included the data pool when the disaster recovery plan is performed. The data management plan orchestrator may send to a backup system and/or a disaster recovery site system one or more commands that causes the corresponding hot standbys to be generated for each of the one or more CDP-enabled objects to be included in the data pool when the disaster plan is performed.

A frequency at which the one or more hot standbys are updated may be based on a determined sync-replication configuration. The data management plan orchestrator may determine a sync-replication configuration for the one or more hot standbys based on a specified RPO included in a data protection intent. If the specified RPO is less than or equal to a RPO threshold duration (e.g., 5 minutes), the sync-replication configuration may require write IOs logged by the CDP service associated with the backup system to be streamed from the backup system to the hot standby as the write IOs are received by the CDP service associated with the backup system from the source system. If the specified RPO is greater than the RPO threshold duration, the sync-replication configuration may require write IOs logged by the CDP service associated with the backup system to be streamed from the backup system to the hot standby at a frequency that allows the specified RPO to be achieved (e.g., every 30 minutes, hourly, etc.). The backup system may batch the write IOs logged by CDP service associated with the backup system and send a batch of write IOs to the disaster recovery site system hosting the hot standby.

A location of the hot standbys may be based on a determined hot-standby configuration. The data management plan orchestrator may determine a hot-standby configuration based on the specified RPO and the specified RTO included in the data protection intent specification, and the data protection intent specification analysis. In some embodiments, the data management plan orchestrator may determine that the specified RPO and the specified RTO may be achieved by generating at a disaster recovery site system specified in the data protection intent specification a corresponding hot standby for each of the one or more objects to be included in the data pool when the disaster recovery plan is performed. In some embodiments, the data management plan orchestrator may determine that the specified RPO and the specified RTO may be achieved by generating on the backup system a corresponding hot standby for each of the one or more objects to be included in the data pool when the disaster recovery plan is performed. The data management plan orchestrator may establish this hot-standby configuration even though it does not follow the data protection intent specification because the disaster recovery plan specified by the data protection intent specification may be unable to be satisfied or and/or reduces overall system resources needed to setup and achieve the disaster recovery plan specified by the data protection intent specification.

Figure 10:
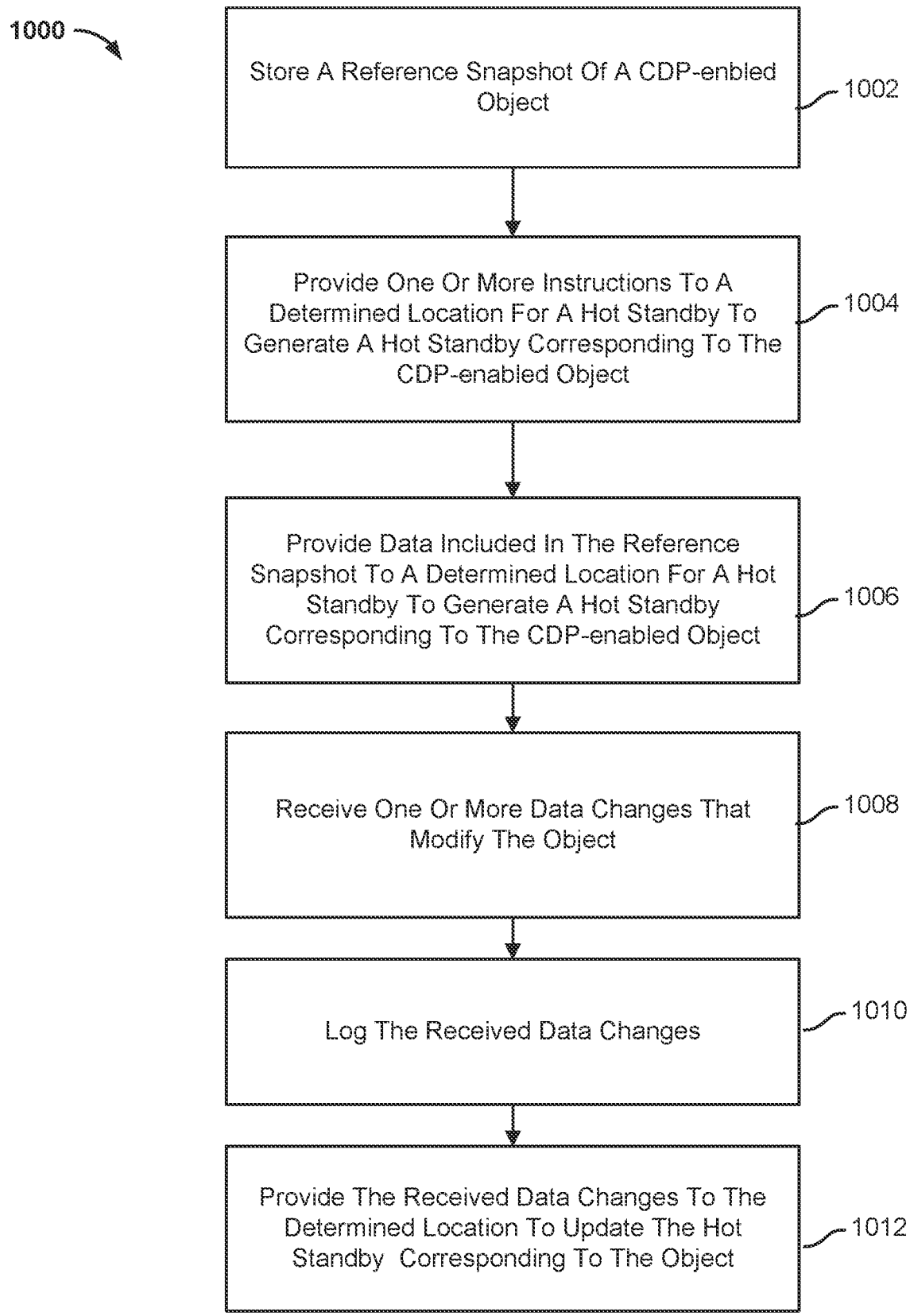
FIG. 10 is a flow chart illustrating a process for generating a hot standby for a continuous data protection-enabled object in accordance with some embodiments.

FIG. 10 is a flow chart illustrating a process for generating a hot standby for a continuous data protection-enabled object in accordance with some embodiments. In the example shown, process 1000 may be implemented by a backup system, such as backup systems 144a, 144b, 162, 180. In some embodiments, process 1000 is implemented to perform some of step 908 of process 900.

At 1002, a reference snapshot of a CDP-enabled object stored. A reference snapshot may correspond to a full backup snapshot and include content associated with the CDP-enabled object. The content associated with the CDP-enabled object may include object data. The content associated with the CDP-enabled object is backed up by the backup system. In some embodiments, the reference snapshot of the storage corresponds to an initial full backup snapshot of a CDP-enabled object. In some embodiments, the reference snapshot of the storage corresponds to a subsequent full backup snapshot of the CDP-enabled object. A subsequent full backup snapshot may be performed in the event a gap in a sequence of IOs associated with the CDP-enabled object is detected.

A backup system may ingest the data included in the reference snapshot and generate a tree data structure for the CDP-enabled object. In some embodiments, the tree data structure includes a snapshot tree for the CDP-enabled object and one or more metadata structures that corresponding to one or more object files associated with the CDP-enabled object. In some embodiments, the tree data structure is a metadata structure that corresponds to the CDP-enabled object. The tree data structure corresponding to the reference snapshot may be a reference restoration point for the CDP-enabled object.

At 1004, one or more instructions to generate a hot standby corresponding to a CDP-enabled object is provided to a determined location for a hot standby. The one or more instructions may include a command to generate a hot standby. The instructions may be provided using one or more APIs associated with an application (e.g., VMWare) that is configured to generate one or more hot standbys. In response to receiving the one or more instructions, a system at the determined location may generate a hot standby placeholder object for the CDP-enabled object. In some embodiments, a hot standby placeholder object is generated for a database. In some embodiments, a hot standby placeholder object is generated for a VM (e.g., VM configuration file that describes a VM).

In some embodiments, the determined location for the hot standby is a disaster recovery site system, such as a source system located at the disaster recovery site or a backup system located at the disaster recovery site. In some embodiments, the determined location for the hot standby corresponding CDP-enabled object is a backup system that is receiving write IOs from a source system hosting the CDP-enabled object.

At 1006, data included in the reference snapshot is provided to a determined location for a hot standby to generate a hot standby corresponding to the CDP-enabled object. The provided data includes the content associated with the CDP-enabled object. In response to receiving the data, the disaster recovery site system is configured to generate the hot standby corresponding to the CDP-enabled object by populating the hot standby placeholder object based on the received data. The hot standby corresponding to the CDP-enabled object may be used for failover purposes in the event the CDP-enabled object hosted on the source system goes offline.

At 1008, one or more data changes that modify the CDP-enabled object are received. The one or more data changes include updated content to the CDP-enabled object. The updated content is backed up by the backup system.

A CDP-enabled object may have an associated write filter. A write filter may be configured to intercept IOs associated with the CDP-enabled object and filter out the read IOs. In some embodiments, the write filter is configured to forward the intercepted write IOs to a filter daemon hosted on a source system associated with the CDP-enabled object. The source system may host one or more CDP-enabled objects.

The filter daemon may be configured to collect the intercepted write IOs from one or more write filters and stream the intercepted write IOs to a CDP service of the backup system. A CDP service hosted on a cluster node of the backup system may receive a stream of IOs associated with the object.

At 1010, the received data changes are logged. The CDP service of the backup system may maintain a log the one or more intercepted write IOs received from the IO filter daemon of the source system. In some embodiments, the CDP service maintains a corresponding log for each CDP-enabled object hosted by the source system. In some embodiments, the CDP service maintains a log for all of the CDP-enabled objects hosted by the source system.

Each entry of the log may store the metadata associated with an intercepted write IO. For example, the metadata associated with an intercepted write IO may include at least one of the following: sequence number, timestamp, IO offset, IO length, IO data bytes, VM universally unique identifier (UUID), VM disk (VMDK) full path on a host at which the VM is running, etc.

At 1012, the one or more received data changes are provided to the determined location to update the hot standby corresponding to the CDP-enabled object. A frequency at which the one or more data changes are provided to the determined location may be based a specified RPO included in a data protection intent. If the specified RPO is less than or equal to a RPO threshold duration (e.g., 5 minutes), the one or more received data changes may be streamed from the backup system to the hot standby as the one or more data changes are received by the CDP service associated with the backup system from the source system.

If the specified RPO is greater than the RPO threshold duration, the one or more received data changes may be streamed from the backup system to the hot standby at a frequency that allows the specified RPO to be achieved (e.g., every 30 minutes, hourly, etc.). The backup system may batch the one or more data changes and send a batch of one or more data changes to the determined location for the hot standby.

Figure 11:
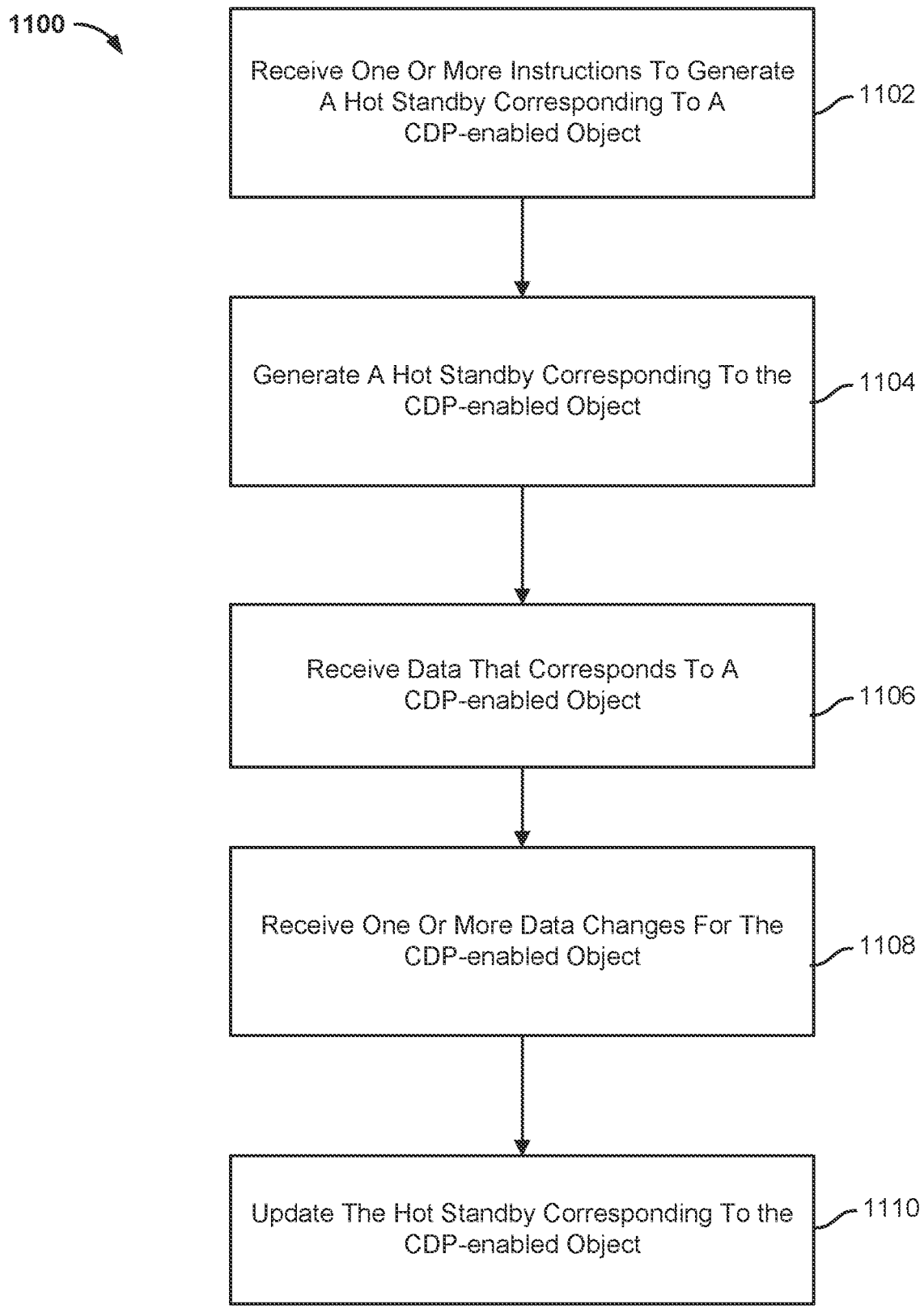
FIG. 11 is a flow chart illustrating a process for generating and maintaining a hot standby in accordance with some embodiments.

FIG. 11 is a flow chart illustrating a process for generating and maintaining a hot standby in accordance with some embodiments. In the example shown, process 1100 may be implemented by a recovery system, such as source systems 143a, 143b or backup systems 144a, 144b. In some embodiments, the recovery system is located at a disaster recovery site. In some embodiments, the recovery system is located at a primary site.

At 1102, one or more instructions to generate a hot standby for a CDP-enabled object is received. In response to receiving the one or more instructions, a hot standby placeholder object may be generated for the CDP-enabled object. In some embodiments, a hot standby placeholder object is generated for a database. In some embodiments, a hot standby placeholder object is generated for a VM.

At 1104, a hot standby corresponding to the CDP-enabled object is generated based on the received data. The received data may be used to populate the hot standby placeholder object. In some embodiments, a VM hot standby is generated for the CDP-enabled object. The hot standby is a standby version of at least a portion of the CDP-enabled object hosted on the source system. The hot standby is a standby version of at least a portion of the CDP-enabled object hosted on the source system because there is a delay between a point in time when a write IO is applied to a CDP-enabled object hosted on the source system and a point in time when the write IO is applied to the hot standby.

At 1106, data that corresponds to a CDP-enabled object is received. The data that corresponds to a CDP-enabled object hosted on a source system may be received at a recovery system from a backup system. The data may correspond to a full snapshot of the CDP-enabled object.

At 1108, one or more data changes for the CDP-enabled object are received. A backup system may receive from a source system hosting a CDP-enabled object the one or more data changes for the CDP-enabled object. The recovery system may receive the one or more data changes from the backup system.

At 1110, the hot standby corresponding to the CDP-enabled object is updated based on the one or more received data changes. The recovery system may include a CDP service that is configured to apply the one or more received data changes to the hot standby.

Figure 12:
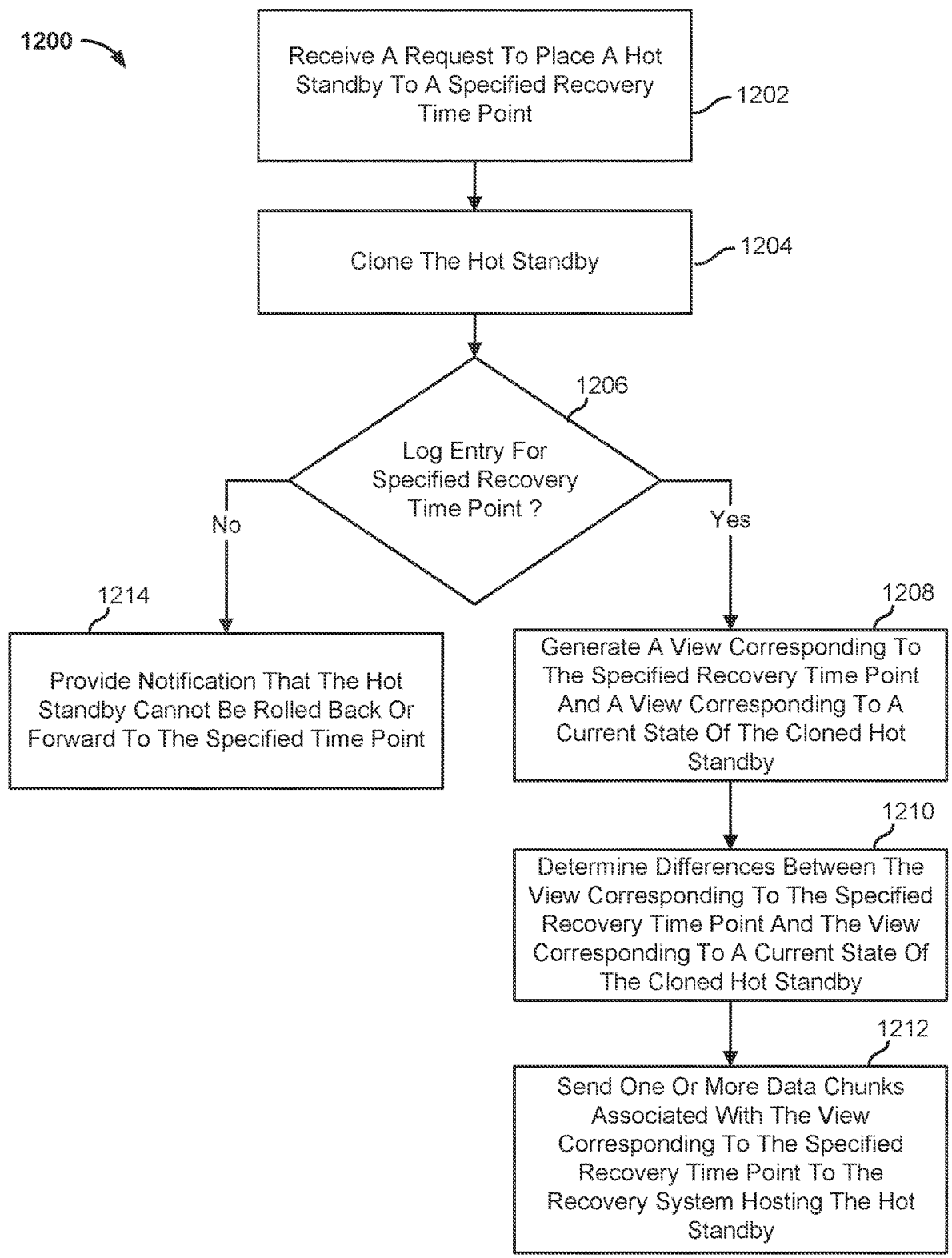
FIG. 12 is a flow chart illustrating a process for updating a hot standby in accordance with some embodiments.

FIG. 12 is a flow chart illustrating a process for updating a hot standby in accordance with some embodiments. In the example shown, process 1200 may be implemented by a backup system, such as backup systems 144a, 144b, 162, 180.

At 1202, a request to place a hot standby to a specified recovery time point is received. The request may be received from a user via a user device associated with the user. In some embodiments, the request to place (e.g., update) is a request to roll back the hot standby to the specified recovery time point. For example, a current state of a hot standby may be associated with 1:15 μm and the specified recovery time point may be 12:40 μm. The hot standby is a standby version of at least a portion of the CDP-enabled object hosted on the source system.

A CDP-enabled object hosted on a source system may need to be rolled back to the specified recovery time point for one or more reasons. For example, the CDP-enabled object may have become infected with malware, subject to ransomware, critical data may have been permanently deleted, etc. In some embodiments, the request to place is a request to roll forward the hot standby to the specified recovery time point.

At 1204, the hot standby is cloned. The backup system may send to a recovery system hosting the hot standby one or more instructions to clone the hot standby. In response to receiving the one or more instructions, the recovery system may clone the hot standby. For the example, the hot standby clone may be a VM clone. The backup system may still be streaming write IOs to the hot standby. Cloning the hot standby may pause a state of the hot standby and prevent the streamed write IOs from being applied to the hot standby. For example, write IOs having a timestamp after 1:15 pm may not be applied to the cloned hot standby.

At 1206, it is determined whether a log entry corresponding to the specified recovery time point exists. Each entry included in a log is associated with a timestamp and a sequence number. The backup system may determine whether the log stores an entry that corresponds to the specified recovery time point. For example, the backup system may determine whether the log stores an entry for 12:40 μm. The entry for 12:40 pm is associated with a sequence number.

In some embodiments, the log entry corresponding to the specified recovery time point is an entry having a timestamp equal to the specified recover time point. In some embodiments, the log entry corresponding to the specified recovery time point is an entry having a timestamp that is before and closest to the specified recovery time point. In some embodiments, the log entry corresponding to the specified recovery time point is an entry having a timestamp that is after and closest to the specified recovery time point.

In the event a log entry corresponding to the specified recovery time point exists, process 1200 proceeds to 1208. In the event a log entry corresponding to the specified recovery time point does not exist, process 1200 proceeds to 1214. For example, the specified recovery time point may correspond to a point in time for which a gap in log entries exists.

At 1208, a view corresponding to a specified recovery time point and a view corresponding to a current state of the cloned hot standby are generated.

The backup system may generate a view that corresponds to the specified recovery time point by identifying a closest reference restoration point that occurs before the particular moment in time. The closest reference restoration point is associated with a corresponding tree data structure. For example, for a specified recovery time point of 12:40 pm, as seen in FIG. 2, the closest reference restoration point is 12:30 μm. The view that corresponds to the specified recovery time point may be generated by cloning the tree data structure that corresponds to the closest reference restoration point, as seen in FIG. 3B or FIG. 4B, and applying to the cloned tree data structure, as seen in FIG. 3C or FIG. 4C, the logged write IOs that occurred from the closest reference restoration point to the specified recovery time point. For example, the logged write IOs that occurred from 12:30 pm-12:40 pm may be applied in sequence (e.g., consecutively) to the cloned tree data structure to generate the view that corresponds to the specified recovery time point. The backup system may stop applying write IOs after it applies the write IO that corresponds to the sequence number associated with 12:40 pm. The view corresponding to the specified recovery time point is a fully hydrated recovery point because it provides a complete view of the CDP-enabled object at the specified recovery time point.

The backup system may generate a view that corresponds to a current state of the cloned hot standby by identifying a closest reference restoration point that occurs before the current state of cloned hot standby. For example, for a current state of a hot standby being associated with 1:15 pm, as seen in FIG. 2, the closest reference restoration point is 1:00 pm. The view that corresponds to the specified recovery time point may be generated by cloning the tree data structure that corresponds to the closest reference restoration point, as seen in FIG. 3B or FIG. 4B, and applying to the cloned tree data structure, as seen in FIG. 3C or FIG. 4C, the logged write IOs that occurred from the closest reference restoration point to the specified recovery time point. For example, the entry for 1:15 pm is associated with a sequence number. The logged write IOs that occurred from 1:00 pm-1:15 pm may be applied to the cloned tree data structure to generate the view that corresponds to the current state of the cloned hot standby. The backup system may stop applying write IOs after it applies the write IO that corresponds to the sequence number associated with 1:15 μm. The view corresponding to a current state of the cloned hot standby is a fully hydrated recovery point because it provides a complete view of the CDP-enabled object at a time corresponding to the current state.

At 1210, one or more differences between the view corresponding to the specified recovery time point and the view corresponding to a current state of the cloned hot standby are determined. The one or more differences may be determined by traversing the views to determine one or more non-shared data chunks. One or more of the non-shared data chunks may be associated with the view corresponding to the specified recovery time point. One or more of the non-shared data chunks may be associated with the view corresponding to a current state of the cloned hot standby.

For example, the metadata structure with root node 402 of FIG. 4D may be the view corresponding to the specified recovery time point and the metadata structure with root node 404 may be the view corresponding to the current state of the cloned hot standby. The one or more non-shared data chunks are the one or more data chunks associated with "Brick 4" and the one or more data chunks associated with "Brick 6."

At 1212, one or more data chunks associated with the view corresponding to the specified recovery time point are sent to the recovery system hosting the hot standby. The backup system may send to the recovery system the one or more of the non-shared data chunks that are associated with the view corresponding to the specified recovery time point. For example, the backup system may send the one or more data chunks associated with "Brick 4." The one or more data chunks are backup data associated with a CDP-enabled object that were previously received from a source system hosting the CDP-enabled object.

In response to receiving the one or more data chunks, the recovery system may apply the one or more received data chunks to the hot standby and update the hot standby to the specified recovery time point.

At 1214, a notification that the hot standby cannot be rolled back or forward to the specified recovery time point is provided. For example, the hot standby may not be able to roll back or forward to the specified recovery time point because there may be a gap of entries in the log stored by backup system.

Figure 13:
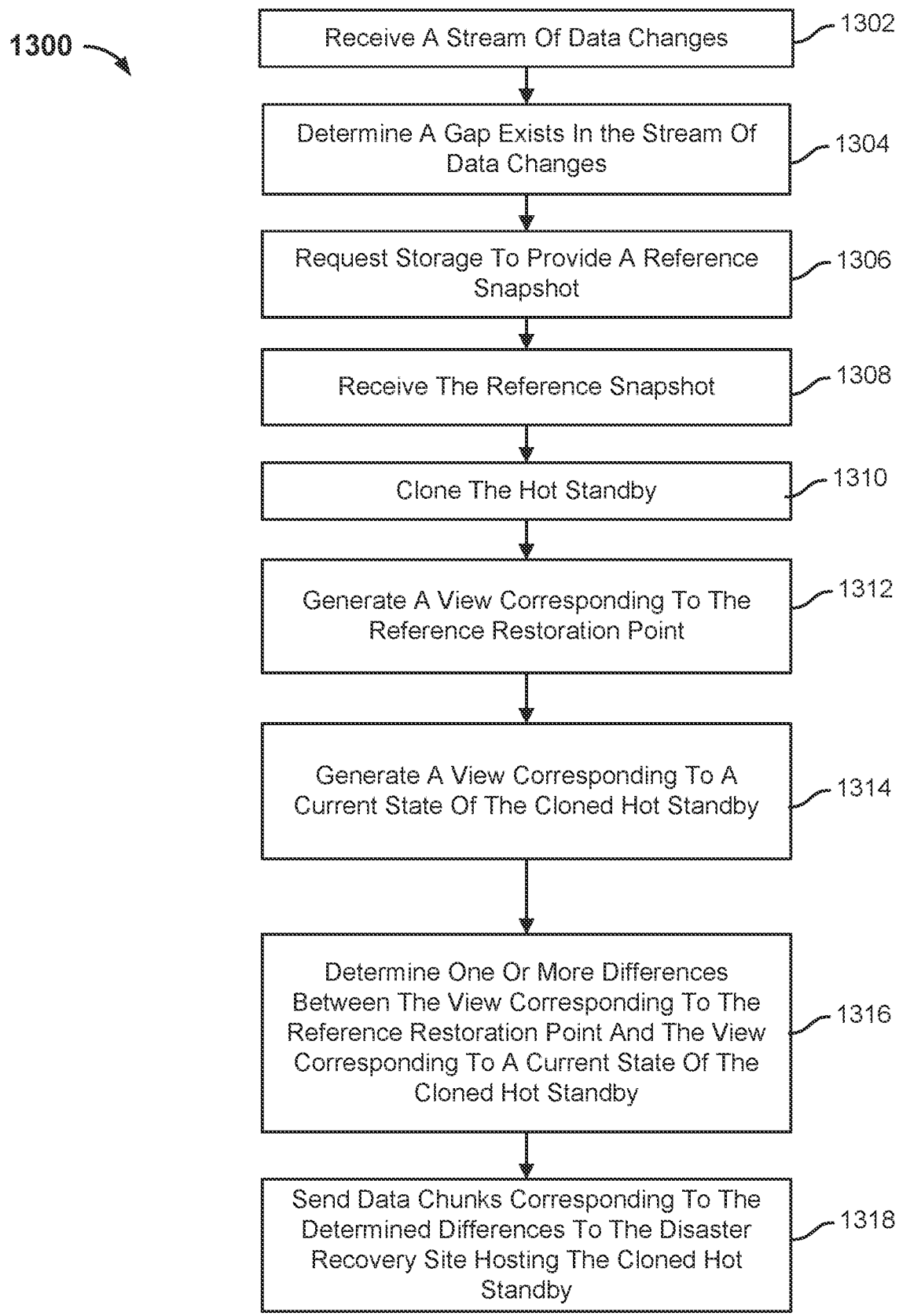
FIG. 13 is a flow chart illustrating a process for updating a hot standby in accordance with some embodiments.

FIG. 13 is a flow chart illustrating a process for updating a hot standby in accordance with some embodiments. In the example shown, process 1300 may be implemented by a backup system, such as backup systems 144a, 144b, 162, 180. Process 1300 may be implemented after a hot standby corresponding to a CDP-enabled object has been generated. In this example, a current state of the hot standby may correspond to a state of the CDP-enabled object at 12:50 pm.

At 1302, a stream of data changes is received. A write filter may be attached to a CDP-enabled object and configured to intercept IOs associated with the CDP-enabled object. The write filter may be configured to attach a sequence number to the intercepted write IO. The sequence number indicates a relative order of the particular IO in the stream of IOs.

At 1304, it is determined that a gap exists in the stream of data changes. This may cause the hot standby corresponding to the CDP-enabled object to be in an inconsistent state with respect to the CDP-enabled object hosted on the source system because the one or more missing write IOs may not be applied to the hot standby corresponding to the CDP-enabled object. The hot standby corresponding to the CDP-enabled object may remain in an inconsistent state with respect to the CDP-enabled object hosted on the source system unless gap of write IOs is corrected.

The sequence number may be represented as [incarnation ID, change ID]. The sequence number may be [0, 0], [0, 1] . . . [0, n]. In the event the write filter goes offline (e.g., a crash) and comes back online, the incarnation ID may be incremented such that the sequence numbers attached to the intercepted write IOs may be [1, 0], [1, 1] . . . [1,n]. A gap may exist in the event the incarnation ID has been incremented.

The change ID may be incremented (e.g., 1, 2, 3, . . . , n) for each intercepted write TO. In other embodiments, the stream of data changes may be missing an TO. For example, the stream of logged IOs may have a sequence of [0, 0], [0, 1], [0, 2], [0, 3], [0, 5]. In this example, an TO with a sequence number of [0, 4] is missing. A gap may exist in the event a change ID has been skipped in the sequence of IOs.

In this example, the backup system may detect a gap exists between 12:51 pm and 12:56 pm.

At 1306, a reference snapshot is requested from a storage. A backup system may provide to a backup agent hosted on a source system a command to perform a full snapshot. In some embodiments, in response to receiving the command, the backup agent causes the source system to perform a full snapshot of its entire system. In some embodiments, in response to receiving the command, the backup agent causes a CDP-enabled object associated with the gap to perform a full snapshot. A snapshot marker may be inserted in the stream of IOs associated with the CDP-enabled object. The snapshot marker may indicate that a full reference restoration point was generated. The snapshot marker may include a snapshot ID that is known to the backup system requesting the reference snapshot.

In this example, the backup system may request a full snapshot that corresponds a state of the CDP-enabled object at 1:00 μm.

At 1308, the reference snapshot is received. In some embodiments, the reference snapshot includes all of the file system data associated with a source system. In some embodiments, the reference snapshot includes all of the object data associated with a CDP-enabled object.

At 1310, the hot standby is cloned. The backup system may send to a recovery system hosting the hot standby one or more instructions to clone the hot standby. In response to receiving the one or more instructions, the recovery system may clone the hot standby. For the example, the hot standby clone may be a VM clone. The backup system may still be streaming write IOs to the hot standby. Cloning the hot standby may pause a state of the hot standby and prevent the streamed write IOs from being applied to the hot standby. For example, a current state of the hot standby may correspond to a state of the CDP-enabled at 12:50 pm.

At 1312, a view corresponding to the reference restoration point is generated. For example, the backup system may generate a view that corresponds to 1:00 pm. A backup system may generate the view corresponding to the reference restoration point by ingesting the data included in the reference snapshot and generating a tree data structure that corresponds to the reference snapshot. Tree data structures, such as the examples depicted in FIGS. 3A and 4A may be generated. The tree data structure may include a snapshot tree and one or more metadata structures. In some embodiments, the one or more metadata structures correspond to one or more objects hosted on a source system. In some embodiments, the tree data structure includes a snapshot tree that corresponds to the object and one or more metadata structures correspond to one or more object files associated with the object. The view corresponding to the reference restoration point is a fully hydrated recovery point because it provides a complete view of the CDP-enabled object at a time corresponding to the reference restoration point.

At 1314, a view corresponding to a current state of a cloned hot standby is generated. The backup system may generate a view that corresponds to the current state of the cloned hot standby by identifying a closest reference restoration point that occurs before the current state of cloned hot standby. For example, for a current state of a hot standby being associated with 12:50 pm, as seen in FIG. 2, the closest reference restoration point is 12:45 pm. The view that corresponds to the specified recovery time point may be generated by cloning the tree data structure that corresponds to the closest reference restoration point, as seen in FIG. 3B or FIG. 4B, and applying to the cloned tree data structure, as seen in FIG. 3C or FIG. 4C, the logged write IOs that occurred from the closest reference restoration point to the specified recovery time point. For example, the logged write IOs that occurred from 12:45 pm-12:50 pm may be applied to the cloned tree data structure to generate the view that corresponds to the current state of the cloned hot standby. The view corresponding to a current state of the cloned hot standby is a fully hydrated recovery point because it provides a complete view of the CDP-enabled object at a time corresponding to the current state.

At 1316, one or more differences between the view corresponding to the reference restoration point and the view corresponding to the current state of the cloned hot standby are determined. The one or more differences may be determined by traversing the views to determine one or more non-shared data chunks. One or more of the non-shared data chunks may be associated with the view corresponding to the current state of the cloned hot standby. One or more of the non-shared data chunks may be associated with the view corresponding to the reference restoration point.

For example, the metadata structure with root node 402 of FIG. 4D may be the view corresponding to the current state of the cloned hot standby and the metadata structure with root node 404 may be the view corresponding to the reference restoration point. The one or more non-shared data chunks that are associated with the view corresponding to the current state of the cloned hot standby may be the one or more data chunks associated with "Brick 4" and the one or more non-shared data chunks that are associated with the view corresponding to the reference restoration point may be the one or more data chunks associated with "Brick 6."

At 1318, one or more data chunks associated with the view corresponding to the reference restoration point are sent to the recovery system hosting the hot standby. The backup system may send the one or more of the non-shared data chunks are associated with the view corresponding to the reference restoration point to the recovery system. For example, the backup system may send the one or more data chunks associated with "Brick 6." The one or more data chunks are backup data associated with a CDP-enabled object that were previously received from a source system hosting the CDP-enabled object.

In response to receiving the one or more data chunks, the recovery system may update the hot standby by applying the one or more received data chunks. As a result, the hot standby corresponding to the CDP-enabled object may be in consistent state with respect to the CDP-enabled object hosted on the source system or in a state that allows the hot standby corresponding to the CDP-enabled object to be updated to be in a consistent state with respect to the CDP-enabled object hosted on the source system.

Figure 14:
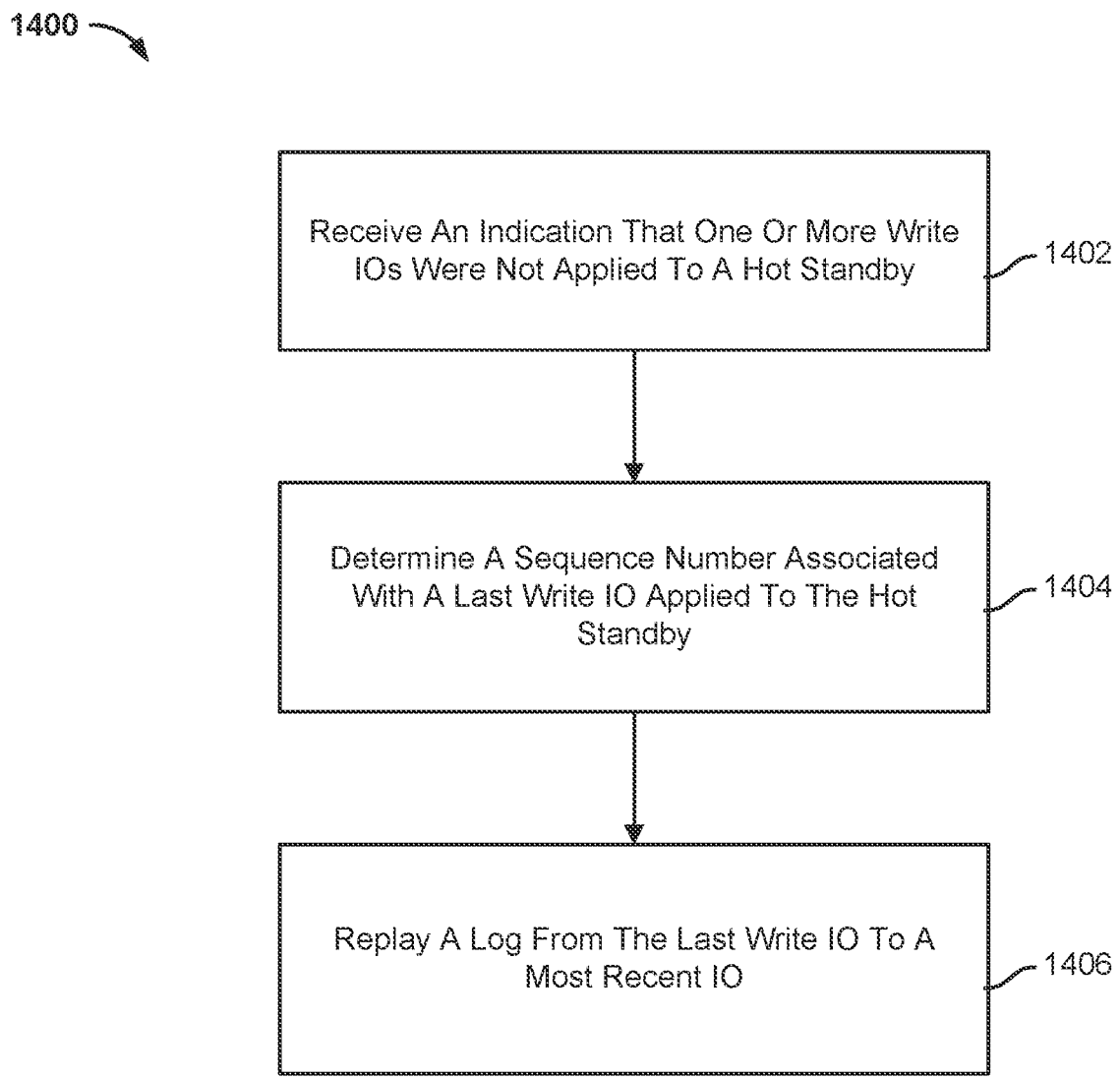
FIG. 14 is a flow chart illustrating a process for updating a hot standby in accordance with some embodiments.

FIG. 14 is a flow chart illustrating a process for updating a hot standby in accordance with some embodiments. In the example shown, process 1400 may be implemented by a backup system, such as backup systems 144a, 144b, 162, 180. Process 1400 may be implemented after a hot standby corresponding to a CDP-enabled object has been generated.

At 1402, an indication that one or more write IOs were not applied to a hot standby is received. A backup system may receive from a recovery system hosting a hot standby an indication that one or more write IOs included in a stream were not applied to the hot standby because a gap exists in the stream of write IOs. Each IO is associated with a corresponding sequence number. The recovery system may include a CDP service that determines the sequences numbers associated with the stream of write IOs and determines if a gap exists. The recovery system may wait a threshold period of time before determining if the gap exists. Write IOs may be received out-of-sequence but a gap may not exist after waiting the threshold period of time. The recovery system may provide the indication to the backup system in response to determining that a gap exists.

At 1404, a sequence number associated with a last write IO that was applied to the hot standby before the gap is determined. The recovery system hosting the hot standby may determine the last write IO that was applied to the hot standby before the one or more missing write IOs based on a sequence number associated with the last write IO and provide the determined last write IO in the indication that was received by the backup system.

At 1406, a log is replayed from the last write IO before the gap to a most recent IO. The backup system may replay the stream of write IOs from the sequence number associated with the last write IO that was applied to the hot standby and send to the recovery system hosting the hot standby the one or more write IOs that occurred after the last write IO that was applied to the hot standby. In response to receiving the one or more write IOs, the CDP service of the recovery system hosting the hot standby may apply the one or more write IOs to the hot standby.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a stream of data changes to content of an object associated with a source system;
   updating a hot standby version of at least a portion of the object maintained at a recovery system by streaming the received stream of data changes to the recovery system, wherein the hot standby version comprises a replica of the object associated with the source system that is maintained to be up to date and ready to use within a specified recovery time objective (RTO);
   determining that a gap exists in the stream of data changes such that the hot standby version of the at least the portion of the object maintained at the recovery system is in an inconsistent state with respect to the at least the portion of the object associated with the source system, wherein the at least the portion of the object includes continuous data protection (CDP) enabled object;
   in response to determining that the gap exists in the stream of data changes, obtaining a reference snapshot from the source system; and
   causing the inconsistent state of the hot standby version of at least the portion of the object maintained at the recovery system to be updated to a state of the portion of the object associated with the reference snapshot.

2. The method of claim 1, wherein a data change included in the stream of data changes is associated with a sequence number.

3. The method of claim 2, wherein the sequence number is associated with an incarnation identifier.

4. The method of claim 3, wherein determining that the gap exists is based on determining that the incarnation identifier has been incremented.

5. The method of claim 2, wherein the sequence number is associated with a change identifier.

6. The method of claim 5, wherein determining that the gap exists is based on determining that the corresponding sequence number associated with the one or more data changes included in the stream of data changes is missing.

7. The method of claim 1, wherein causing the inconsistent state of the hot standby version of at least the portion of the object maintained at the recovery system to be updated to the state of the portion of the object associated with the reference snapshot includes sending to the recovery system one or more instructions to clone the current state of the hot standby version of at least the portion of the object maintained at the recovery system.

8. The method of claim 7, wherein the recovery system clones the inconsistent state of the hot standby version of at least the portion of the object in response to receiving the one or more instructions.

9. The method of claim 1, wherein causing the inconsistent state of the hot standby version of at least the portion of the object maintained at the recovery system to be updated to the state of the portion of the object associated with the reference snapshot includes generating a view corresponding to the object associated with the reference snapshot.

10. The method of claim 1, wherein causing the inconsistent state of the hot standby version of at least the portion of the object maintained at the recovery system to be updated to the state of the portion of the object associated with the reference snapshot includes generating a view corresponding to the current state of the hot standby version of at least the portion of the object.

11. The method of claim 1, wherein causing the inconsistent state of the hot standby version of at least the portion of the object maintained at the recovery system to be updated to the state of the portion of the object associated with the reference snapshot further includes determining one or more differences between a view corresponding to the object associated with the reference snapshot and a view corresponding to the current state of the hot standby version of at least the portion of the object.

12. The method of claim 11, wherein the one or more determined differences correspond to one or more non-shared data chunks.

13. The method of claim 12, wherein causing the inconsistent state of the hot standby version of at least the portion of the object maintained at the recovery system to be updated to the state of the portion of the object associated with the reference snapshot further includes providing the one or more non-shared data chunks to the recovery system.

14. The method of claim 13, wherein in response to receiving the one or more non-shared data chunks, the recovery system updates the hot standby version of at least the portion of the object.

15. A computer program product embodied in a non-transitory computer readable medium and comprising storing computer instructions that, when executed, cause one or more processors to:
   receiving receive a stream of data changes to content of an object associated with a source system;
   update a hot standby version of at least a portion of the object maintained at a recovery system by streaming the received stream of data changes to the recovery system, wherein a hot standby comprises a replica of the object associated with the source system that is up to date and ready to use within a specified recovery time objective (RTO);

determine that a gap exists in the stream of data changes such that the hot standby version of the at least the portion of the object maintained at the recovery system is in an inconsistent state with respect to the at least the portion of the object associated with the source system, wherein the at least the portion of the object includes continuous data protection (CDP) enabled object;

in response to determining that the gap exists in the stream of data changes, request a reference snapshot from the source system; and causing the inconsistent state of the hot standby version of at least the portion of the object maintained at the recovery system to be updated to a state of the portion of the object associated with the reference snapshot.

16. The computer program product of claim 15, wherein a data change included in the stream of data changes is associated with a sequence number.

17. The computer program product of claim 16, wherein the sequence number is associated with one of or both an incarnation identifier and a change identifier.

18. The computer program product of claim 15, wherein the computer instructions include computer instructions that, when executed, cause the one or more processors to determine that the gap exists based on corresponding sequence numbers associated with the stream of data changes.

19. A system, comprising:
one or more processors configured to:
receive a stream of data changes to content of an object associated with a source system;

update a hot standby version of at least a portion of the object maintained at a recovery system by streaming the received stream of data changes to the recovery system, wherein the hot standby comprises a replica of the object associated with the source system that is up to date and ready to use within a specified recovery time objective (RTO);

determine that a gap exists in the stream of data changes such that the hot standby version of the at least the portion of the object maintained at the recovery system is in an inconsistent state with respect to the at least the portion of the object associated with the source system, wherein the at least the portion of the object includes continuous data protection (CDP) enabled object;

in response to determining that the gap exists in the stream of data changes, request a reference snapshot from the source system; and causing the inconsistent state of the hot standby version of at least the portion of the object maintained at the recovery system to be updated to a state of the portion of the object associated with the reference snapshot; and a memory coupled to the one or more processors and configured to provide the one or more processors with instructions.

* * * * *